US012567954B2

(12) United States Patent
Burns et al.

(10) Patent No.: US 12,567,954 B2
(45) Date of Patent: Mar. 3, 2026

(54) SYSTEM AND METHOD FOR GROUP KEY FORMATION

(71) Applicant: ARQIT LIMITED, London (GB)

(72) Inventors: Daryl Burns, Gloustershire (GB); David Webb, Sussex (GB); David Williams, Surrey (GB)

(73) Assignee: Arqit Limited, London (GB)

( * ) Notice: Subject to any disclaimer, the term of this patent is extended or adjusted under 35 U.S.C. 154(b) by 222 days.

(21) Appl. No.: 18/272,090

(22) PCT Filed: Jan. 11, 2022

(86) PCT No.: PCT/GB2022/050050
§ 371 (c)(1),
(2) Date: Jul. 12, 2023

(87) PCT Pub. No.: WO2022/153039
PCT Pub. Date: Jul. 21, 2022

(65) Prior Publication Data
US 2024/0073004 A1     Feb. 29, 2024

(30) Foreign Application Priority Data

Jan. 13, 2021     (GB) ...................................... 2100435

(51) Int. Cl.
*H04L 9/08*               (2006.01)
(52) U.S. Cl.
CPC .......... *H04L 9/0833* (2013.01); *H04L 9/0861* (2013.01)
(58) Field of Classification Search
CPC ............................. H04L 9/0833; H04L 9/0861
See application file for complete search history.

(56) References Cited

U.S. PATENT DOCUMENTS

| | | | |
|---|---|---|---|
| 7,234,063 B1 * | 6/2007 | Baugher | ............... H04L 9/0891 |
| | | | 713/153 |
| 10,367,792 B2 * | 7/2019 | Albrecht | ............. H04L 63/0435 |

(Continued)

OTHER PUBLICATIONS

Nguyen Xuan Quy et al., "A High Connectivity Pre-Distribution Key Management Scheme in Grid-Based Wireless Sensor Networks," Convergence and Hybrid Information Technology, 2008, ICHIT '08, International Conference on, IEEE, Piscataway, NJ, USA, Aug. 28, 2008, pp. 35-42.

(Continued)

*Primary Examiner* — Darshan I Dhruv
(74) *Attorney, Agent, or Firm* — Dentons US LLP

(57) ABSTRACT

A computer-implemented method of creating a group key for a group of N parties using an intermediary, the method includes sharing a cryptographic key of a party with an adjacent party in an ordered ring, wherein each party has another cryptographic key of an adjacent party; generating a meeting key for the party based on combining the cryptographic key of the party with a shared cryptographic key from an adjacent party; sending the meeting key to the intermediary and receiving an intermediate key from the intermediary, wherein the intermediary computes the intermediate key by combining at least two meeting keys of corresponding parties; creating the group key by combining the cryptographic key of the party with the received intermediate key, wherein the created group key includes a combination of at least N−1 of the cryptographic keys of the parties; and using the group key with another party of the group.

18 Claims, 11 Drawing Sheets

(56)               References Cited

U.S. PATENT DOCUMENTS

| | | | |
|---|---|---|---|
| 10,783,269 B1 * | 9/2020 | Shraer ................. | H04L 67/1097 |
| 11,461,208 B1 * | 10/2022 | Lippincott .............. | G06F 11/00 |
| 2007/0019807 A1 * | 1/2007 | Jung .................... | H04L 63/065 |
| | | | 380/44 |
| 2008/0075280 A1 * | 3/2008 | Ye ....................... | H04W 12/041 |
| | | | 380/28 |
| 2011/0085665 A1 * | 4/2011 | Hong ........................ | H04L 9/16 |
| | | | 380/278 |
| 2012/0322416 A1 * | 12/2012 | Sundaram ............. | H04L 9/0833 |
| | | | 455/411 |
| 2014/0047237 A1 * | 2/2014 | Parrish ................... | H04L 9/065 |
| | | | 713/168 |
| 2018/0262327 A1 * | 9/2018 | Jain ................... | H04L 12/40013 |
| 2020/0228328 A1 * | 7/2020 | Brown .................... | G06F 17/10 |
| 2021/0021409 A1 * | 1/2021 | Wu .......................... | H04L 9/085 |
| 2021/0194928 A1 * | 6/2021 | Halford ................. | H04L 9/0833 |

OTHER PUBLICATIONS

Wang Guojun et al., "Key Management for Secure Multicast Using the RingNet Hierarchy," In: Pattern Recognition: 5th Asian Conference, ACPR 2019, Auckland, New Zealand, Nov. 26-29, 2019, Revised Selected Papers, Part II, Jan. 1, 2004, Springer International Publishing, vol. 3314, pp. 77-84.

* cited by examiner

*110*

| Group formation | ~*111* |

| Key sharing | ~*112* |

| Meeting notification | ~*113* |

| Party notification | ~*114* |

| Group key calculation | ~*115* |

SYSTEM AND METHOD FOR GROUP KEY FORMATION

This application is the National Stage filing under 35 U.S.C. 371 of International Application No. PCT/GB2022/050050, filed Jan. 11, 2022, claims the benefit of GB Application No. 2100435.3, filed Jan. 13, 2021, the contents of which are all hereby incorporated by reference herein in their entirety.

The present application relates to a system, apparatus and method for group key formation and applications thereto.

BACKGROUND

Group keys may be required for groups of parties to securely communicate with each other in a group communication session and/or meeting and the like. It is useful for a number of parties (e.g. devices/servers/OGRs/users etc.) to be able to negotiate a shared symmetric group key known to all parties to enable them to communicate securely as a group. One application of such a scheme would be a messaging app such as, for example, WhatsApp where all parties in a group can send messages that the group can decipher and read. However, this typically requires a trusted intermediary (e.g. the WhatsApp server) with which each party in the group negotiates with to form the shared symmetric group key. In other examples, each pair of parties of the group may have a unique key pair shared between them and a separate encrypted message is sent to each other party in the group. The shared symmetric group key/or each unique encrypted keys are typically known to all parties or at least two or more parties and, quite possibly, the trusted intermediary.

There is a desire for a group key formation process that enhances security of group communications in which the shared symmetric group key is only known to the number of parties that form the group, and unknown to any other party and/or intermediaries.

The embodiments described below are not limited to implementations which solve any or all of the disadvantages of the known approaches described above.

SUMMARY

This Summary is provided to introduce a selection of concepts in a simplified form that are further described below in the Detailed Description. This Summary is not intended to identify key features or essential features of the claimed subject matter, nor is it intended to be used to determine the scope of the claimed subject matter; variants and alternative features which facilitate the working of the invention and/or serve to achieve a substantially similar technical effect should be considered as falling into the scope of the invention disclosed herein.

The present disclosure provides method(s), apparatus and system(s) of using a group key formation process for establishing a group key for a number of parties, each using a party (e.g. devices/servers/OGRs/user users etc.) to be able to negotiate a shared symmetric group key known to all parties to enable them to communicate securely as a group. The group key formation process enhances the security of group communications in which the shared symmetric group key is only known to the number of parties that form the group, and unknown to any other party and/or intermediaries.

In a first aspect, the present disclosure provides a computer-implemented method of creating a group key for a group of N parties using an intermediary, the method, performed by a party, comprising: sharing or negotiating a cryptographic key of the party with an adjacent party in an ordered ring, wherein each party has another cryptographic key of an adjacent party; generating a meeting key for the party based on combining the cryptographic key of the party with a shared cryptographic key from an adjacent party; and sending the meeting key to the intermediary; receiving an intermediate key from the intermediary, wherein the intermediary computes the intermediate key based on combining two or more meeting keys of corresponding parties; creating the group key based on combining the cryptographic key of the party with the received intermediate key, wherein the created group key comprises a combination of at least N−1 of the cryptographic keys of the parties; and using the group key in communications or other purposes with one or more other parties of the group.

As an option, the computer-implemented method according to the first aspect, wherein at least N−1 of the parties are arranged in the ordered ring, the method, performed by a party, comprising: sharing a cryptographic key of the party with an adjacent party in the ring, wherein each party in the ring has another cryptographic key of an adjacent party; generating a meeting key for the party based on combining the cryptographic key of the party with a shared cryptographic key from an adjacent party; and sending the meeting key to the intermediary; receiving an intermediate key from the intermediary, wherein the intermediary computes the intermediate key based on combining two or more meeting keys of corresponding parties in the ring; creating the group key based on combining the cryptographic key of the party with the received intermediate key, wherein the group key comprises a combination of at least N−1 of the cryptographic keys of said at least N−1 parties; and using the group key in communications or other purposes with one or more other parties of the group.

As another option, the computer-implemented method according to the first aspect, the method, performed by a party, further comprising: when the party is in the ordered ring: sharing or negotiating a cryptographic key of the party with an adjacent party in the ring, wherein each party in the ring has another cryptographic key of an adjacent party; generating a meeting key for the party based on combining the cryptographic key of the party with a shared cryptographic key from an adjacent party; and sending the meeting key to the intermediary; receiving an intermediate key from the intermediary, wherein the intermediary computes the intermediate key based on combining two or more meeting keys of corresponding parties in the ring; creating the group key based on combining the cryptographic key of the party with the received intermediate key; and when the party is not in the ring: sharing or negotiating a cryptographic key of an adjacent party in the ring with the party; and receiving the intermediate key of the adjacent party in the ring from the intermediary; creating the group key based on combining the shared cryptographic key of the adjacent party with the received intermediate key; and using the group key in communications with one or more other parties of the group.

As a further option, the computer-implemented method according to the first aspect, wherein: for the first party in the ordered ring, the intermediary computes an intermediate key based on combining meeting keys of at least two non-adjacent parties in the ring excluding the meeting key of the first party; and for other parties in the ordered ring, the intermediary computes the intermediate key for each party based on combining the meeting key of said each party with the intermediate key computed for the preceding adjacent party in the ordered ring.

As an option, the computer-implemented method according to the first aspect, wherein combining of a key with another key further comprises performing an exclusive OR, XOR, operation on said key with said another key.

As another option, the computer-implemented method according to the first aspect, wherein the intermediary computes the intermediate key based on combining the meeting key with at least one intermediate key of another party such that the intermediate key exhibits the property of a group key being formed when any intermediate key of a party is combined with the cryptographic key of the corresponding party in the ordered ring.

As another option, the computer-implemented method according to the first aspect, wherein the intermediary computes the intermediate key based on combining the meeting key with at least one intermediate key of another party such that the intermediate key exhibits the property that each i-th group key value comprising the i-th party cryptographic key combined with the i-th intermediate key is the same for each i-th party i in the ordered ring.

As a further option, the computer-implemented method according to the first aspect, wherein for an odd number, N, of parties in the group, where N>2 and all of the N parties are arranged in the ordered ring, the method, performed by each party in the ring, further comprising receiving an intermediate key from the intermediary, wherein the intermediary computes the intermediate key based on the meeting key and a previous intermediate key of a previous adjacent party.

Optionally, the computer-implemented method according to the first aspect, wherein for an odd number, N, of parties in the group, where N>2, all of the N parties are arranged in an ordered ring, the method, performed by each p-th party for $0<=p<=N-1$, comprising:

when p=0, performing the steps of:
  sharing or negotiating a p-th cryptographic key $K_P$ with the next adjacent (p+1)-th party in the ring;
  generating a p-th meeting key $M_P$ for the p-th party based on combining the p-th cryptographic key $K_P$ with a previously shared or negotiated (N−1)-th cryptographic key $K_{N-1}$ from the (N−1)-th party; and
  sending the meeting key $M_P$ to the intermediary, wherein the intermediary computes the p-th intermediate key, $X_P$, based on combining meeting keys of two non-adjacent parties in the ring excluding the meeting key of the p-th party;
when 0<p<N, performing the steps of:
  if p<N−1,
    sharing or negotiating a p-th cryptographic key $K_P$ with the next adjacent (p+1)-th party in the ring;
  if p=N−1,
    sharing or negotiating a p-th cryptographic key $K_P$ with the 0-th party in the ring; and
  generating a p-th meeting key $M_P$ for the p-th party based on combining the p-th cryptographic key $K_P$ with a previously shared or negotiated (p−1)-th cryptographic key $K_{P-1}$ from the (p−1)-th party; and
  sending the meeting key $M_P$ to the intermediary, wherein the intermediary computes the p-th intermediate key, $X_P$, based on combining the p-th meeting key $M_P$ with at least one intermediate key of another party; and receiving the p-th intermediate key, $X_P$, from the intermediary;

creating the group key, $K_G$, based on combining the p-th cryptographic key $K_P$ with the p-th intermediate key, $X_P$; and using the group key, $K_G$, in communications or other purpose with one or more other parties of the group.

As an option, the computer-implemented method according to the first aspect, wherein each p-th cryptographic key, $K_P$, is a precursor key generated by the p-th party prior to sharing. The computer-implemented method as claimed in any claim 10, wherein sharing further comprises sharing the p-th cryptographic key, $K_P$, of the p-th party with an adjacent ((P−1+N)mod N)-th party, wherein after all parties in the ring have shared, the p-th party has the ((P−1+N)mod N)-th cryptographic key, $K_{(P-1+N)mod N}$, of the ((P−1+N)mod N)-th party in the ring.

As another option, the computer-implemented method according to the first aspect, wherein each p-th cryptographic key, $K_P$, is a precursor key negotiated by the p-th party with the (p+1)-th party, wherein when p=N−1, (N−1)-th cryptographic key, $K_{N-1}$, is a precursor key negotiated by the (N−1)-th party with the 0-th party.

Optionally, the computer-implemented method according to the first aspect, wherein negotiating each p-th cryptographic key, $K_P$, further comprises performing a key exchange or negotiation procedure to negotiate the p-th cryptographic key, $K_P$, of the p-th party with an adjacent ((P−1+N)mod N)-th party, wherein after all parties in the ring have been negotiated, the p-th party and the adjacent ((P−1+N)mod N)-th party share the same ((P−1+N)mod N)-th cryptographic key, $K_{(P-1+N)mod N}$.

Optionally, the computer-implemented method according to the first aspect, wherein generating the p-th meeting key, $M_P$, further comprises generating the p-th meeting key, $M_P$ based on $M_P = K_P$ XOR $K_{(P-1+N)mod N}$ for all p.

As another option, the computer-implemented method according to the first aspect, wherein the intermediary computes the p-th intermediate key, $X_P$, for the p-th party based on: for p=0, $X_0 = XOR\{r=2$ to N−1 step 2$\}$ $M_r$; and for 0<p<N, $X_P = X_{P-1}$ XOR $M_P$.

As another option, the computer-implemented method according to the first aspect, wherein creating the group key, $K_G$, for the p-th party further comprising creating the group key, $K_G$, based on $K_G = X_P$ XOR $K_P$, wherein the group key, $K_G$, is the same for all parties.

As an option, the computer-implemented method according to the first aspect, wherein for an even number, N, of parties in the group, where N>2 and only N−1 parties of the N parties are arranged in an ordered ring, the method further comprising: when a party is in the ring, performing the steps of: sharing or negotiating the cryptographic key of the party with an adjacent party in the ring, wherein each party in the ring has another cryptographic key of an adjacent party; generating a meeting key for the party based on combining the cryptographic key of the party with a shared cryptographic key of an adjacent party; and sending the meeting key to the intermediary; receiving an intermediate key from the intermediary, wherein the intermediary computes the intermediate key based on combining at least two or more meeting keys of the parties in the ring; creating the group key based on combining the cryptographic key of the party with the received intermediate key; and when a party is not in the ring, performing the steps of: sharing or negotiating a cryptographic key of an adjacent party in the ring with the party; and receiving the intermediate key of the adjacent party in the ring from the intermediary; creating the group key based on combining the shared cryptographic key of the adjacent party with the received intermediate key; and using the group key in communications with one or more other parties of the group.

Optionally, the computer-implemented method according to the first aspect, wherein for an even number, N, of parties in the group, where N>2 and the N parties are arranged in an ordered ring for $0<=p<=N-1$, the method, performed by a party, comprising:

when the party is a p-th party in the ordered ring, for $0<=p<N-1$:

if p=0, performing the steps of:

sharing or negotiating a p-th cryptographic key $K_P$ with the next adjacent (p+1)-th party in the ring; and generating a p-th meeting key $M_P$ for the p-th party based on combining the p-th cryptographic key $K_P$ with a previously shared (N-2)-th cryptographic key $K_{N-2}$ from the (N-2)-th party in the ring; and sending the meeting key $M_P$ to the intermediary, wherein the intermediary computes the p-th intermediate key, $X_P$, based on combining meeting keys of two non-adjacent parties in the ring excluding the meeting key of the p-th party; and if $0<p<N-1$, performing the steps of:

if p<N-2, sharing or negotiating a p-th cryptographic key $K_P$ with the next adjacent (p+1)-th party in the ring;

if p=N-2, sharing or negotiating a p-th cryptographic key $K_P$ with the 0-th party in the ring;

generating a p-th meeting key $M_P$ for the p-th party based on combining the p-th cryptographic key $K_P$ with a previously shared (p-1)-th cryptographic key $K_{P-1}$ from the (p-1)-th party; and sending the meeting key $M_P$ to the intermediary, wherein the intermediary computes the p-th intermediate key, $X_P$, based on combining the p-th meeting key $M_P$ with at least one intermediate key of another party; and receiving the p-th intermediate key, $X_P$, from the intermediary;

creating the group key, $K_G$, based on combining the p-th cryptographic key $K_P$ with the p-th intermediate key, $X_P$; and when the party is the (N-1)-th party in the ring, performing the steps of:

sharing with the (N-2)-th party in the ring the (N-2)-th cryptographic key of the (N-2)-th party in the ring;

receiving the (N-2)-th intermediate key of the (N-2)-th party in the ring from the intermediary; and creating the group key, $K_G$, based on combining the shared (N-2)-th cryptographic key of the (N-2)-th party in the ring with the received (N-2)-th intermediate key; and using the group key, $K_G$, in communications with one or more other parties of the group.

As a further option, the computer-implemented method according to the first aspect, wherein each p-th cryptographic key, $K_P$, is a precursor key generated by the p-th party prior to sharing.

As another option, the computer-implemented method according to the first aspect, wherein sharing further comprises sharing the p-th cryptographic key, $K_P$, of the p-th party with an adjacent ((P-1+N)mod N)-th party, wherein after all parties in the ring have shared, the p-th party in the ring has the ((P-1+N)mod N)-th cryptographic key, $K_{(P-1+N)mod\ N}$, of the ((P-1+N)mod N)-th party in the ring.

As an option, the computer-implemented method according to the first aspect, wherein each p-th cryptographic key, $K_P$, is a precursor key negotiated by the p-th party with the (p+1)-th party, wherein when p=N-2, (N-2)-th cryptographic key, $K_{N-2}$, is a precursor key negotiated by the (N-2)-th party with the 0-th party, wherein when p=N-1, the (N-1)-th cryptographic key, $K_{N-1}$, is a precursor key of the (N-2)-th party.

Optionally, the computer-implemented method according to the first aspect, wherein negotiating each p-th cryptographic key, $K_P$, further comprises performing, for $0<p<=N-2$, a key exchange or negotiation procedure to negotiate the p-th cryptographic key, $K_P$, of the p-th party with an adjacent ((P-1+N)mod N)-th party, and when p=0, the p-th cryptographic key, $K_P$, of the p-th party with an adjacent ((P-2+N)mod N)-th party, wherein for $0<p<N-1$, the p-th party and the adjacent ((P-1+N)mod N)-th party share the same ((P-1+N)mod N)-th cryptographic key, $K_{(P-1+N)mod\ N}$, and for p=0, the 0-th party and the adjacent (N-2)-th party share the same (N-2)-th cryptographic key, $K_{(N-2)}$.

As an option, the computer-implemented method according to the first aspect, wherein generating the p-th meeting key, $M_P$, further comprises generating the p-th meeting key, $M_P$, based on $M_P = K_P$ XOR $K_{(P-1+N)mod\ N}$ for all p.

As another option, the computer-implemented method according to the first aspect, wherein the intermediary computes the p-th intermediate key, $X_P$, for the p-th party based on:

for p=0, $X_0 = $ XOR$\{r=2$ to $N-1$ step $2\}$ $M_r$; and for $0<p<N$, $X_P = X_{P-1}$ XOR $M_P$.

As a further option, the computer-implemented method according to the first aspect, wherein creating the group key, $K_G$, for the p-th party further comprising creating the group key, $K_G$, based on $K_G = X_P$ XOR $K_P$, wherein the group key, $K_G$, is the same for all parties.

Optionally, the computer-implemented method according to the first aspect, wherein for an even number, N, of parties in the group, where N>2, all of the N parties are arranged in an ordered ring, wherein an (N+1)-th virtual party is included into the ordered ring between the (N-1)-th and 0-th party, where the (N+1)-th virtual party is provided with an N-th cryptographic key, the method, performed by each p-th party of the ring $0<=p<=N$, comprising:

when a party is in the ring, performing the steps of:

sharing or negotiating the cryptographic key of the party with an adjacent party in the ring, wherein each party in the ring has another cryptographic key of an adjacent party; generating a meeting key for the party based on combining the cryptographic key of the party with a shared cryptographic key of an adjacent party; and sending the meeting key to the intermediary; receiving an intermediate key from the intermediary, wherein the intermediary computes the intermediate key based on combining at least two or more meeting keys of the parties in the ring; creating the group key based on combining the cryptographic key of the party with the received intermediate key; and when the party is the virtual party, performing the steps of:

sharing a cryptographic key of an adjacent party in the ring with the party; and receiving the intermediate key of the adjacent party in the ring from the intermediary; creating the group key based on combining the shared cryptographic key of the adjacent party with the received intermediate key; and using the group key in communications with one or more other parties of the group.

As an option, the computer-implemented method according to the first aspect, wherein for an even number, N, of parties in the group, where N>2, all of the N parties are arranged in an ordered ring $0<=p<=N-1$, wherein an (N+1)-th virtual party is included into the ordered ring between the (N−1)-th and 0-th party, the method, performed by a party, comprising:

if p=0, performing the steps of:
   sharing or negotiating a p-th cryptographic key $K_P$ with the next adjacent (p+1)-th party in the ring; and
   generating a p-th meeting key $M_P$ for the p-th party based on combining the p-th cryptographic key $K_P$ with a previously shared N-th cryptographic key, $K_N$, associated with the (N+1)-th virtual party in the ring;
   sending the meeting key $M_P$ to the intermediary, wherein the intermediary computes the p-th intermediate key, $X_P$, based on combining meeting keys of two non-adjacent parties in the ring excluding the meeting key of the p-th party; and
if $0<p<=N-1$, performing the steps of:
   if p<N−1, performing the steps of:
      sharing or negotiating a p-th cryptographic key $K_P$ with the next adjacent (p+1)-th party in the ring;
      generating a p-th meeting key $M_P$ for the p-th party based on combining the p-th cryptographic key $K_P$ with a previously shared (p−1)-th cryptographic key $K_{P-1}$ from the (p−1)-th party; and
      sending the meeting key $M_P$ to the intermediary, wherein the intermediary computes the p-th intermediate key, $X_P$, based on combining the p-th meeting key $M_P$ with at least one intermediate key of another party;
   if p=N−1, performing the steps of:
      hosting the (N+1)-th virtual party;
      sharing or negotiating the N-th cryptographic key $K_N$ of the (N+1)-th virtual party with the 0-th party in the ring;
      generating a (N−1)-th meeting key $M_{N-1}$ for the (N−1)-th party based on combining the (N−1)-th cryptographic key $K_P$ with a previously shared (N−2)-th cryptographic key $K_{N-2}$ from the (N−2)-th party;
      generating a N-th meeting key $M_N$ for the (N−1)-th party based on combining the shared or negotiated N-th cryptographic key $K_N$ of the (N+1)-th virtual party with the (N−1)-th cryptographic key, $K_{N-1}$, of the N-th party; and
      sending the meeting keys $M_N$ and $M_{N-1}$ to the intermediary, wherein the intermediary computes the (N−1)-th intermediate key, $X_{N-1}$, based on combining the (N−1)-th meeting key $M_{N-1}$ with the (N−2)-th intermediate key, $X_{N-2}$, of the (N−2)-th party; and
      receiving the p-th intermediate key, $X_P$, from the intermediary;
   creating the group key, $K_G$, based on combining the p-th cryptographic key $K_P$ with the p-th intermediate key, $X_P$; and
   using the group key, $K_G$, in communications with one or more other parties of the group.
As another option, the computer-implemented method according to the first aspect, wherein each p-th cryptographic key, $K_P$, is a precursor key generated by the p-th party prior to sharing.

As a further option, the computer-implemented method according to the first aspect, wherein: for $0<=p<N$ generating the p-th meeting key, $M_P$, further comprises generating the p-th meeting key, $M_P$ based on $M_P=K_P$ XOR $K_{(P+N)mod(N+1)}$; and
   for p=N−1, performing the steps of: generating the (N−1)-th meeting key, $M_{N-1}$, based on $K_{N-1}$ XOR $K_{N-2}$; and generating the N-th meeting key, $M_{N-1}$, based on $K_N$ XOR $K_{N-1}$;

As an option, the computer-implemented method according to the first aspect, wherein the intermediary computes the p-th intermediate key, $X_P$, for the p-th party based on: for p=0, $X_0=XOR\{r=2$ to $N-2$ step $2\}$ $M_r$; and for $0<p<=N$, $X_P=X_{P-1}$ XOR $M_P$.

As an option, the computer-implemented method according to the first aspect, wherein creating the group key, $K_G$, for the p-th party further comprising creating the group key, $K_G$, based on $K_G=X_P$ XOR $K_P$, wherein the group key, $K_G$, is the same for all parties.

Optionally, the computer-implemented method according to the first aspect, wherein sharing the cryptographic key further comprises performing a cryptographic key exchange of the cryptographic key.

As a further option, the computer-implemented method according to the first aspect, wherein sharing the cryptographic key further comprising: securely sharing the p-th cryptographic key $K_P$ with the next adjacent party p+1 in the ring; and securely receiving a (p−1)-th cryptographic key $K_{P-1}$ from the previous adjacent party (p−1) in the ring.

As a further option, the computer-implemented method according to the first aspect, wherein negotiating the cryptographic key further comprising: securely negotiating the p-th cryptographic key $K_P$ with the next adjacent party p+1 in the ring; and securely negotiating a (p−1)-th cryptographic key $K_{P-1}$ with the previous adjacent party (p−1) in the ring.

Optionally, the computer-implemented method according to the first aspect, wherein a party or external actor notifies the intermediary that a group key is required for use by a group of parties, wherein the notification includes data representative of each of the parties that are to be included in the group of parties.

As an option, the computer-implemented method according to the first aspect, wherein the intermediary arranges or organises the parties of the group of parties into an ordered ring, assigning an ordered and increasing index to each adjacent party either clockwise or anticlockwise around the ring.

As an option, the computer-implemented method according to the first aspect, wherein the intermediary adjusts the size of the ring to an odd number of devices in the ring when there is an even number of parties in the ring.

As another option, the computer-implemented method according to the first aspect, wherein the intermediary arranges or organises the parties of the group of parties into a ring and internally assigning a sequential zero-based index, p, to each party and mapping the external reference of each party to its zero-based reference, p.

As a further option, the computer-implemented method according to the first aspect, wherein the intermediary notifies each p-th party of the external reference or address of the (p+1)-th party in the ring for $0<=p<N-1$, wherein the intermediary notifies the (N−1)-th party of the external reference or address of the 0-th party.

Optionally, the computer-implemented method according to the first aspect, further comprising receiving an additional key from another party of the group or an external party other than the intermediary, wherein calculating the group key further comprises combining the intermediate key with the cryptographic key of the party and the received additional key.

Optionally, the computer-implemented method according to the first aspect, wherein the additional key is an OTP key.

As an option, the computer-implemented method according to the first aspect, wherein the p-th party in the group calculates the group key, $K_G$, based on $K_G = X_P$ XOR $K_P$ XOR additional key, where $X_P$ is the intermediate key received by the p-th party and $K_P$ is the cryptographic key of the p-th party.

In a second aspect, the present disclosure provides a computer-implemented method of creating a group key for a group of N parties using an intermediary, the method, performed by the intermediary, comprising: receiving a meeting key from each of the parties at the intermediary, wherein the meeting key for each party is based on combining the cryptographic key of the party with a shared or negotiated cryptographic key from an adjacent party; computing an intermediate key for each party, wherein the intermediate key for each party is computed based on combining two or more meeting keys of corresponding parties; transmitting the intermediate key for each party to each party, wherein the intermediate key for said each party is used to create the group key based on combining the cryptographic key of said each party with the received intermediate key of said each party, wherein the created group key comprises a combination of at least N−1 of the cryptographic keys of the parties.

As an option, the computer-implemented method according to second aspect, further comprising the method steps implemented by the intermediary according to any of the computer-implemented method steps or features of the first and/or second aspects.

In a third aspect, the present disclosure there is provided an apparatus comprising a processor unit, a memory unit, and a communication interface, the processor unit connected to the memory unit and the communication interface, wherein the processor unit, memory unit and communication interface are adapted to implement the corresponding steps of the computer-implemented method according to any of the first and/or second aspects.

In a fourth aspect, the present disclosure provides an intermediary comprising a processor unit, a memory unit, and a communication interface, the processor unit connected to the memory unit and the communication interface, wherein the processor unit, memory unit and communication interface are adapted to implement the corresponding intermediary steps of the computer-implemented method according to any of the first, second and/or third aspects.

In a fifth aspect, the present disclosure provides a party comprising a processor unit, a memory unit, and a communication interface, the processor unit connected to the memory unit and the communication interface, wherein the processor unit, memory unit and communication interface are adapted to implement the corresponding party steps of the computer-implemented method according to any of the first, second, third aspects, and/or fourth aspects.

In a sixth aspect, the present disclosure provides a system comprising an intermediary and a plurality of parties or devices configured according to any of the first, second, third, fourth and/or fifth aspects, wherein the plurality of parties of devices use the group key for secure communications therebetween and/or for any other suitable purpose.

In a seventh aspect, the present disclosure provides a computer-readable medium comprising computer code or instructions stored thereon, which when executed on a processor, causes the processor to perform the computer implemented method according to any of the first, second, third, fourth, fifth and/or sixth aspects, modifications thereto, combinations thereof, as herein described and/or as the application demands.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, byway of example, with reference to the following drawings, in which.

DETAILED DESCRIPTION

Figure 1A:
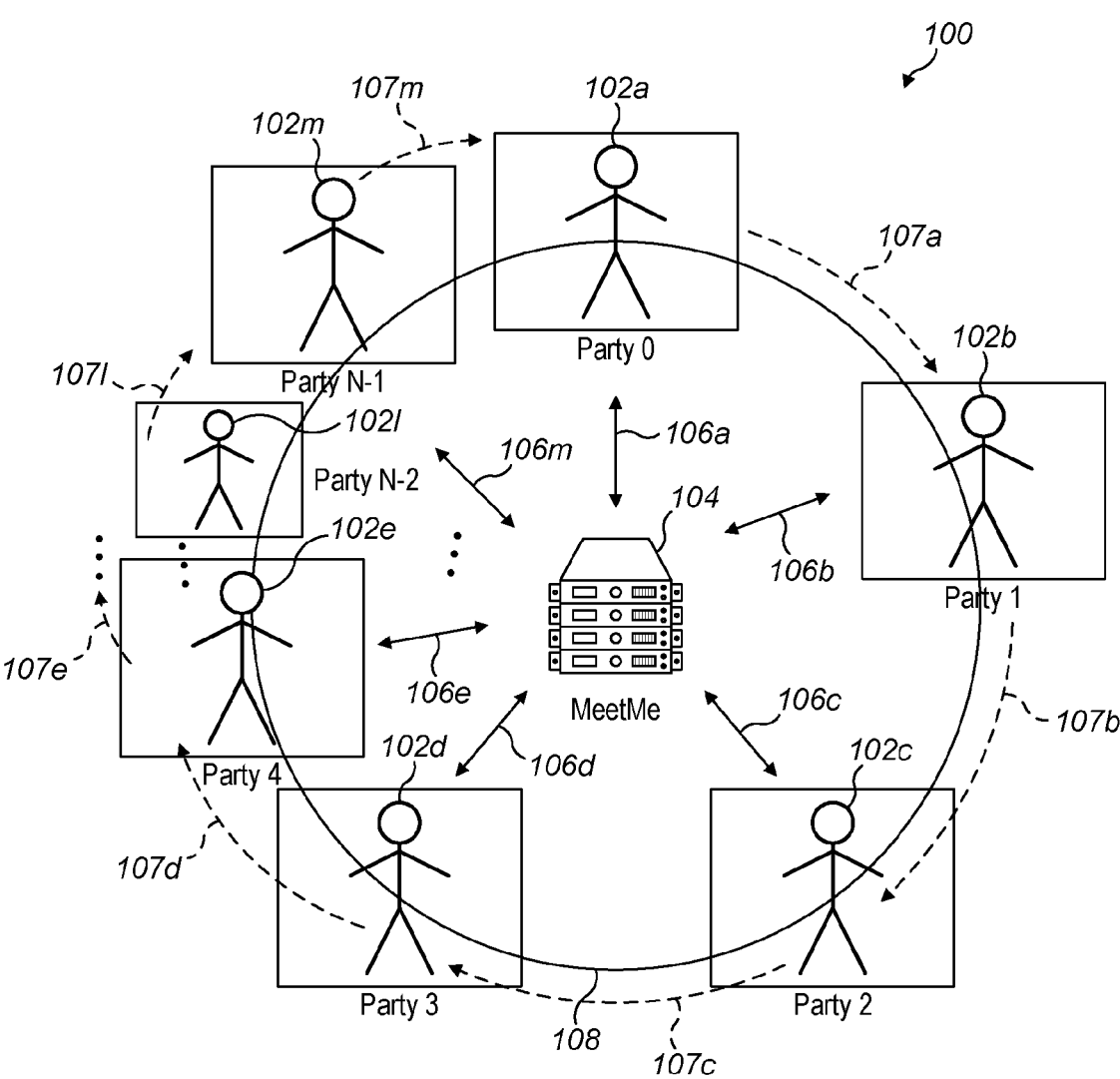
FIG. 1a is a schematic diagram illustrating an example group key creation/formation system according to some embodiments of the invention.

Embodiments of the present invention are described below byway of example only. These examples represent the best mode of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

The present disclosure provides method(s), apparatus and system(s) of using a group key formation process for establishing a group key for a number of parties, each using a party (e.g. devices/servers/OGRs/user users etc.) to be able to negotiate a shared symmetric group key known to all parties to enable them to communicate securely as a group. The group key formation process enhances the security of group communications in which the shared symmetric group key is only known to the number of parties that form the group, and unknown to any other party and/or intermediaries.

For example, the group key formation may include creating a group key for a group of N parties using an intermediary (e.g. a Chat or MeetMe server, a cloud service/application, a dedicated server, any other single compute device, or an IoT device, etc.). The N parties are arranged in a particular ordering to form a sequentially ordered ring, in which each n-th party and (n+1)-th party are adjacent to each other for $0<=n<N-1$, and where the (N−1)-th party is adjacent the first party or 0-th party in the ordered ring. Each party in the ring is configured to: share, establish or negotiate a precursor cryptographic key of the party with the next or adjacent party in the ring, where each party in the ring has shared/established or negotiated a precursor cryptographic key with the previous adjacent party. Thus, each party has shared/established or negotiated a precursor key with a previous adjacent party and a next adjacent party in the ring. A meeting key for each party is generated based on combining the precursor cryptographic key of the party with a shared precursor cryptographic key from the previous party; send the meeting key to the intermediary and receive an intermediate key from the intermediary. The intermediary computes the intermediate key based on combining two or more meeting keys from the parties in the ring. Each party in the ring is further configured to: create the group key based on combining the cryptographic precursor key of the party with the received intermediate key. In any event, each of the parties in the group uses the created group key in communications (or for other purposes) with one or more other parties of the group. The intermediary does not have visibility of the final group key and so cannot derive the group key, hence the intermediary may be configured or considered to be an untrusted device or server that assists the group of parties/parties to negotiate the group key. An advantage of the invention provides that the untrusted intermediary is never aware of the group key, nor can the intermediary calculate the group key from the information it has in relation to the parties, nor can an eavesdropper calculate the group key from either the data exchanged between parties or from the data exchanged between any number of parties and the intermediary.

Additional parties not in the ring may be added to the group after a group key has been negotiated, where the additional party connects to one of the parties in the ring and the connected party is configured to: share its precursor cryptographic key with the additional party; provide the intermediate key to the additional party; where the additional party then creates the group key based on combining the shared precursor cryptographic key of the connected party with the received intermediate key. This may be performed for several additional parties, however, this may impact security of the group key. Instead, if multiple additional parties are to join the group of parties, then a new group key may be formed.

As an option and to further secure the group key, the organiser of the meeting may send a one time pad (OTP) key to each of the parties in the ring, where the OTP key is not distributed or shared with the intermediary. When each party in the ring calculates the group key by XORing their intermediate key and their precursor key, they further XOR this result with the received OTP key to further secure the resulting group key. In this manner, this provides the additional advantage of stopping the intermediary device from adding further parties or any unknown parties to the group not agreed by the organiser or instigator, where such unknown parties would not have the OTP key and so cannot derive the secured group key without the organiser knowing.

As described, each party may share, establish or negotiate a precursor cryptographic key with an adjacent party in the ring. Any suitable or secure key sharing, establishment or negotiation protocol or procedure may be implemented to ensure two adjacent parties share the same cryptographic key, which becomes the shared precursor cryptographic key shared/established or negotiated between the two parties. The key sharing, establishment or negotiation protocol may be the same for all parties in the ring to ensure the precursor cryptographic keys that are shared/established or negotiated are in the same form, similar format and/or type such that they may be mathematically compatible to be combined with the meeting keys to form the group key. The key sharing, establishment or negotiation protocol that is used may be based on, without limitation, for example the BB84 protocol; any suitable post-quantum key exchange protocol such as, without limitation, for example Supersingular Isogeny Key Encapsulation (SIKE), Bit Flipping Key Encapsulation (BIKE) and/or any other suitable post-quantum key exchange protocol, combinations thereof, modifications thereto and/or as the application demands; any suitable classical key exchange/sharing/negotiating protocol such as, without limitation, for example Transport Layer Security (TLS)/Diffie-Hellman (DH) protocol and the like used to negotiate a shared key; or have a secured channel is established between the two parties in which they pass a one time pad (OTP) or random key from one to the other; any other quantum key exchange protocol used to establish and/or exchange a shared key between two parties; negotiating or establishing a shared key via a third party such as an intermediary or cloud service and the like; wherein the shared key may be based on quantum key distributed keys and may be a quantum-safe or quantum secure key due to the key establishment protocol being a quantum-secure key establishment protocol that uses quantum distributed keys to establish the shared key between the parties; combinations thereto, modifications thereto and the like. It is assumed herein that each party in the ring has securely shared, negotiated or exchanged and established a first shared precursor key with the previous adjacent party in the ring to said each party and has shared, negotiated or exchanged and established a second shared precursor key with the next adjacent party in the ring to said each party.

A party comprises or represents any entity, computing device, or device capable of performing cryptographic operations and communications and that wishes or is selected to be part of a group for negotiating a group key. Examples of a party may include, without limitation, for example an user device, OGR, server, IoT device, component of a fighter jet, smart phone, laptop, personal computer, portable computing device, any communication device etc. that wishes to be part of the group. An intermediary may comprise or represent any untrusted entity, application, device, cloud service, computing device or server and the like that assists a group of parties to negotiate a group key. Examples of an intermediary may include, without limitation, for example, a cloud service/application; a cloud platform; a Chat service or server/application; a MeetMe service or server/application; an untrusted device or entity; a dedicated server; any other single compute device; computing device; an IoT device; a network of servers etc.; and/or any other suitable computing apparatus, component and/or platform for acting as an intermediary as described herein for assisting a group of parties in negotiating a group key as described herein; combinations thereof, modifications thereto and/or as the application demands.

Each of the cryptographic keys, precursor keys, meeting keys, intermediate keys and the like may comprise or represent symbol strings or sets of symbol strings (e.g. n bit(s) per symbol are represented by $M=2^n$ different symbols, where $n \geq 1$). Processing of the symbol strings may include combining of sets of symbol strings, e.g. a first symbol string may be combined with a second symbol string based on, without limitation, for example one-time-pad encryption/decryption, masking, exclusive OR (XOR) operations on bits when symbols are converted to bits, or extended XOR operations on symbols or obfuscated set of the symbol strings. For example, a key may be combined with another key using an XOR operation and/or extended XOR operation on the bits and/or symbols, respectively, of the key and the other key.

That is, combining a first key (or first set of symbols or first symbol string) with a second key (or second set of symbols or a second symbol string) may be performed using, without limitation, for example: exclusive or (XOR) operations on corresponding symbols of the first and second keys (e.g. converting the symbols of the first and second keys into bit strings and performing bitwise XOR); bitwise XOR operations when the symbols of the first and second keys are bit symbols; extended XOR operations on the corresponding symbols of the first and second keys (e.g. using a mathematically defined extended set of "symbol XOR" operations on symbols that preserve the mathematical properties of bitwise XOR operations); OTP functions and the like such as, without limitation, for example, modulo addition or subtraction would be an appropriate alternative (−(A−B) mod n→C, working with symbol values of [0 . . . N−1]);

one-time-pad encryption of the set of symbols of the first key and the set of symbols of the second key; and/or any other trapdoor or encryption operation on the set of symbols of the first key and set of symbols of the second key and the like.

Although the following examples describe using XOR and/or XOR-type operations, this is by way of example only and the invention is not so limited, it is to be appreciated by the skilled person that the XOR operations and/or combinations of symbol strings, keys and the like as described herein with reference to FIGS. 1a to 5b may be substituted with any suitable type of function, OTP function and/or operation including, without limitation, for example bitwise XOR operations when the symbols of the first and second keys are bit symbols; extended XOR operations on the corresponding symbols of the first and second keys (e.g. using a mathematically defined extended set of "symbol XOR" operations on symbols that preserve the mathematical properties of bitwise XOR operations); one-time-pad encryption of the set of symbols of the first key and the set of symbols of the second key; and/or any other trapdoor or encryption operation on the set of symbols of the first key and set of symbols of the second key and the like; modulo addition or subtraction would be an appropriate alternative (−(A−B)mod n→C, working with symbol values of [0 . . . N−1]) and the like; and/or any other suitable mathematical function or operation that may be used to cryptographically combine or simply combine symbol strings, first and second keys, intermediate keys, meeting key values, and/or the like to create a suitable group key and the like; combinations thereof; modifications thereto; and/or as herein described and/or as the application demands.

FIG. 1a is a schematic diagram illustrating an example group key creation/formation meeting and communication system 100 that includes a plurality of parties 102a-102m in communication with an intermediary (e.g. a Meet Me server, also known as Meeting Aggregation Service, or WhatsApp® server, MS Teams® server) for arranging a group meeting with the plurality of parties 102a-102m. A Meeting Aggregation Service 104 is an untrusted server who helps the group of parties to negotiate a group key by aggregating the intermediate key values and sending them back to the parties to enable them the calculate the group key. The Meeting Aggregation Service 104 is never aware of the group key, nor can calculate it from the information it has. Parties will communicate with the Meeting Aggregation Service 104 over an insecure channel. The meeting Aggregation Service 104 will be provided by a cloud service such as Quantum-Cloud™ or by customer hosted services (such as in a customer datacentre or even on a drone). The Meeting Aggregation Service 104 comprises a Meeting Aggregation Node (not shown).

The system 100 may further include a Meeting Orchestration Service (not shown). The Meeting Orchestration Service is an untrusted server who helps the group of parties to negotiate a group key by coordinating key agreements between parties and messages between the parties and the Meeting Aggregation Service. The Meeting Orchestration Service is never aware of the group key, nor can calculate it from the information it has. Parties 102a-102m will communicate with the Meeting Orchestration Service over a quantum secure channel such as provided by Quantum-Cloud™. The Meeting Orchestration Service will be provided by a cloud service such as QuantumCloud™. The Meeting Orchestration Service comprises a Meeting Orchestration Node (not shown).

In this example, there is an N number of distinct parties 102a-102m (e.g. Party 0, Party 1, Party 2, Party 3, Party 4, . . . and, Party N–1) that have been arranged to attend the group meeting or a group communication session and the like. In order to secure the group meeting between the N parties 102a-102m, each of the parties 102a-102m are involved in performing a group key formation/negotiation to create a group key that is unknown to the intermediary 104 (e.g. the Meeting Aggregation Node). The group key is also unknown to the Meeting Orchestration Service. The intermediary 104 or the Meeting Orchestration node (not shown) of the Meeting Orchestration Service may be configured to arrange the parties 102a-102m into an ordered ring and notify each of the parties 102a-102m over secure communication channels 106a-106m of the reference/address of one or more of the other adjacent parties 102a-102m for use in communicating with the respective or corresponding other adjacent parties 102a-102m for assisting the parties 102a-102m in each negotiating and creating the group key. It is assumed that, when required to do so, each of the parties 102a-102m in the ordered ring may be configured to communicate with an adjacent party of the other parties 102a-102m directly over one of the secure channels 107a-107m and/or through intermediate device 104 via secure channels 106a-106m.

For example, assuming the intermediary orders the plurality of N parties 102a-102m into a ring in which, for simplicity and without limitation, for example party 102a is the first or 0-th party in the ring, party 102b is the second or 1-th party in the ring, and so on, until party 102m is the (N–1)-th party in the ring, then each party in the ring is provided with the connection details of the previous adjacent party and next adjacent party to said each party in the ring. For example, the first party 102a in the ring may be configured to connect/communicate with the next adjacent party or second party 102b in the ring in the clockwise direction, and also configured to connect/communicate with the previous adjacent party or (N–1)-th party 102m in the ring in the anti-clockwise direction. As well, the second party 102b in the ring may be configured to connect/communicate with the next adjacent party or third party 102c in the ring, and also configured to connect/communicate with the previous adjacent party or 0-th party 102a in the ring, etc. Thus, each party (e.g. party 102a) may then "share", "establish" or "negotiate" a first key with the next adjacent party (e.g. second party 102b) in the ring, and also each party (e.g. party 102a) may be configured to share, establish or negotiate another second key with the previously adjacent party (e.g. party 102m) in the ring. These first and second keys for each party that are shared/negotiated/established with the next adjacent party and previously adjacent party in the ring, respectively, may be shared/negotiated/established using any suitable key sharing/negotiating/establishment protocol/procedure. The key sharing/negotiating/establishment protocol/procedure may be performed between a party and the previous or subsequent adjacent party. This key sharing/negotiation may include using the intermediary 104 or any other third party device/service and the like.

Thus the intermediary 104 notifies each of the parties 102a-102m the reference/address of precisely two other parties 102a-102m, i.e. the previous adjacent party and the subsequent adjacent party in the ring to the party (e.g. the one before it in the ring, and the one after it in the ring) so they may communicate during the group key creation process for sharing/exchanging a key for use in the group key sharing protocol. Each of the secure channels 106a-106m and/or 107a-107m may be, without limitation, for example either a classical/standard secure communication channel (e.g. e.g. symmetric encrypted, public key encrypted, RSA encrypted, AES encrypted) or a quantum secure communication channel (encrypted with a quantum-safe/secure distributed key) depending on the desired security of the outcome. As well, it is assumed that each of the parties 102a-102m can communicate with the intermediary 104 over another secure channel 106a-106m such as, without limitation, for example a classical or standard secure communication channel or a quantum secure communication channel depending on the desired security, which may assist in protecting information about the ring formation rather than protecting the meeting and intermediate keys.

For example, one or more of the secure channels 107a-107m between the parties 102a-102m, and/or one or more secure channels 106a-106m between each party 102a-102m and the intermediary 104, may be a quantum-secure channel. A quantum-secure communications channel may comprise or represent a communications channel that is encrypted with a corresponding quantum safe distributed and/or encrypted with a quantum-safe key derived from one or more quantum-safe distributed keys of the set of quantum-safe distributed keys. A quantum-secure channel may use symmetric encryption based on a quantum-safe key that has been agreed upon by each side of the channel. For simplicity, it is assumed that each of the connections or communications channels between the group of parties and/or intermediary may be secured by a pre-established quantum-safe distributed key.

For example, the quantum-safe distributed keys may be generated and distributed using, without limitation, for example a satellite quantum key distribution system configured to perform a satellite quantum key distribution protocol for generating and communicating data representative of a set of quantum distributed keys over quantum/non-quantum satellite channels with quantum transceivers, respectively. In another example, the quantum-safe distributed keys may be generated and distributed using, without limitation for example a terrestrial-based quantum key distribution system configured to perform a terrestrial quantum key distribution protocol for generating and distributing the set of quantum distributed keys using quantum/non-quantum fibre channels with corresponding quantum transceivers, respectively. Although two types of quantum key distribution system is briefly described, this is by way of example only and the invention is not so limited, it is to be appreciated by the skilled person that any type of quantum key distribution protocol and/or quantum key distribution system may be used such as, without limitation, for example satellite quantum key distribution, terrestrial quantum key distribution, satellite/terrestrial hybrid quantum key distribution, and/or any other type of quantum key distribution system, combinations thereof, modifications thereto, as herein described and/or as the application demands.

Referring to FIG. 1a, the parties 102a-102m may be configured to communicate with each other over secure channels 106a-106m via the intermediary as a relay or as in a star network. Alternatively or additionally, the parties 102a-102m may be configured to communicate with the intermediary 104 over the secure channel 106a-106m when communicating with the intermediary 104, and may be configured to communicate over secure channels 107a-107m with each other party 102a-102m over a separate direct secure communication channel 107a-107m with each other party 102a-102m without requiring the intermediary 104 to act as relay.

Although the parties 102a-102m are illustrated as communicating over secure channels 106a-106m and/or secure channels 107*a*-107*m*, this is by way of example only and the invention is not so limited, it is to be appreciated by the skilled person that any type of configuration or arrangement of communication resources, networks and/or secure channels may be applied and/or implemented according to the invention for connecting each of the N parties to the intermediary 104 and/or each of the N parties with each other for negotiating, creating a group key, and subsequently a set of communication channels for using the group key in securing a group meeting and/or group communication session in relation to the plurality of parties 102*a*-102*m* and the like, modifications thereto, combinations thereof, and/or as the application demands.

Figure 1B:
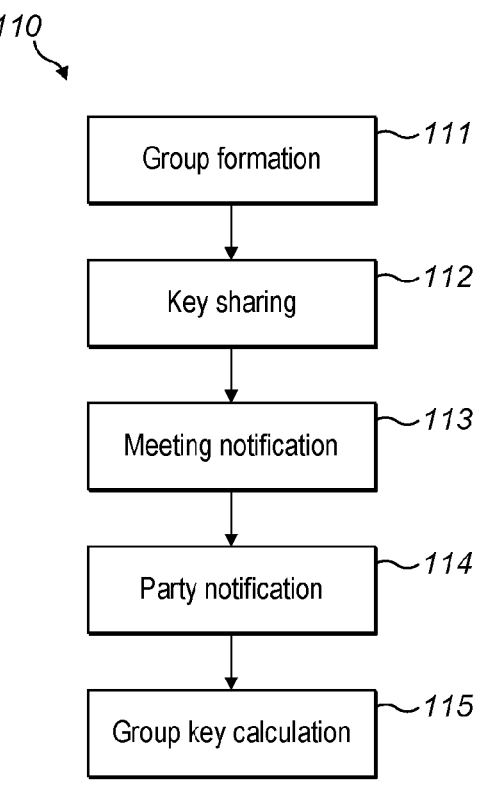
FIG. 1b a flow diagram illustrating an example group key creation/formation process for use with FIG. 1a according to some embodiments of the invention.

FIG. 1*b* is a flow diagram illustrating an example group key creation process 110 for use with group key meeting and communication system 100 as described with reference to FIG. 1*a* according to the invention. For simplicity, reference numerals to features/components/functions and the like of FIG. 1*a* are reused for the same and/or similar features/components/functions and the like. Essentially, the goal of the group key creation process 110 is to create a group key, $K_G$, known to all of the N parties 102*a*-102*m* but which is not known to the intermediary 104 (e.g. Meet Me) or the Meeting Orchestration Service such that the N parties 102*a*-102*m* may securely communicate with each other during, without limitation, for example a group communication session, group meeting, group video/chat conference call/collaboration system and the like, where no other device such as, without limitation, for example the intermediary 104 or an eavesdropper may access the secure communication between parties 102*a*-102*m*. The group key formation process 110 is based on the following steps of:

In step 111, the N parties 102*a*-102*m* that are to be in the group communication/meeting are arranged into a group formation such as an ordered ring as illustrated in FIG. 1*a*. For example, one of the parties or an external actor may notify the intermediary 104 or the Meeting Orchestration Node that a group key is needed for a group meeting/communication etc., where data representative a set of external references (or contact details), {R} of the parties, that are to be included in the group meeting/communication are provided to the intermediary 104. An external reference for a party may comprise or represent any data that enables another device to be able to communicate with said party. For example, an external reference that may include, without limitation, for example data representative of an Internet address of the party, chat identity of the party, an group meeting/communication (Meet Me) service address/identifier provided to the party associated with a group meeting/communication (e.g. Meet Me) application installed on the party; an email address of a user using the party and accessible via an email application on the party, a MAC address of the party and/or any other data that may be used to enable a device to contact/connect/communicate with said party in relation to the group key creation process 110 and/or subsequent group meeting/communication session the like. The set of external references, {R} may be, without limitation, for example, an Internet address; email address of the party; ID of a party/device; phone number associated with the party, username associated with the party; MAC address; Internet Protocol address; and/or any other unique identifier and/or address/contact details that may be used to identify and communicate with or contact the party; combinations thereof; modifications thereto; and/or as the application demands. For example, the intermediary (e.g. Meet Me server) or the Meeting Orchestration Node organises the parties into a numbered sequence that is arranged to be a ring

108, where the first party (or a device associated with the first party) 102*a* connects to the last party (or a device associated with the last party) 102*m* in the numbered sequence to form the ring 108. Thus, each party 102*a*-102*m* is assigned a party identifier such as, without limitation, for example a sequence number or location number, indicating its ordering/location in the ordered ring 108. The intermediary may store the mappings of how each of the parties 102*a*-102*m* in the ring 108 is connected to another of the parties 102*a*-102*m* in the ring 108 when forming/organising the parties into the ring 108. In the case that the reference does not identify the party (e.g. it identifies a user) then there may instead be a mapping from the reference to the party (e.g. map from email address to device IP address).

Referring to FIG. 1*a*, FIG. 1*a* illustrates an ordering of N parties 102*a*-102*m* (e.g. party 0, to party N−1). In this case, the N parties 102*a*-102*m* may be arranged to form a sequence of {Party 0, Party 1, Party 2, Party 3, Party 4, . . . Party p, . . . Party N−1} for $0 \leq p \leq N-1$. The sequence can then form a ring 108 by, for simplicity and by way of example only, connecting Party N−1 to Party 0. Preferably, the intermediary 104 or the Meeting Orchestration Node may internally assign a sequential zero-based index, p, to each Party and map the external reference (e.g. contact details) of each party to its zero-based reference, p. In FIG. 1*a*, each party is assigned a number from 0 to N−1. Once assigned, the intermediary 104 or the Meeting Orchestration Node notifies each of the parties 102*a*-102*m*, via the corresponding communication channel 106*a*-106*m*, of the corresponding external reference (or contact details) of the next adjacent party in the sequence forming the ring 108. Alternatively, the intermediary may map the external reference of the party to the party identifier and sends the external reference instead. For example, the intermediary 104 notifies party 102*a* (Party 0) the external communication reference/contact details of party 102*b* (Party 1); the intermediary 104 notifies party 102*b* (Party 1) the external communication reference/contact details of party 102*c* (Party 2); the intermediary 104 notifies party 102*c* (Party 2) the external communication reference/contact details of party 102*d* (Party 3); the intermediary 104 notifies party 102*d* (Party 3) the external communication reference/contact details of party 102*e* (Party 4); the intermediary 104 notifies party 102*e* (Party 4) the external communication reference/contact details of the next adjacent party in the sequence of the ordered ring and so on, until the intermediary 104 notifies party 102*m* (Party N−1) the external communication reference/contact details of party 102*a* (Party 0). This forms an ordered ring. Although this particular "clockwise" ordering of the parties 102*a*-102*m* is described herein, this is for simplicity, by way of example only and the invention is not so limited, it is to be appreciated by the skilled person that an anticlockwise or "descending" ordering of the ring may be used where the first party is party 102*m* of party N−1 and the last party is party 102*a* of party 0 and the like.

In step 112, each of the parties 102*a*-102*m* in the ring 108 is configured to agree, share, create, negotiate and/or retrieve a precursor cryptographic key with the next adjacent party in the ring 108, or, going in the same direction around the ring 108. For example, for $0 <= p < N-1$, for the p-th party, the next party in the ring 108 is the (p+1)-th party, where for p=N−1, then for the (N−1)-th party 108*m*, the next party in the ring 108 is the 0-th party 102*a*. It is noted that, when N is an odd number, each party 102*a* simply shares, creates and/or negotiates a precursor key with the next adjacent party 102*b* in the ring 108, where the last party 102*m* (e.g. party 102*m* of party N−1) shares, creates and/or negotiates a precursor key with the first party 102$a$ (e.g. party 0) in the ring 108. Thus, each party 102$a$ of the group of parties 102$a$-102$m$ essentially has a first and second precursor key that has been shared, created and/or negotiated with the next adjacent party 102$b$ and previous adjacent party 102$m$ in the ring 108.

However, for even N or an even number N of parties, the ring 108 may be adjusted by reducing the size of the number of parties that contribute precursor keys to the group key formation in the ring 108 to an odd number N−1 of parties and/or by increasing the size of the ring 108 by increasing the number of parties that contribute precursor keys to the group key formation (e.g. by adding a virtual party) to an odd number of N+1 parties. Should this be necessary, there are some slight changes to the overall group key creation process 110, where modifications to group key process 110 may be made based on later examples as described with reference to FIGS. 2 to 3, modifications thereof, combinations thereto, and/or as described herein. For simplicity, the concepts of the group creation process 110 will be described for when N is an odd number.

Furthermore, as an option and to improve security of the final group key and reduce the risk that unknown Parties may be added by the Meeting Orchestration Node to the ring 108 without the organiser of the group knowing, steps 111 or 112 (or, for that matter, any other step in the group creation process 110) may be further modified in which the organising Party 102$a$ of the group of parties or an external actor (e.g. a third party that is different to the intermediary 104) creates and/or sends a one time pad (OTP) key to all other parties 102$b$-102$m$ in the ring 108 or all parties 102$a$-102$m$ in the ring 108 to further secure the group key generated by the group key creation process 110. This may be achieved in the final step of the group key creation process 110 in which the received OTP key is used by each party to further secure the group key by XORing the group key with the OTP key received by each party of the group of parties 102$a$-102$m$. The secured group key may then be used as the group key by each party of the group of parties 102$a$-102$m$ as the application demands. Given that the intermediary 104 does not have access to or know the OTP key, as this was not sent to the intermediary, the intermediary 104 or the Meeting Orchestration Node cannot add further unknown Parties to the ring 108. Should the intermediary 104 attempt to add unknown Parties to the ring 108, then these unknown Parties would not have the OTP key used to derive the group key and so could never know or derive the final group key.

In step 113, once the precursor key sharing/creation/negotiation is completed, for odd N, then each of the parties 102$a$-102$m$ has two different precursor keys. In the example of FIG. 1$a$, each of the parties has the current precursor key generated by said party and also the precursor key of the previous adjacent party in the ring 108. Alternatively, in the example of FIG. 1$a$, each of the parties has the current precursor key negotiated by said party with the next adjacent party in the ring 108, and the previous precursor key of the previous adjacent party in the ring 108 which was negotiated with the current party in the ring 108. Thus, once each party 102$a$-102$m$ has shared or negotiated its precursor key with the next adjacent party, a meeting notification is created by each of the parties by creating a meeting key of the party based on a combining (e.g. performing an XOR operation) the current precursor key with the previous adjacent precursor key (precursor key of the previous adjacent part device). Each party sends a meeting notification including data representative of the meeting key of the party to the intermediate device 104 (for example, to the Meeting Aggregation Node). Each meeting notification may include data representative of the external reference, R, of the party to enable the intermediate device 104 to store the meeting key with the appropriate sequence number, p, assigned to that party. For example, the intermediary 104 (e.g. Meet Me server or the Meeting Aggregation Node) maps the external reference, R, of each party to the internal index, p, which was assigned to said each party during the group formation step 111. This enables the intermediary 104 or the Meeting Aggregation Node to store an association of the meeting key, $M_P$, to the p-th party e.g. stores meeting key $M_P$ vs p.

As an option, the intermediary 104 might also cache all the meeting key values until it's notified that the group key is no longer required. This may enable efficient and/or simple adding or removing of parties, as the only meeting key values that need to be recalculated are those to the left and right of the party being added, where all other meeting key values may stay the same. The new meeting keys and the remaining meeting keys may be used to generate a new set of intermediate key values for all parties, which may then be sent to each party for forming the new group key. If the meeting key values are not cached at the intermediary 104 until the group key is no longer needed, then all meeting key values need to be sent back up from all parties in the ring whenever another party is added or removed from the ring 108. Depending on the security requirements, it may be preferable to cache the meeting key values rather than not caching the meeting key values because of the additional requirement of all parties requiring to send their meeting keys again and this might fail, when one of the parties is offline, which means the whole group key creation/formation process may have to be performed from the beginning for only those parties that are online.

In step 114, once the intermediate device 104 has received all the meeting notifications from each party in the ring 108, the intermediary 104 or the Meeting Aggregation Node calculates an intermediate key for each party based on a combination (e.g. XOR operation) of two or more meeting keys of the parties. For each intermediate key calculation for a party, two or more meeting keys are combined (e.g. one or more XOR operation(s)) in such a manner that the calculated intermediate key, when combined (e.g. an XOR operation) with the corresponding precursor key of said party, results in a group key that is the same when each of the other intermediate keys of all other parties are combined with their corresponding precursor keys. The intermediate keys for each party may be different or unique compared with the intermediate keys of one or more of the other parties. Once the intermediate key for each party has been calculated, the intermediate key is sent as a party notification from the intermediary 104 or the Meeting Aggregation Node to the corresponding party.

In step 115, once each party receives its party notification from the intermediary 104 with the corresponding intermediate key, said each party calculates a group key based on its received intermediate key and its precursor key that it generated/negotiated/retrieved in step 112. For example, the group key may be calculated by the party based on an XOR operation of the intermediate key with the precursor key. This is performed at each party. Thus, each party, p, has established the group key, $K_G$, by XORing the received p-th intermediate key, $X_P$ with its own precursor key, $K_P$ (e.g. $K_G = X_P$ XOR $K_P$). The group key calculated at each party is the same for all parties. The group key, $K_G$, calculated by each of the parties is a combination of all the precursor keys when N is odd.

As an option, if each of the parties 102$a$-102$m$ in the group received an OTP key from the organiser (e.g. another party in the group) and/or an external party as described in step 112, then the OTP key may be included by each party in the group key calculation $K_G$. Thus, each party, p, establishes the group key, $K_G$, by firstly, XORing the received p-th intermediate key, $X_P$ with its own precursor key, $K_P$, and then, secondly XORing this result with the received OTP key (e.g. $K_G=X_P$ XOR $K_P$ XOR OTP). The secured group key calculated at each party is the same for all parties, because each party has the same received OTP key. The group key, $K_G$, calculated in this manner by each of the parties is a combination of all the precursor keys and the OTP key when N is odd.

Thereafter, the group of parties may use the group key, $K_G$, to, without limitation, for example establish a secure group communication session/meeting and/or for any other suitable purpose and the like; and/or as the application demands.

Figure 1C:
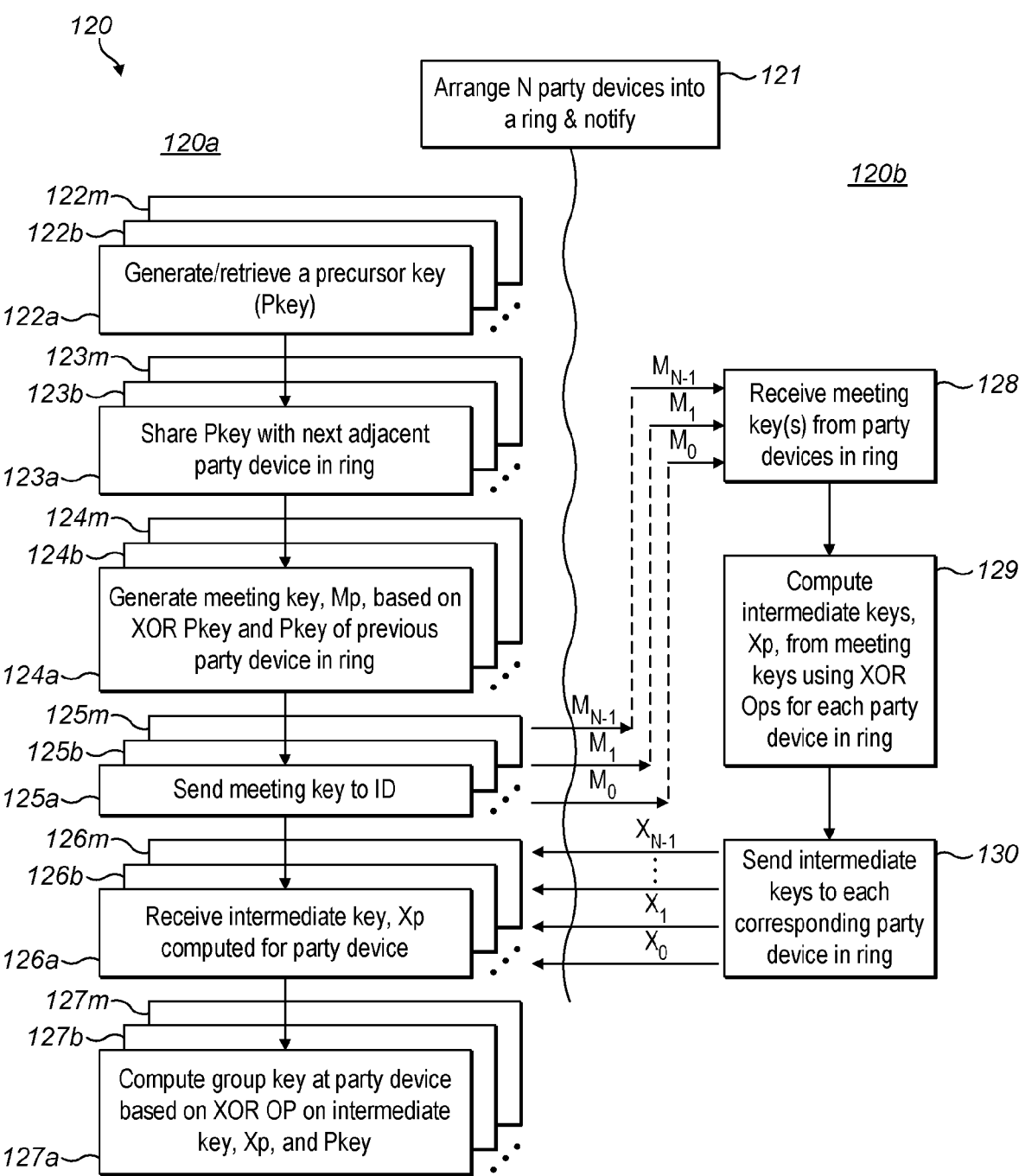
FIG. 1c a flow diagram illustrating another example group key creation/formation process for use with FIG. 1a according to some embodiments of the invention.

FIG. 1c is a flow diagram illustrating another example group key creation process 120 with party group key process 120a and a corresponding intermediary group key process 120b for use with group key meeting and communication system 100 as described with reference to FIG. 1a according to the invention. The group key creation process 110 may be further modified by one or more features and/or steps of the group key creation process 120 of FIG. 1c. For simplicity, reference numerals to features/components/functions and the like of FIG. 1a are reused for the same and/or similar features/components/functions and the like. In this example, there are N parties 102a-102m in communication with an intermediary 104 and/or each other as described previously with reference to FIG. 1a and/or 1b. Each party 102a-102m is configured to implement/operate a corresponding party group key process 120a and the intermediary 104 may be configured to implement/operate the intermediary group key process 128-130. For simplicity, reference is made to steps 122a-127a of the group key process 120a for party 102a, where each other device 102b to 102m each performs corresponding steps 122b-127b; to steps 122m-1227m, respectively, of the group key process 120a. The group key creation process 120 including party group key process(es) 120a and the intermediary group key process 120b is described in the following, where the group key creation process 120 is based on the following steps of:

In step 121, either the intermediary arranges the N parties 102a-102m into an ordered ring 108. Alternatively, another external device, the N-parties and/or an p-th party may be configured to arrange the N parties into an ordered ring 108. In this example, when the number of parties, N, is odd, the following party group key process(es) 120a may be performed for an odd number of parties, where the group key creation process 120 process flow splits into a plurality of corresponding party group creation process(es) 120a performed by each corresponding party, where the party group creation process for party 102a is based on the following steps of:

In step 122a, each p-th party generates a new cryptographic key, $K_P$. In step 123a, each party 102a shares their $K_P$ with the next party 102b in the ring 108 (e.g. Party 0 of party 102a shares its key with Party 1 of party 102b, and so on, where Party N–1 of party 102m shares its key, $K_{N-1}$ with Party 0 of party 102a). Alternatively, in step 122a, each p-th party negotiates or agrees a new cryptographic key, $K_P$, with the next party 102b in the ring 108, for example using a key-negotiation protocol like TLS (e.g. Party 0 of party 102a negotiates a key with Party 1 of party 102b, and so on, where Party N–1 of party 102m negotiates a key, $K_{N-1}$ with Party 0 of party 102a). It is the Meeting Orchestration Service that tells each party N–1 to agree a new key $K_P$. In step 124a, generating a meeting key in which each party XORs the key they agreed, $K_P$, with the key shared/negotiated with it by the previous party, $K_{(P-1+P)\,mod\,N}$, to create the meeting key, $M_P$. In step 125a, each party 102a sends their meeting key $M_P$ to the intermediary 104 (for example, to the Meeting Aggregation Node). For example, meeting keys $M_0$ for party 102a, $M_1$ for party 102b, to $M_{N-1}$ for party 102m are sent to the intermediary 104. The process flow 120a for each party 102a-102m waits until the intermediary 104 has computed the corresponding intermediate keys based on a novel combination of meeting keys for each party. This computation is outlined in the intermediary group creation process 120b. In any event, once the intermediate key for each party 102a has been computed, the intermediary 104 or the Meeting Aggregation Node returns/sends the intermediate key, $X_P$, to the corresponding party 102a. In step 126a, each party 102a receives its corresponding intermediate key, $X_P$. In step 127a, each party computes a group key, $K_G$, based on XOR operation on the intermediate key, $X_P$, with the precursor key, $K_P$. For example, party 102a XORs its key, $K_P$, with $X_P$ to form the group key $K_G$. All other parties 102b-102m do the same with their corresponding intermediate keys and corresponding precursor keys and the like. Thereafter, each of the parties 102a-102m have the same group key, $K_G$.

From step 125a-125m to step 126a-126m, the group creation process 120 moves onto the intermediary group creation process 120b for calculating the intermediate keys. The intermediary group creation process 120b is based on the following steps of: In step 128, the intermediary receives meeting key(s) from each of the party(s) (or most of the parties, or all the parties plus a virtual party, when N is even) in the ring to form an odd number of meeting key(s). In step 129, the intermediary or the Meeting Aggregation Node computes, for each party, P, the corresponding intermediate key, $X_P$, based on a novel XOR combination of the meeting key, $M_P$, with two or more other meeting keys $M_i$. The intermediate key, $X_P$, is a value or key related to the p-th party. For example, when N is odd, the intermediary computes the intermediate key for the p-th party based on the following: for P=0, $X_0$=XOR{r=2 to N–1 step 2}$M_r$; for 0<P<N, $X_P=X_{P-1}$ XOR $M_P$.

Furthermore, as an option and to improve security of the group key, $K_G$, and reduce the risk that unknown Parties may be added to the ring 108 without the organiser of the group knowing, prior to the corresponding group key calculation step 127a-127m performed by each of the parties 102a-102m, the party group key process 120a may be further modified in which the organising Party 102a of the group of parties or an external actor (e.g. a third party that is different to the intermediary 104) is configured to include a step of creating and/or sending a one time pad (OTP) key to all other parties 102b-102m in the ring 108 (if the organising party is Party 102a) or all parties 102a-102m in the ring 108 (if it is an external party different to the group of parties and the intermediary 104) to further secure the group key, $K_G$ generated by the party group key process 120a. Thus, when each of the parties 102a-102m in the group receive the OTP key from the organiser (e.g. another party in the group) and/or an external party, then the OTP key may be included by each party in the group key calculation $K_G$ of the corresponding step 127a-127m for that party 102a-102m. Thus, in step 127a-127m, each party, p, establishes the group key, $K_G$, by firstly, XORing the received p-th intermediate key, $X_P$ with its own precursor key, $K_P$, and then, further XORing this result with the received OTP key (e.g. $K_G=X_P$ XOR $K_P$ XOR OTP key). The secured group key calculated by each of the parties 102a-102m is the same for all parties, because each party has the same received OTP key. The group key, $K_G$, calculated in this manner by each of the parties is a combination of all the precursor keys and the OTP key when N is odd. The secured group key, $K_G$, is still the same for all parties 102a-102m and may then be used as the group key by each party of the group of parties 102a-102m as the application demands.

Note that there are slight modifications to process(es) 120a and 120b if the number of parties N is even, where these modifications are described below in the detailed description with reference to FIGS. 3 and 4, with two distinct cases: Even Case A, is based on the final Party of party 102m being omitted from the calculation to temporarily reduce the ring 108 to make an odd number of parties for calculating the group key, but where the final party or party 102m would still receive the group key i.e. it just does not contribute towards its generation; and Even Case B, is based on temporarily increasing the ring 108 by adding an extra precursor key of a virtual party that is "virtually shared" between the last party 102m and first party 102a to make an odd number of parties for calculating the group key.

Figure 1D:
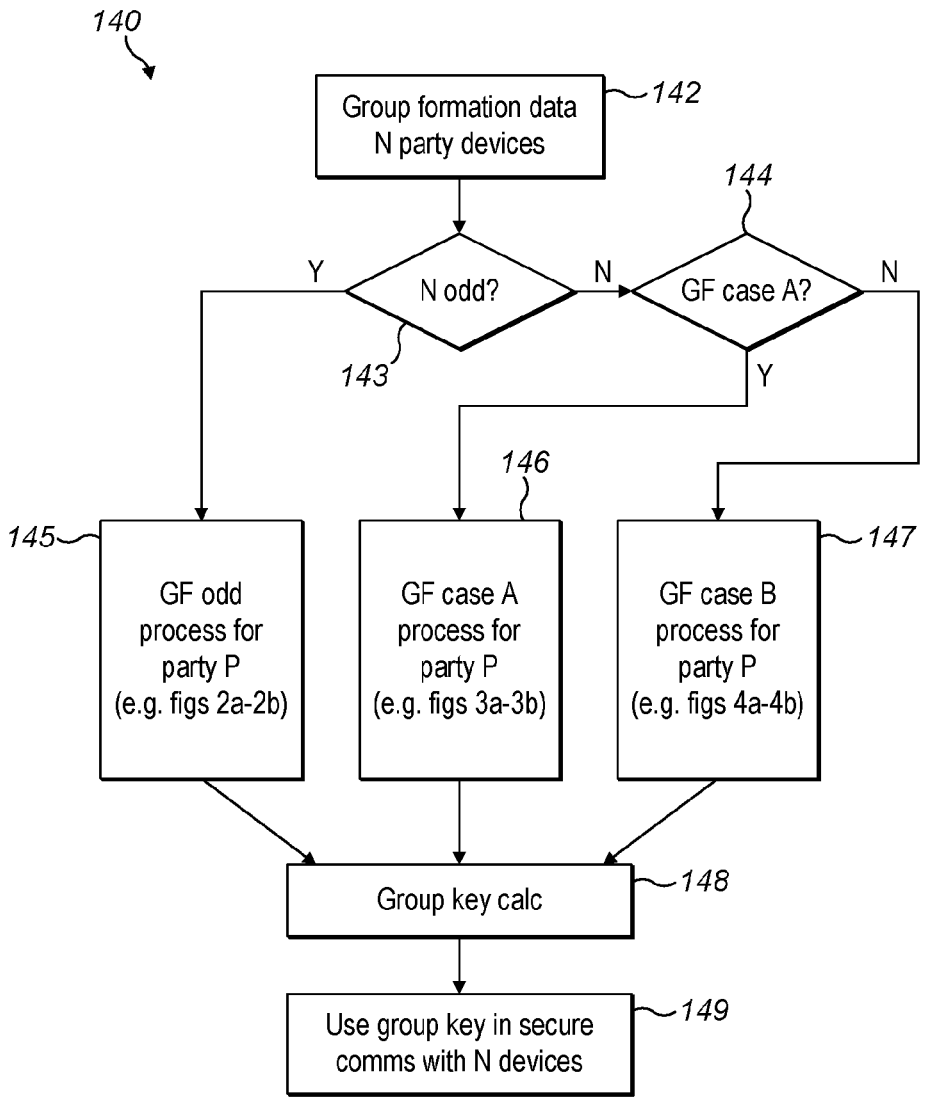
FIG. 1d a flow diagram illustrating a further example group key creation/formation process for use with FIG. 1a according to some embodiments of the invention.

FIG. 1d is a flow diagram illustrating another example of a group key creation/formation process 140 for a group of N parties according to the invention. The group key creation/formation process 140 includes the following steps of:

Step 142, each of the parties 102a-102m may be provided with group formation data such as data representative of an indication of the number of parties (or devices associated with said parties) or whether there is an odd number N of parties (or associated devices), and/or whether there is an even number of parties (or associated devices) and which Cases A or B will be performed by each party and intermediary 104 when negotiating and creating the group key for all parties (or associated devices).

Step 143, each of the parties (or devices associated with each of the parties) 102a-102m is instructed or determines from the group formation data whether N is odd, and if N is odd (e.g. Y), then said each of the parties 102a-102m and also the intermediary 104 performs the same corresponding group key formation process 145 for when N is an odd number and proceeds to step 145. When each of the parties (or associated devices) 102a-102m is instructed or determines from the group formation data whether N is even (e.g. N), then said each of the parties 102a-102m and also the intermediary 104 performs step 144 to determine which Even Case A or B is to be used for performing the group key formation process. Alternatively, the parties don't really need to know the number N, rather the intermediary/node 104 simply instructs the first party 102a and last party 102m about what they need to do if the number N is even (i.e. whether the last party 102m needs to create a virtual node, or whether the first party 102a needs to share/negotiate keys with the penultimate (or last but one) party (e.g. skips the last party 102m).

Step 144, each of the parties (or associated devices) 102a-102m is instructed or determines from the group formation data, when N is even, whether Even Case A is selected to be performed or not, otherwise Even Case B is to be performed. When Case A is to be performed (e.g. 'Y') then the group formation process 140 proceeds to step 146 for each of the parties (or associated devices) 102a-102m and also the intermediary 104. Otherwise, when Case A is not to be performed (e.g. 'N'), then the process 140 proceeds to step 147, where Even Case B of the group formation process for each party and/also the intermediary is performed.

Step 145, when N is odd, the corresponding steps of the group formation process for odd number N of parties is performed by each of the parties 102a-102m and also the corresponding steps of the group formation process for odd number N of parties is performed by the intermediary 104, which outputs the corresponding intermediate keys to each of the parties 102a-102m. Step 145 may be further supplemented and/or modified with the steps of the group key formation process(es) 110 and 120 as described with reference to FIGS. 1a to 2. The process proceeds to step 148 for calculating the group key device on each of the parties 102a-102m.

Step 146, when N is even and Case A is selected to be performed, the corresponding steps of the group formation process for an even number N of parties is performed based on case A, where the ring 108/208 is temporarily reduced, by each of the remaining parties 102a-102m in the ring 108/208 and also the corresponding steps of the group formation process for even number N of parties in case A is performed by the intermediary 104, which outputs the corresponding intermediate keys to each of the parties 102a-1021. Step 146 may be further supplemented and/or modified with the corresponding steps of the group key formation process(es) and/or system(s) 100, 110, 300 when N is even for case A as described with reference to FIGS. 1a to 3, modifications thereof and/or as herein described. The process proceeds to step 148 for calculating the group key device on each of the parties 102a-102m.

Step 147, when N is even and Case B is selected to be performed, the corresponding steps of the group formation process for an even number N of parties is performed based on case B, where the ring 108/208 is temporarily increased by including a virtual party/key, and each of the parties 102a-102m in the ring 108/208 perform the corresponding steps of the group formation process for even number N of parties for case B, the reciprocal/corresponding steps of which are also performed by the intermediary 104, which outputs the corresponding intermediate keys to each of the parties 102a-102m. Step 146 may be further supplemented and/or modified with the corresponding steps of the group key formation process(es) and/or system(s) 100, 110, 400 when N is even for case B as described with reference to FIGS. 1a to 4, modifications thereof and/or as herein described. The process proceeds to step 148 for calculating the group key device on each of the parties 102a-102m.

In step 148, each of the parties 102a-102m receives an intermediate key and uses this to calculate the same group key based on their precursor key and/or another precursor key depending on whether N is odd (e.g. (e.g. $K_G = X_P$ XOR $K_P$) or even and, if even, whether case A or case B is being performed.

In step 149, each of the parties 102a-102m may now use the group key that each has calculated in a secure group communication session and/or meeting with each other and the like.

Furthermore, as an option and to improve security of the group key and reduce the risk that unknown Parties may be added to the ring 108 without the organiser of the group knowing, prior to the corresponding group key calculation step 148 performed by each of the parties 102a-102m, the group key creation/formation process 140 may be further modified in which an organising Party 102a of the group of parties or an external actor (e.g. a third party that is different to the intermediary 104) is configured to include a step of creating and/or sending a one time pad (OTP) key to all other parties 102b-102m in the ring 108 except the intermediary 104 (e.g. when the organising party is Party 102a) or all parties 102a-102m in the ring 108 except the intermediary 104 (when it is an external party different to the group of parties and the intermediary 104) to further secure the group key, K_G generated by the party group key creation/formation process 140. Thus, when each of the parties 102a-102m in the group receive the OTP key from the organiser (e.g. another party in the group) and/or an external party, then the OTP key may be included by each party in the group key calculation K_G of the corresponding step 148 for that party. For example, in step 148, each party, p, may calculate and establishes the group key based on the received intermediate key, their precursor key, the received OTP key (e.g. $K_G=X_P$ XOR $K_P$ XOR OTP key). The secured group key calculated by each of the parties 102a-102m is the same for all parties, because each party has the same received OTP key. The group key calculated in this manner by each of the parties is a combination of all the precursor keys and the OTP key when N is odd. The secured group key, K_G, is still the same for all parties 102a-102m and may then be used as the group key by each party of the group of parties 102a-102m as the application demands.

Figure 1E:
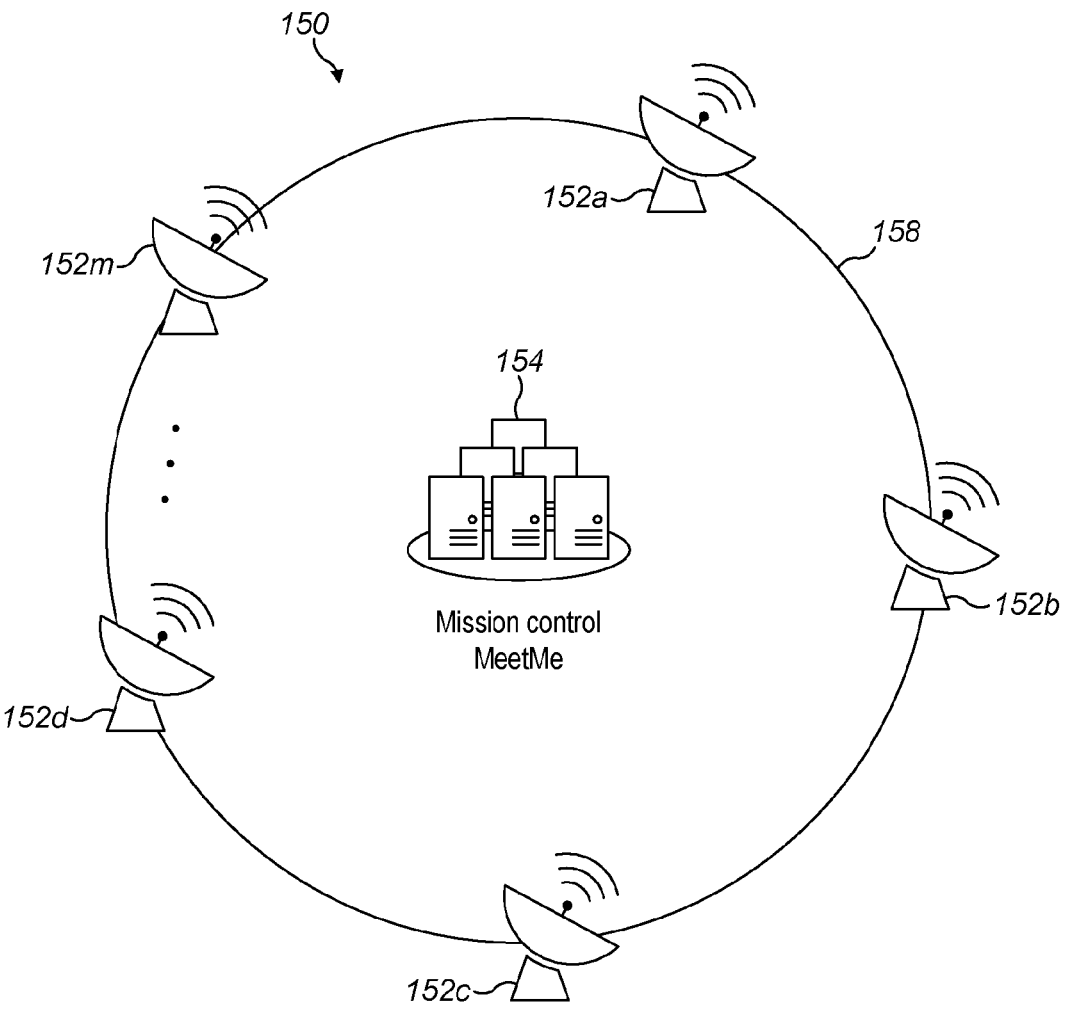
FIG. 1e is a schematic diagram illustrating another example group key creation/formation system according to some embodiments of the invention.

FIG. 1e is a schematic diagram illustrating an example system 150 that includes a plurality of party optical ground receiver stations (OGRSs) 152a-152m in communication with an Mission Control/MeetMe intermediary 154 that are configured to implement the group key creation/formation process(es) as described with reference to FIGS. 1a to 1d and/or 2 to 5b for arranging a group key for use by the plurality of party OGRSs 152a-152m. In this example, the group of party OGRs 152a-152m are arranged to form a ring 158 in which the first OGR 152a is arranged to be connected to the last OGR 152m, which is the previous adjacent OGR in the ring 158 to OGR 152a.

Figure 1F:
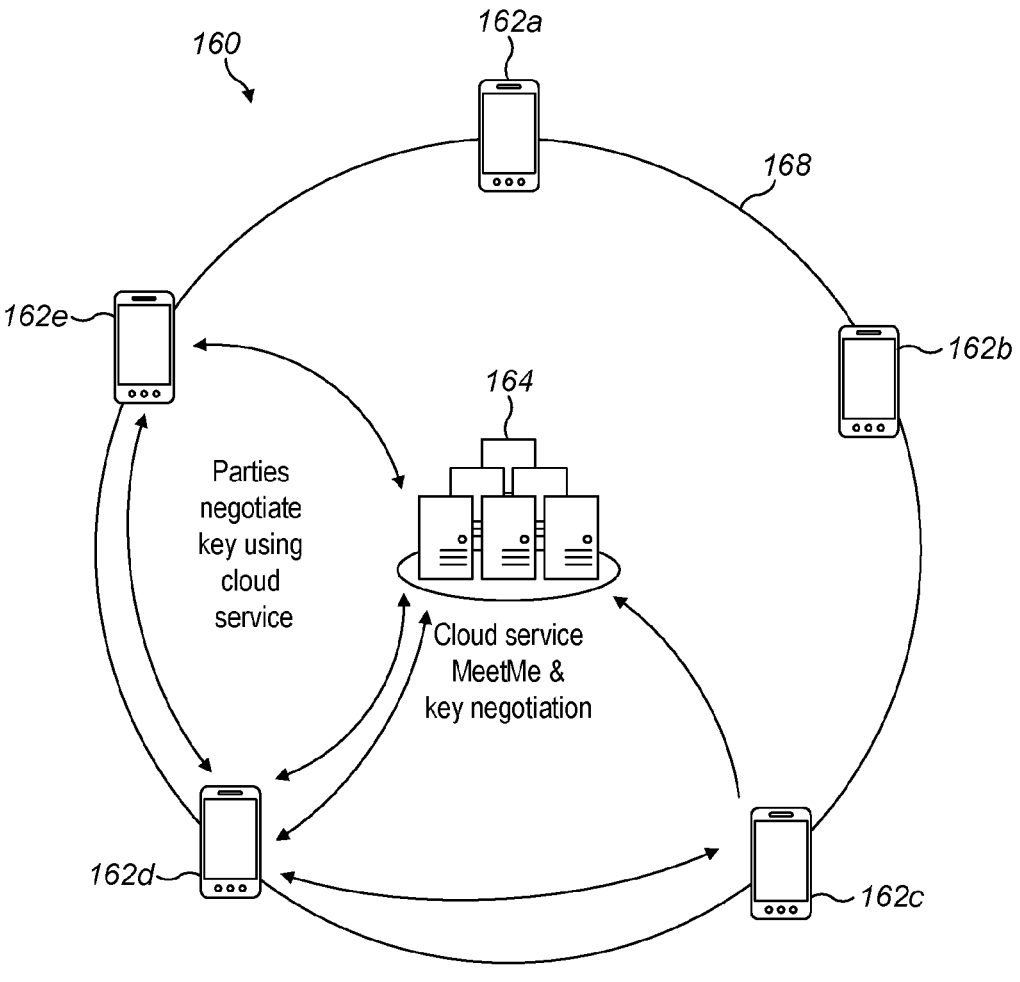
FIG. 1f is a schematic diagram illustrating yet another example group key creation/formation system according to some embodiments of the invention.

FIG. 1f is a schematic diagram illustrating an another example system 160 that includes a plurality of party user devices 162a-162m in communication with an Cloud MeetMe and Key negotiation service intermediary 164 that are configured to implement the group key creation/formation process(es) as described with reference to FIGS. 1a to 1d and/or 2 to 5b for arranging a group key for use by the plurality of party user devices 162a-162e. In this example, the group of party user devices 162a-162e are arranged to form a ring 168 in which the first party device 162a is arranged to be connected to the last party device 162e, which is the previous adjacent party user device 162e in the ring 168 to party user device 162a. As well, in this example, each party user device 162d of the party user devices 162a-162e is configured to communicate with and use the Cloud Key negotiation service intermediary 164 to negotiate and/or share a precursor key with the next adjacent party user device 162e in the ring 168 and also each party user device 162d of the party user devices 162a-162e is configured to communicate with and use the Cloud Key negotiation service intermediary 164 to negotiate and/or share another precursor key with the previous adjacent party user device 162c in the ring 168. The precursor keys are then used in the group key formation process used to implement and form the group key between the user devices 162a-162e and intermediary 164 and the like.

Figure 1G:
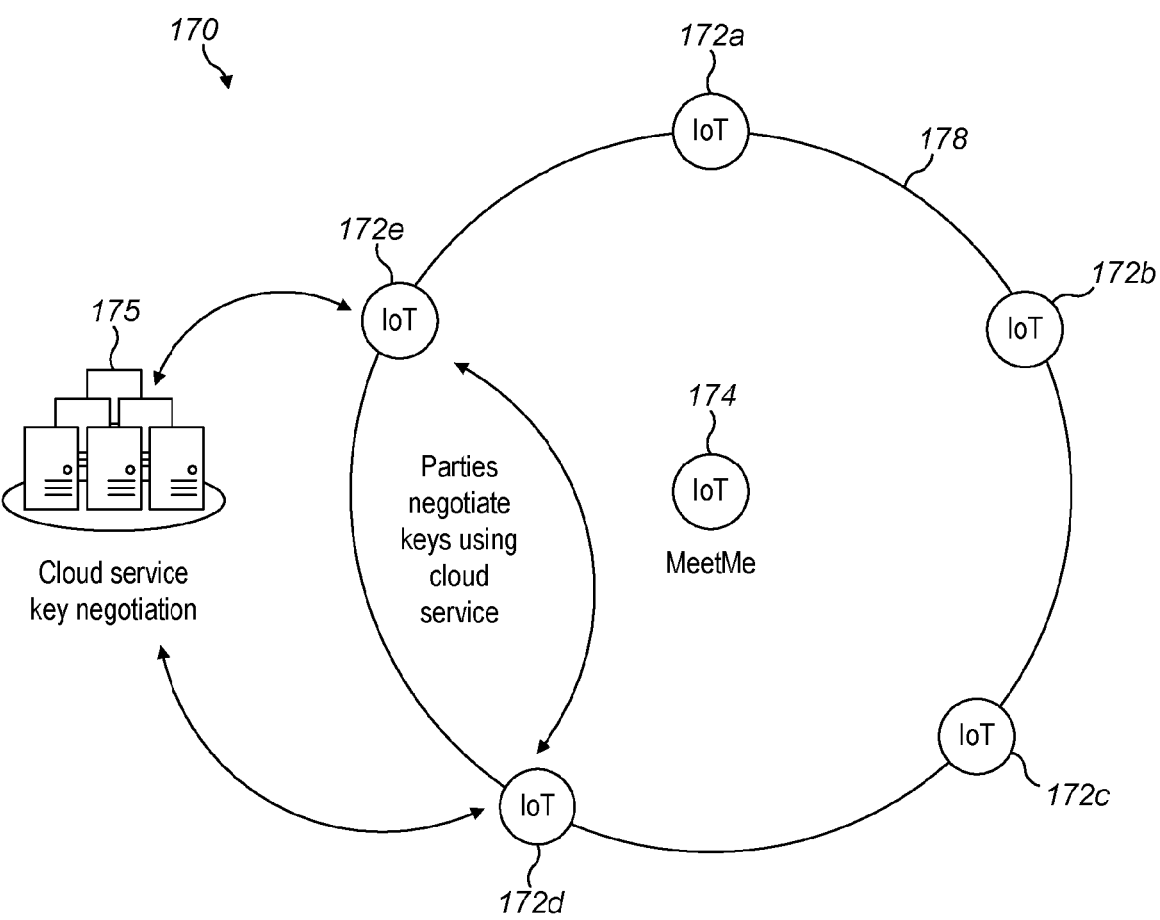
FIG. 1g is a schematic diagram illustrating a further example group key creation/formation system according to some embodiments of the invention.

FIG. 1g is a schematic diagram illustrating an a further example system 170 that includes a plurality of party internet of things (IoT) devices 172a-172e in communication with an Cloud MeetMe IoT intermediary 174 that are configured to implement the group key creation/formation process(es) as described with reference to FIGS. 1a to 1d and/or 2 to 5b for arranging a group key for use by the plurality of party IoT devices 172a-172e. In this example, the group of IoT devices 172a-172e are arranged to form a ring 178 in which the first party IoT device 172a is arranged to be connected to the last party IoT device 172e, which is the previous adjacent party IoT device 172e in the ring 178 to party IoT device 172a. As well, in this example, each party IoT device 172d of the party IoT devices 172a-172e is configured to communicate with and use the Cloud Key negotiation service intermediary 175 (e.g. a third party) to negotiate and/or share a precursor key with the next adjacent party IoT device 172e in the ring 178. The Cloud Key negotiation service intermediary 175 is also used by the other IoT devices 172a-172e to negotiate precursor keys with the previous and next adjacent IoT devices 172a-172e as described herein. The precursor keys are then used in the group key formation process used to implement and form the group key between the IoT devices 172a-172e and IoT intermediary 174 and the like.

Figure 2:
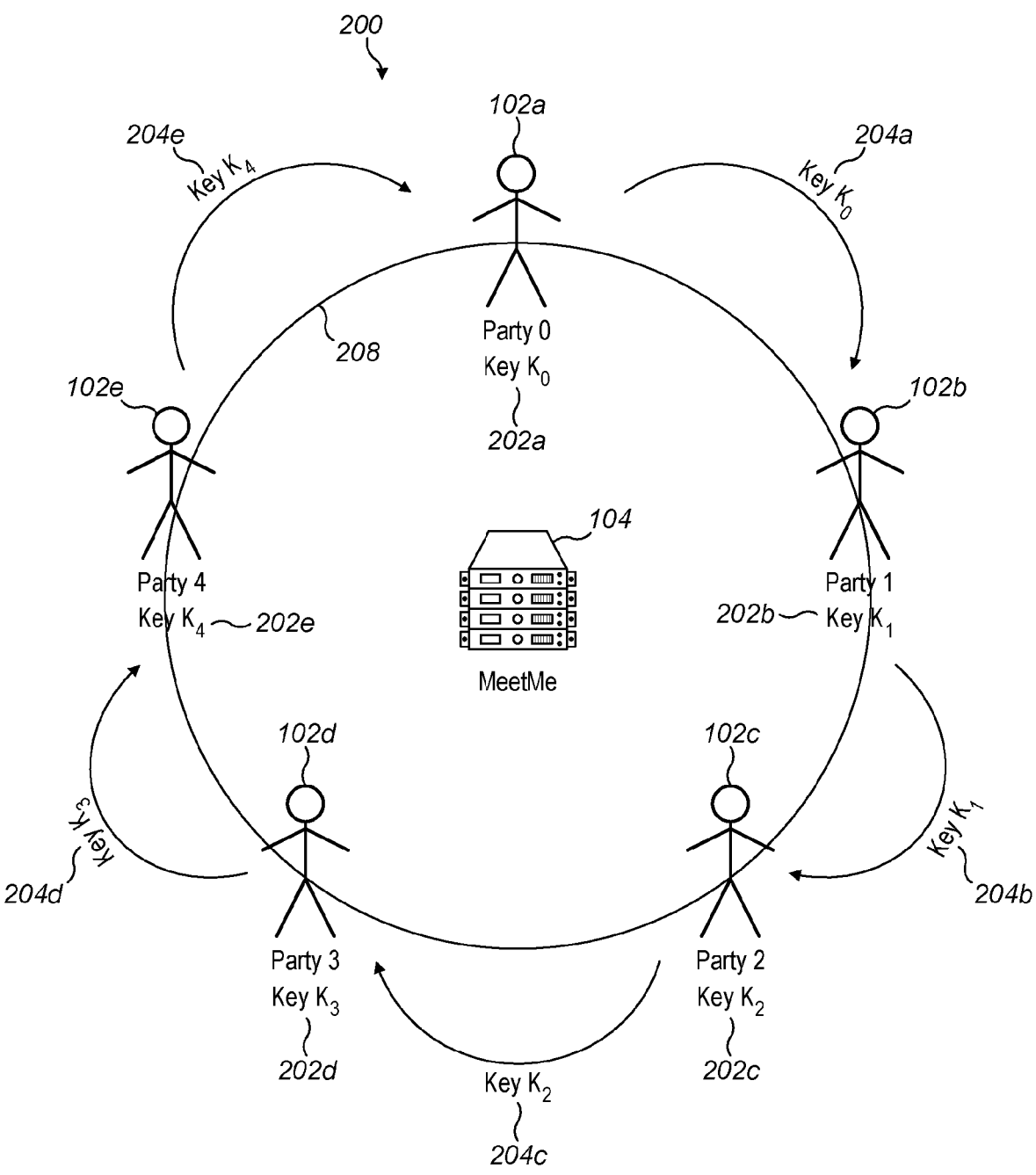
FIG. 2 schematic diagram illustrating another example group key creation/formation system for odd N according to some embodiments of the invention.

FIG. 2 is a schematic diagram illustrating an example group key creation/formation meeting and communication system 200 of FIG. 1a for an odd number N of parties 102a-102e in communication with intermediary 104 (e.g. a Meet Me server or WhatsApp® server, MS Teams® server) that are configured for creating a group key as described with reference to FIGS. 1a to 1d and arranging a group meeting with the parties 102a-102e. In this example, the number of parties is, without limitation, for example N=5 parties 102a-102e (e.g. Party 0, Party 1, Party 2, Party 3, Party 4) that have been arranged to attend the group meeting or a group communication session and the like. In order to secure the group meeting between the N parties 102a-102e, each of the parties 102a-102e are involved in performing a group key formation/negotiation to create a group key that is unknown to the intermediary 104. The intermediary 104 may be configured to arrange and notify each of the parties 102a-102e over secure communication channels (not shown) of the reference/address of one or more of the other parties 102a-102e for use in communicating with the respective or corresponding other parties 102a-102e for assisting the parties 102a-102e in each negotiating and creating the group key. It is assumed that, when required to do so, each of the parties 102a-102e may be configured to communicate with another of the parties 102a-102e directly over one of the secure channels 204a-204e (e.g. similar to channels 107a-107e) and/or through intermediate device 104 via corresponding secure channels and the like and/or as described herein. For example, the intermediary 104 may be a cloud service intermediary, and so each of the parties 102a-102e are configured to negotiate a key or group key through the cloud intermediary service 104.

In this example, the formation of the group and hence the ring 208 may be performed on request by a Party of the N parties 102a-102e, or by an external actor, which notifies the intermediary 104 (e.g. Meet Me) that a group key for the group communication session/meeting is required. This request may include, without limitation, for example, the set of external references/contact details, {R} of the Parties 102a-102e that are to be included in the group. The intermediary and/or other party may arrange or organises the parties 102a-102e of the Parties into a ring 208 as illustrated in FIG. 2a, where the parties 102a-102e are arranged into a sequence of {Party 0, Party 1, Party 2, Party 3, Party 4}. For example, this may be achieved by the intermediary 104 internally assigning sequential zero-based index, p, to each Party and mapping the external reference of each party of a Party to its zero-based reference, p. The intermediary 104 notifies each of the Parties via the parties 102a-102e of the external reference of the next Party in the ring 208. In this example, Party 0 102*a* receives the external reference of Party 1 102*b*, Party 1 102*b* receives the external reference of Party 2 102*c*, Party 2 102*c* receives the external reference of Party 3 102*d*, Party 3 102*d* receives the external reference of Party 4 102*e*, and Party 4 102*e* receives the external reference of Party 0 102*a*. Therefore each Party, p, for $0<=p<N$ (e.g. N=5 in this example) now has the external reference to the next adjacent party in the ring 208.

Thus, all of the parties 102*a*-102*e* have the necessary details to begin the precursor key sharing/negotiation stage of the group formation/creation process for creating or forming a group key. In this example, the precursor key sharing proceeds based on the following: Each of a party, p, creates/retrieves a precursor key, $K_P$. Once created/retrieved, each of a party shares over a secure communication channel 202*a*-202*e* its precursor key, $K_P$, with the next party in the ring 208. Therefore, for $0<=p<N$ each of a party, p, (or p-th party) now has its precursor key, $K_P$, and the precursor key $K_{(P-1+N)mod\ N}$ from the previous Party in the ring 208. Alternatively in this example, the precursor key negotiation proceeds based on the following: Each of a party, p, negotiates a precursor key, $K_P$ with the next party, (p+1)mod N using, for example, the services of a quantum-secure service. Therefore, for $0<=p<N$ each of a party, p, (or p-th party) now has its precursor key, $K_P$, and the precursor key $K_{(P-1+N)mod\ N}$ from the previous Party in the ring 208.

Thus, the party 102*a*-102*e* may now create a meeting notification (e.g. Meet Me or the Meeting Aggregation Node Notification), in which, for $0<=p<N$, each party of Party, P, calculates the XOR of its precursor key, $K_P$, and the previous Party's precursor key, $K_{(P-1+N)mod\ N}$, to create a meeting key, $M_P=K_P$ XOR $K_{(P-1+N)mod\ N}$, of the p-th party. Each party of Party, P, sends a meeting notification including data representative of $M_P$ to the intermediary 104 (e.g. Meet Me or the Meeting Aggregation Node) along with its external reference, R, which allows the intermediary 104 to map the p-th meeting key to the p-th device/party in the ring 208 that it formed. For example, the intermediary stores a mapping of $M_P$ vs P.

Now, the intermediary 104 (or Meeting Aggregation Node) calculates the intermediate keys, $X_P$, for each of the $0<=p<N$ parties, which are each sent in a party notification to the corresponding party. For example, for each Party, p, $0<=p<N$, the intermediary 104 calculates an intermediary key, $X_P$, based on: for party 102*a* with Party P=0, the intermediary calculates the intermediate key by XORing together all alternate meeting notifications starting at the third party, as $X_0=XOR\{r=2$ to $N-1$ step $2\}M_r$ for the remaining parties 102*b*-102*e* with Party $0<P<N$, the intermediary 104 calculates $X_P=X_{P-1}$ XOR $M_P$. Once calculated, the intermediary 104 (e.g. Meet Me or Meeting Aggregation Node) notifies or sends data representative of the intermediate key, $X_P$, to p-th party of Party P for all N. In this example, N=5.

Once each party of the parties 102*a*-102*e* receives its intermediate key, that party may calculate the group key, $K_G$, using its precursor key, $K_P$. For example, each the party of Party, P, (or the p-th party) establishes its own group key by XORing the received $X_P$ that it received from the intermediary 104 with its own precursor key, $K_P$. Thus, the group key may be calculated at each p-th party based on $K_G=X_P$ XOR $K_P$, for $0<=p<N$.

Referring to any of the group key formation/creation process(es) 110, 120, 140 and step 145, and 200 as described with reference to FIGS. 1*a* to 1*g* and 2, combinations thereof, modifications thereto and the like, the following is a worked example of creating a group key for a group of N parties when N is an odd number greater than 2. Each of the group key formation/creation process(es) 110, 120, 140 and step 145, 200 as described with reference to FIGS. 1*a* to 1*g* and 2 may be further modified and/or adapted based on the concepts and/or steps of the following worked example, combinations thereof, modifications thereto and/or as herein described. For simplicity, reference numerals of FIGS. 1*a* to 2 may be reused for similar or the same features, components, steps and/or process(es) and the like. In the following worked example, the number of parties in the group is N=5, and the 5 parties arranged as Party 0 to Party 4 of corresponding parties 102*a*-102*e* as described with reference to FIG. 2*a*.

Referring to FIG. 1*a* or 2*a*, after the ring 108 or 208 has been formed for N=5, each party 102*a*-102*e* knows (or has been notified by the intermediary 104) of the sequence number or location, p, (e.g. $0<=p<=4$) they are positioned within the ordered ring 208 and also the reference/contact details of one or more other parties such as at least the next adjacent party in the ring 208, the group key formation process when N is odd includes the following main steps of: A) Precursor key sharing/negotiating (e.g. steps 122*a*-122*m* of process 120*a* of FIG. 1*c* or step 112 of process 110 of FIG. 1*b*); B) Meeting notification (e.g. steps 124*a*-124*m* and 125*a*-125*m* of process 120*a* and step 128 of process 120*b* of FIG. 1*c* or step 113 of process 110 of FIG. 1*b*); C) Party Notification (e.g. steps 129 and 130 of process 120*b* and steps 126*a*-126*b* of process 120*a* and of FIG. 1*c* or step 114 of process 110 of FIG. 1*b*); and D) Group key calculation (e.g. steps 127*a*-127*m* of process 120*a* of FIG. 1*c*, or step 115 of process 110 of FIG. 1*b*).

In step A), the precursor sharing/negotiating step of the group key formation/creation process, each of the parties 102*a*-102*e* performs a precursor key sharing/negotiation step with the next adjacent device in the ring 208 which may involve sharing a key from one party to the next party in the ring 208, or negotiation of a key between one party and the next in the ring 208.

For example, with precursor sharing step each of the parties 102*a*-102*e* is configured to create/retrieve their corresponding precursor key/cryptographic key, $K_P$, for $0<=p<=4$ based on the following:

Party 102*a* of Party 0 creates/retrieves precursor key, $K_0$, 202*a*;

Party 102*b* of Party 1 creates/retrieves precursor key, $K_1$, 202*b*;

Party 102*c* of Party 2 creates/retrieves precursor key, $K_2$, 202*c*;

Party 102*d* of Party 3 creates/retrieves precursor key, $K_3$, 202*d*; and

Party 102*e* of Party 4 creates/retrieves precursor key, $K_4$, 202*e*;

Thereafter, each of the parties 102*a*-102*e* shares their corresponding precursor key, $K_P$, over a secure communications channel 204*a*-204*d* with the next adjacent party in the ring 208 based on the following:

Party 102*a* of Party 0 shares $K_0$ with party 102*b* of Party 1 over channel 204*a*;

Party 102*b* of Party 1 shares $K_1$ with party 102*c* of Party 2 over channel 204*a*;

Party 102*c* of Party 2 shares $K_2$ with party 102*d* of Party 3 over channel 204*a*;

Party 102*d* of Party 3 shares $K_3$ with party 102*e* of Party 4 over channel 204*a*; and Party 102*e* of Party 4 shares $K_4$ with party 102*a* of Party 0 over channel 204*a*;

For example, with precursor negotiating step each of the parties 102a-102e is configured to negotiate (i.e. perform a cryptographic key exchange) with the previous or the next adjacent party in the ring, where the precursor key/cryptographic key, $K_P$, for $0<=p<=4$ is negotiated based on the following:

Party 102a of Party 0 negotiates (e.g. performs a key exchange) a precursor key, $K_0$, 202a with Party 102b of Party 1;

Party 102b of Party 1 negotiates (e.g. performs a key exchange) a precursor key, $K_1$, 202b with Party 102c of Party 2;

Party 102c of Party 2 negotiates (e.g. performs a key exchange) a precursor key, $K_2$, 202c with Party 102d of Party 3;

Party 102d of Party 3 negotiates (e.g. performs a key exchange) a precursor key, $K_3$, 202d with Party 102e of Party 4; and Party 102e of Party 4 negotiates (e.g. performs a key exchange) a precursor key, $K_4$, 202e with Party 102a of Party 0;

Thereafter, each of the parties 102a-102e has a first and second precursor key stored thereon after the negotiations based on the following:

Party 102a of Party 0 has $K_4$ and $K_0$;

Party 102b of Party 1 has $K_0$ and $K_1$;

Party 102c of Party 2 has $K_1$ and $K_2$;

Party 102d of Party 3 has $K_2$ and $K_3$; and

Party 102e of Party 4 has $K_3$ and $K_4$;

In step B), the meeting notification step of the group key formation/creation process, each of the parties 102a-102e calculates their respective meeting keys, $M_P$, based on their precursor key, $K_P$, and the shared/negotiated precursor key $K_{(P-1+N) mod N}$ for $0<=p<N$ from the previous adjacent party and sends/shares their meeting key, $M_P$, with the intermediary 104 or the Meeting Aggregation Node based on the following:

Party 102a of Party 0 shares $M_0=(K_0 \text{ XOR } K_4)$ with intermediary 104 or the Meeting Aggregation Node;

Party 102b of Party 1 shares $M_1=(K_1 \text{ XOR } K_0)$ with intermediary 104 or the Meeting Aggregation Node;

Party 102c of Party 2 shares $M_2=(K_2 \text{ XOR } K_1)$ with intermediary 104 or the Meeting Aggregation Node;

Party 102d of Party 3 shares $M_3=(K_3 \text{ XOR } K_2)$ with intermediary 104 or the Meeting Aggregation Node;

Party 102e of Party 4 shares $M_4=(K_4 \text{ XOR } K_3)$ with intermediary 104 or the Meeting Aggregation Node;

In step C), the intermediary 104 or the Meeting Aggregation Node calculates the corresponding intermediate keys, $X_p$, for each of the parties 102a-102e based on a judicious combination of two or more meeting keys of the parties 102a-102e in the ring 208 such that when each $X_p$ of the p-th party is XOR'ed with the corresponding precursor key $K_P$ of the p-th party, the same group key, $K_G$, is formed for each of the parties. For example, a judicious combination of meeting keys may be based on: For party P=0 (e.g. party 102a) $X_0=XOR\{r=2 \text{ to } N-1 \text{ step } 2\}M_r$; and for parties $0<P<N$ (e.g. parties 102b-102e), $X_P=X_{P-1} \text{ XOR } M_P$. In the following, strikethrough is used to indicate terms which cancel out due to the commutative and associate nature of the XOR operation. Thus, the intermediary 104 or the Meeting Aggregation Node calculates the corresponding intermediate keys, $X_p$, for each of the parties 102a-102e based on the following:

Intermediate key for party 102a of Party 0 is calculated as:

$$X_0=M_2 XOR M_4=(K_2 XOR K_1) XOR (K_4 XOR K_3)=K_1 XOR K_2 XOR K_3 XOR K_4$$

Intermediate key for party 102b of Party 1 is calculated as:

$$X_1=X_0 XOR M_1=(K_4 XOR K_2 XOR K_3 XOR K_4) XOR (K_4 XOR K_0)=K_2 XOR K_3 XOR K_4 XOR K_0$$

Intermediate key for party 102c of Party 2 is calculated as:

$$X_2=X_1 XOR M_2=(K_2 XOR K_3 XOR K_4 XOR K_0) XOR (K_2 XOR K_1)=K_3 XOR K_4 XOR K_0 XOR K_1$$

Intermediate key for party 102d of Party 3 is calculated as:

$$X_3=X_2 XOR M_3=(K_3 XOR K_4 XOR K_0 XOR K_1) XOR (K_3 XOR K_2)=K_4 XOR K_0 XOR K_1 XOR K_2$$

Intermediate key for party 102e of Party 4 is calculated as:

$$X_4=X_3 XOR M_4=(K_4 XOR K_0 XOR K_1 XOR K_2) XOR (K_4 XOR K_3)=K_0 XOR K_1 XOR K_2 XOR K_3$$

Thereafter, the intermediary 104 or the Meeting Aggregation Node sends over a secure communications channel to each of the parties 102a-102e the corresponding calculated intermediate keys based on the following:

intermediary 104 or the Meeting Aggregation Node sends $X_0$ to party 102a of Party 0;

intermediary or the Meeting Aggregation Node 104 $X_1$ to party 102b of Party 1;

intermediary or the Meeting Aggregation Node 104 $X_2$ to party 102c of Party 2;

intermediary or the Meeting Aggregation Node 104 $X_3$ to party 102d of Party 3;

intermediary or the Meeting Aggregation Node 104 $X_4$ to party 102e of Party 4;

In step D), Group key calculation, each of the parties 102a-102e calculates the same group key, $K_G$, by XORing their received intermediate key, $X_p$, with their precursor key, $K_p$, for $0<=p<N$ based on the following:

Party 102a of Party 0 calculates:

$$K_G=X_0 XOR K_0=K_0 XOR K_1 XOR K_2 XOR K_3 XOR K_4$$

Party 102b of Party 1 calculates:

$$K_G=X_1 XOR K_1=K_0 XOR K_1 XOR K_2 XOR K_3 XOR K_4$$

Party 102c of Party 2 calculates:

$$K_G=X_2 XOR K_2=K_0 XOR K_1 XOR K_2 XOR K_3 XOR K_4$$

Party 102d of Party 3 calculates:

$$K_G=X_3 XOR K_3=K_0 XOR K_1 XOR K_2 XOR K_3 XOR K_4$$

Party 102e of Party 4 calculates:

$$K_G=X_4 XOR K_4=K_0 XOR K_1 XOR K_2 XOR K_3 XOR K_4$$

Thus, all parties now have the same group key which is the XOR of all 5 precursor keys.

Furthermore, as an option and to improve security of the group key and reduce the risk that unknown Parties may be added to the ring 208 without the organiser of the group knowing, prior to the corresponding group key calculation step D) performed by each of the parties 102a-102e, the group key creation/formation meeting and/or communication system 200 may be further modified and configured to include an organising Party 102a of the group of parties or an external actor (e.g. a third party that is different to the intermediary 104) creating and/or sending a one time pad (OTP) key, $K_{OTP}$, to all other parties 102b-102e in the ring 208 except the intermediary 104 (e.g. when the organising party is Party 102a) or all parties 102a-102e in the ring 208 except the intermediary 104 (when it is an external party different to the group of parties and the intermediary 104). The OTP Key, $K_{OTP}$, may be further used to secure the group key, $K_G$ generated by each party. Thus, when each of the parties $102a$-$102e$ in the group receive the OTP key, $K_{OTP}$, from the organiser (e.g. another party in the group) and/or an external party, which is not the intermediary, then the OTP key, $K_{OTP}$, may be included by each party in the group key calculation $K_G$ for $0<=p<N$ based on the following:

Party $102a$ of Party 0 calculates:

$$K_G=X_0 XOR K_0 XOR K_{OTP}=K_0 XOR K_1 XOR K_2$$
$$XOR K_3 XOR K_4 XOR K_{OTP}$$

Party $102b$ of Party 1 calculates:

$$K_G=X_1 XOR K_1 XOR K_{OTP}=K_0 XOR K_1 XOR K_2$$
$$XOR K_3 XOR K_4 XOR K_{OTP}$$

Party $102c$ of Party 2 calculates:

$$K_G=X_2 XOR K_2 XOR K_{OTP}=K_0 XOR K_1 XOR K_2$$
$$XOR K_3 XOR K_4 XOR K_{OTP}$$

Party $102d$ of Party 3 calculates:

$$K_G=X_3 XOR K_3 XOR K_{OTP}=K_0 XOR K_1 XOR K_2$$
$$XOR K_3 XOR K_4 XOR K_{OTP}$$

Party $102e$ of Party 4 calculates:

$$K_G=X_4 XOR K_4 XOR K_{OTP}=K_0 XOR K_1 XOR K_2$$
$$XOR K_3 XOR K_4 XOR K_{OTP}$$

Thus, all parties $102a$-$102e$ in ring 208 now have the same group key which is the XOR of all 5 precursor keys of the ring 208 and the OTP key. This forms a secured group key, $K_G$, that is same for all parties $102a$-$102e$ and may then be used as the group key by each party of the group of parties $102a$-$102e$ as the application demands.

Figure 3:
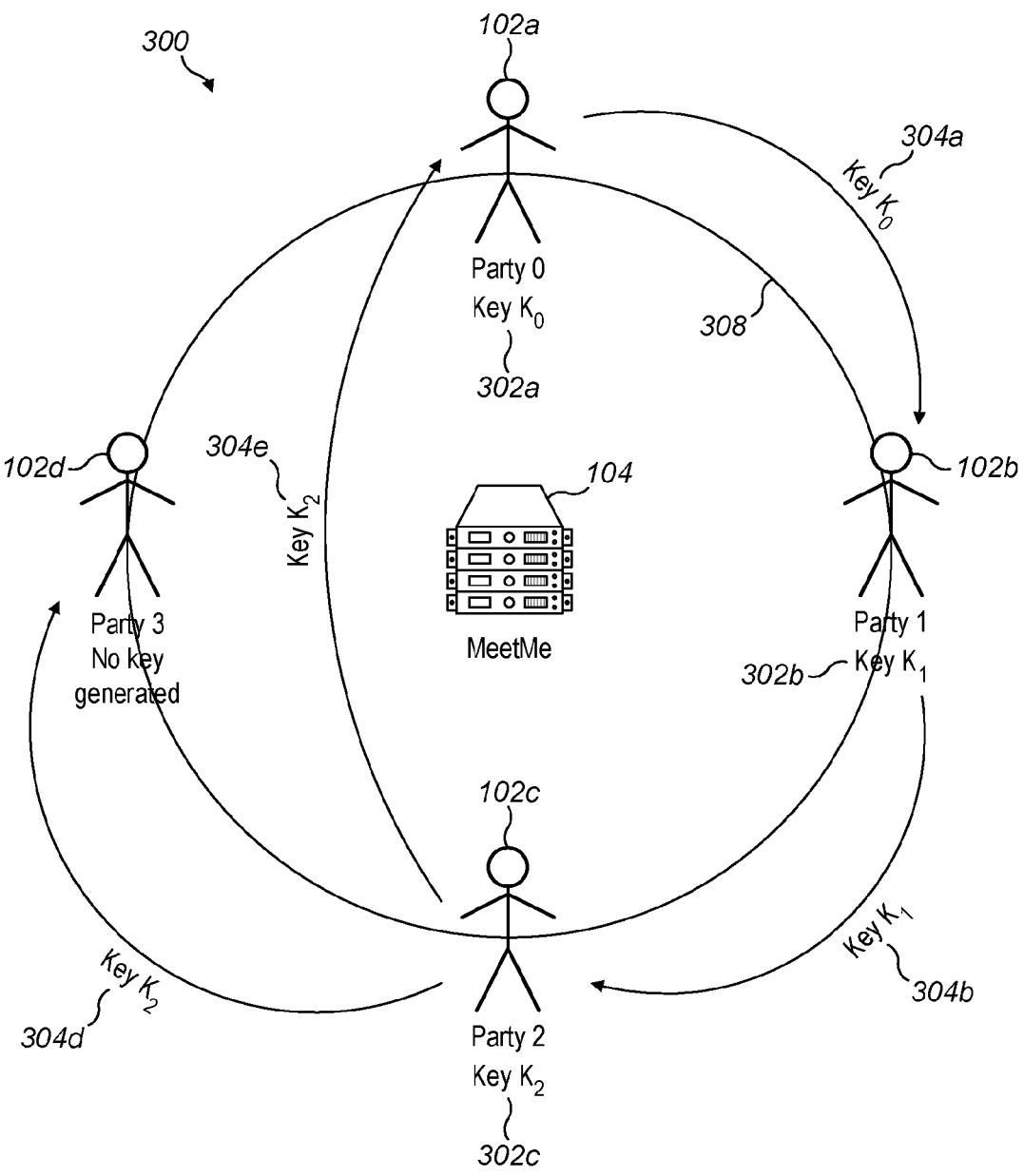
FIG. 3 schematic diagram illustrating another example group key creation/formation system for even N according to some embodiments of the invention.

FIG. 3 is a schematic diagram illustrating an example group key creation/formation meeting and communication system 300 of FIG. 3 for an even number N of parties $102a$-$102d$ in communication with intermediary 104 (e.g. a Meet Me server or WhatsApp® server, MS Teams® server) that are configured for creating a group key as described with reference to FIGS. 1a to 1g and arranging a group meeting with the parties $102a$-$102d$. FIG. 3 is an illustration of an example Case A group formation/creation process in which the ring 308 that is formed for all the parties $102a$-$102d$ is reduced or temporarily reduced during the group key creation/formation process. In this example, the number of parties is, without limitation, for example N=4 parties $102a$-$102d$ (e.g. Party 0, Party 1, Party 2, Party 3) that have been arranged to attend the group meeting or a group communication session and the like.

In order to secure the group meeting between the N parties $102a$-$102d$, each of the parties $102a$-$102c$ are configured to be involved in performing the group key formation/negotiation to create a group key that is unknown to the intermediary 104, where party $102d$ receives data representative of the derived group key from the previous adjacent device $102c$ in the ring 308. The intermediary 104 may be configured to arrange and notify each of the parties $102a$-$102d$ over secure communication channels (not shown) of the reference/address of one or more of the other parties $102a$-$102d$ for use in communicating with the respective or corresponding other parties $102a$-$102d$ for assisting the parties $102a$-$102d$ in each negotiating and creating the group key. It is assumed that, when required to do so, each of the parties $102a$-$102d$ may be configured to communicate with another of the parties $102a$-$102d$ directly over one of the secure channels $304a$-$304e$ (e.g. similar to channels $107a$-$107e$) and/or through intermediate device 104 via corresponding secure channels and the like.

In this example, the formation of the group and hence the ring 308 may be performed on request by a Party of the N parties $102a$-$102d$, by an external actor, which notifies the intermediary 104 (e.g. Meet Me) that a group key for the group communication session/meeting is required. This request may include, without limitation, for example, the set of external references/contact details, {R} of the Parties $102a$-$102d$ that are to be included in the group. The intermediary and/or other party may arrange or organises the parties $102a$-$102d$ of the Parties into a ring 308 as illustrated in FIG. 3a, where the parties $102a$-$102d$ are arranged into a sequence of {Party 0, Party 1, Party 2, Party 3}. For example, this may be achieved by the intermediary 104 internally assigning sequential zero-based index, p, to each Party and mapping the external reference of each party of a Party to its zero-based reference, p. The intermediary 104 notifies each of the Parties via the parties $102a$-$102d$ of the external reference of the next Party in the ring 308. In this example, Party 0 of party $102a$ receives the external reference of Party 1 of party $102b$, Party 1 of party $102b$ receives the external reference of Party 2 of party $102c$, Party 2 of party $102c$ receives the external reference of Party 3 of party $102d$, and Party 3 of party $102d$ receives the external reference of Party 4 of party $102e$. Therefore each of a party, p, for $0<=p<N$ (e.g. N=4 in this example) now has the external reference to the next adjacent party in the ring 308.

However, for the Case A group formation/creation process of system 300, the ring 308 is virtually reduced by removing the last party $102d$ (e.g. Party 3) to form an odd number of parties $102a$-$102c$ that will take part in the group key formation from the precursor formation, meeting notification and party notification steps of the group formation/creation process. Thus, the intermediary 104 also provides the penultimate party, i.e. party $102c$ or Party 2, with the external reference/contact details of the first party $102a$ (e.g. Party 0) in the ring 308. Thus, the ring 308 is effectively reduced to the following circular sequence {Party 0, Party 1, Party 2} for performing the precursor formation, meeting notification and party notification steps of the group formation/creation process. The last party $102d$ (e.g. Party 3) is brought back into the ring 308 during the group key creation step as described below.

Thus, all of the parties $102a$-$102c$ have the necessary details to begin the precursor key sharing/negotiation stage of the group formation/creation process for creating or forming a group key. In this example, the precursor key sharing, proceeds based on the following: Each of a party, p, apart from the N−1 party of the ring 308 creates/retrieves a precursor key, $K_P$, $302a$-$302c$. Once created/retrieved, each of a party P, for $0<=p<N-1$, of the ring 308 (e.g. parties $102a$-$102c$) shares over a secure communication channel $304a$-$304e$ its precursor key, $K_P$, with the next party in the ring 308. In addition, the penultimate party $102c$, when p=N−2, (e.g. Party 2) shares its precursor key, $K_P$, with the first Party 0 or first party $102a$ over channel $304e$. The last party N−1 or last party $102d$ does not share/negotiate anything. For example, each of a party shares its precursor key with the party of the next Party in the ring 308, except for the last party and where the party $102c$ of the penultimate Party $P_{N-2}$ (e.g. device $102c$) shares/negotiates its precursor key with the first party (e.g. party $102a$) in the ring 308. Therefore, for $0<=p<N-1$ each of a party, p, (or p-th party) now has its precursor key, $K_P$, and the precursor key $K_{(P-1+N)mod N}$ from the previous Party in the ring 308, except for the first Party in the ring 308 which has the precursor key from the penultimate Party, $K_{N-2}$. The last Party in the ring 308 only has the precursor key, $K_{N-2}$, shared with it over channel $304d$, so $K_{N-2}$ becomes the precursor key of N−1 party $102d$ (e.g. $K_{N-1}=K_{N-2}$).

Thus, the parties 102a-102c may now create a meeting notification (e.g. Meet Me Notification), in which, for $0<p<N-1$, each party of Party, p, calculates the XOR of its precursor key, $K_P$, and the previous Party's precursor key, $K_{(P-1+N)mod\ N}$, to create a meeting key, $M_P=K_P$ XOR $K_{(P-1+N)mod\ N}$, of the p-th party, where the 0-th party 102a, p=0, calculates for meeting key, $M_0$, the XOR of its precursor key, $K_0$, with the precursor key, $K_{(N-2)}$, of the penultimate party 102c, that is in this example $M_0=K_0$ XOR $K_2$. Each party of Party, p, for $0<=p<N-1$, sends a meeting notification including data representative of $M_P$ to the intermediary 104 (e.g. Meet Me) along with its external reference, R, which allows the intermediary 104 to map the p-th meeting key to the p-th device/party in the ring 308 that it formed. For example, the intermediary stores a mapping of $M_P$ vs p. It is noted that the last Party (e.g. party 102d of Party 3) sends nothing to the intermediary 104.

Now, the intermediary 104 (e.g. Meeting Aggregation Node) calculates the intermediate keys, $X_P$, for each of the $0<=p<N-1$ parties 102a-102c, which are each sent in a party notification to the corresponding party. For example, for each Party, p, $0<=p<N-1$, the intermediary 104 calculates an intermediary key, $X_P$, based on: for party 102a with Party P=0, the intermediary calculates the intermediate key as $X_0=XOR\{r=2$ to $N-1$ step $2\}M_r$ for the remaining parties 102b-102c in the reduced ring 308 with Party $0<P<N-1$, the intermediary 104 calculates $X_P=X_{P-1}$, XOR $M_P$. Once calculated, the intermediary 104 (e.g. Meet Me or the Meeting Aggregation Node) notifies or sends data representative of the intermediate key, $X_P$, to p-th party of Party P for $0<=p<N-1$. In addition, the intermediary 104 (e.g. Meeting Aggregation Node) sends the intermediate key, $X_{N-2}$, of the penultimate party 102c to the (N-1)-th party 102d of Party P for P=N-1, so the N-1-th intermediate key for N-1-th party is $X_{N-1}=X_{N-2}$. In this example, N=4.

Once each party of the parties 102a-102d receives its intermediate key, that party may calculate the group key, $K_G$, using its precursor key, $K_P$. For example, each the party of Party, P, (or the p-th party) establishes its own group key by XORing the received $X_P$ that it received from the intermediary 104 with its own precursor key, $K_P$. Thus, the group key may be calculated at each p-th party based on $K_G=X_P$ XOR $K_P$, for $0<=p<N-1$. For the (N-1)-th party or the last party 102d, the group key may be calculated by using the (n-2)-th intermediate key of the penultimate party 102c, e.g. $X_{N-2}$, where the group key may be based on $K_G=X_{N-2}$ XOR $K_2$, for p=N-1.

Referring to any of the group key formation/creation systems/process(es) 100, 110, 120, 140 and step 145, and 300 when N is even as described with reference to FIGS. 1a to 3 combinations thereof, modifications thereto and the like, the following is a worked example of creating a group key for a group of N parties when N is an even number greater than 2 for the case (e.g. Case A) in which the ring 308 is temporarily reduced from N parties to N-1 parties (e.g. the last party 102d is removed from the ring 308 during precursor sharing/negotiation, and group key creation/formation). Each of the group key formation/creation process(es) 110, 120, 140 and step 145, 300 as described with reference to FIGS. 1a to 3 may be further modified and/or adapted based on the concepts and/or steps of the following worked example, combinations thereof, modifications thereto and/or as herein described. For simplicity, reference numerals of FIGS. 1a to 3 may be reused for similar or the same features, components, steps and/or process(es) and the like. In the following worked example, the number of parties in the group is N=4, and the 4 parties arranged as Party 0 to Party 3 of corresponding parties 102a-102d in ring 308 as described with reference to FIG. 3.

Referring to FIG. 1a or 3, after the ring 308 has been formed for N=4, each party 102a-102d knows (or has been notified by the intermediary 104) of the sequence number or location, p, (e.g. $0<=p<=3$) they are positioned within the ordered ring 308 and also the reference/contact details of one or more other parties such as at least the next adjacent party in the ring 308 and/or the previous adjacent party in the ring, the group key formation process when N is even for Case A includes the following main steps of: A) Precursor key sharing/negotiating (e.g. described in steps 146 of process 140 of FIG. 1d); B) Meeting notification (e.g. described in steps 146 of process 140 of FIG. 1d); C) Party Notification (e.g. (e.g. described in steps 146 of process 140 of FIG. 1d)); and D) Group key calculation (e.g. described in steps 148 of process 140 of FIG. 1d).

In step A), the precursor sharing/negotiating step of the group key formation/creation process, each of the parties 102a-102d performs a precursor key sharing/negotiation step with the next adjacent device in the ring 308 which may involve sharing a key from one party to the next party in the ring 308, or negotiation of a key between one party and the next in the ring 308.

For example, with precursor sharing step each of the parties 102a-102d is configured to create/retrieve their corresponding precursor key/cryptographic key, $K_P$, for $0<=p<=3$ based on the following:

Party 102a of Party 0 creates/retrieves precursor key, $K_0$, 302a;

Party 102b of Party 1 creates/retrieves precursor key, $K_1$, 302b;

Party 102c of Party 2 creates/retrieves precursor key, $K_2$, 302c;

Party 102d of Party 3 does not create a precursor key.

Thereafter, each of the parties 102a-102c for $0<=p<3$ shares their corresponding precursor key, $K_P$, over a secure communications channel 304a-304e with the next adjacent party in the ring 308 based on the following:

Party 102a of Party 0 shares $K_0$ with party 102b of Party 1 over channel 304a;

Party 102b of Party 1 shares $K_1$ with party 102c of Party 2 over channel 304b;

Party 102c of Party 2 shares $K_2$ with party 102a of Party 0 over channel 304e; and Party 102c of Party 2 shares $K_2$ with party 102d of Party 3 over channel 204d.

For example, with precursor negotiating step each of the parties 102a-102d is configured to negotiate (i.e. perform a cryptographic key exchange) with the previous or the next adjacent party in the ring, where the precursor key/cryptographic key, $K_P$, for $0<=p<=3$ is negotiated based on the following:

Party 102a of Party 0 negotiates (e.g. performs a key exchange) a precursor key, $K_0$, 302a with Party 102b of Party 1;

Party 102b of Party 1 negotiates (e.g. performs a key exchange) a precursor key, $K_1$, 302b with Party 102c of Party 2;

Party 102c of Party 2 negotiates (e.g. performs a key exchange) a precursor key, $K_2$, 302c with Party 102a of Party 0; and Party 102c of Party 2 shares precursor key, $K_2$, with Party 102d of Party 3.

Thereafter, each of the parties 102a-102d has a first and second precursor key stored thereon after the negotiations based on the following:

Party 102a of Party 0 has $K_2$ and $K_0$;

Party 102b of Party 1 has $K_0$ and $K_1$;

Party 102c of Party 2 has $K_1$ and $K_2$; and

Party 102d of Party 3 has $K_2$.

In step B), the meeting notification step of the group key formation/creation process, each of the parties 102a-102c for $0 \leq p < 3$ calculates their respective meeting keys, $M_P$, based on their precursor key, $K_P$, and the shared/negotiated precursor key $K_{(P-1+N)mod\,N}$ for $0 \leq p < N-1$ from the previous adjacent party and sends/shares their meeting key, $M_P$, with the intermediary 104 or the Meeting Aggregation Node based on the following:

Party 102a of Party 0 shares $M_0 = (K_0 \text{ XOR } K_2)$ with intermediary 104 or the Meeting Aggregation Node;

Party 102b of Party 1 shares $M_1 = (K_1 \text{ XOR } K_0)$ with intermediary 104 or the Meeting Aggregation Node;

Party 102c of Party 2 shares $M_2 = (K_2 \text{ XOR } K_1)$ with intermediary 104 or the Meeting Aggregation Node;

Party 102d of Party 3 does not share anything.

In step C), the intermediary 104 calculates the corresponding intermediate keys, $X_P$, for each of the parties 102a-102c, for $0 \leq p < 3$, based on a judicious combination of two or more meeting keys of the parties 102a-102c in the ring 308 such that when each $X_P$ of the p-th party is XOR'ed with the corresponding precursor key $K_P$ of the p-th party, the same group key, $K_G$, is formed for each of the parties, for $0 \leq p < 3$. For example, a judicious combination of meeting keys may be based on: For party $P=0$ (e.g. party 102a) $X_0 = \text{XOR}\{r=2 \text{ to } N-1 \text{ step } 2\}M_r$; and for parties $0 < P < N-1$ (e.g. parties 102b-102c), $X_P = X_{P-1} \text{ XOR } M_P$. In the following, strikethrough is used to indicate terms which cancel out due to the commutative and associate nature of the XOR operation. Thus, the intermediary 104 or the Meeting Aggregation Node calculates the corresponding intermediate keys, $X_P$, for each of the parties 102a-102c based on the following:

Intermediate key for party 102a of Party 0 is calculated as:

$$X_0 = M_2 = (K_2 \text{XOR} K_1) = K_1 \text{XOR} K_2$$

Intermediate key for party 102b of Party 1 is calculated as:

$$X_1 = X_0 \text{XOR} M_1 = (K_1 \text{XOR} K_2) \text{XOR} (K_1 \text{XOR} K_0) = K_2 \text{XOR} K_0$$

Intermediate key for party 102c of Party 2 is calculated as:

$$X_2 = X_1 \text{XOR} M_2 = (K_2 \text{XOR} K_0) \text{XOR} (K_2 \text{XOR} K_1) = K_0 \text{XOR} K_1$$

Thereafter, the intermediary 104 or the Meeting Aggregation Node sends over a secure communications channel to each of the parties 102a-102c the corresponding calculated intermediate keys based on the following:

intermediary 104 or the Meeting Aggregation Node sends $X_0$ to party 102a of Party 0;

intermediary 104 or the Meeting Aggregation Node $X_1$ to party 102b of Party 1;

intermediary 104 or the Meeting Aggregation Node $X_2$ to party 102c of Party 2;

In step D), Group key calculation, each of the parties 102a-102c calculates the same group key, $K_G$, by XORing their received intermediate key, $X_P$, with their precursor key, $K_P$, for $0 \leq p < N-1$ based on the following:

Party 102a of Party 0 calculates:

$$K_G = X_0 \text{XOR} K_0 = K_0 \text{XOR} K_1 \text{XOR} K_2$$

Party 102b of Party 1 calculates:

$$K_G = X_1 \text{XOR} K_1 = K_0 \text{XOR} K_1 \text{XOR} K_2$$

Party 102c of Party 2 calculates:

$$K_G = X_2 \text{XOR} K_2 = K_0 \text{XOR} K_1 \text{XOR} K_2$$

Party 102c of Party 2 sends $X_2$ to Party 3 and Party 102d of Party 3 calculates:

$$K_G = X_2 \text{XOR} K_2 = K_0 \text{XOR} K_1 \text{XOR} K_2$$

Thus, all parties now have the same group key which is the XOR of all 3 precursor keys of the "reduced" ring 308.

Furthermore, as an option and to improve security of the group key and reduce the risk that unknown Parties may be added to the ring 308 without the organiser of the group knowing, prior to the corresponding group key calculation step D) performed by each of the parties 102a-102d, the group key creation/formation meeting and/or communication system 300 may be further modified and configured to include an organising Party 102a of the group of parties or an external actor (e.g. a third party that is different to the intermediary 104) creating and/or sending a one time pad (OTP) key, $K_{OTP}$, to all other parties 102b-102d in the ring 308 except the intermediary 104 (e.g. when the organising party is Party 102a) or all parties 102a-102d in the ring 308 except the intermediary 104 (when it is an external party different to the group of parties and the intermediary 104). The OTP Key, $K_{OTP}$, may be further used to secure the group key, $K_G$ generated by each party. Thus, when each of the parties 102a-102d in the group receive the OTP key, $K_{OTP}$, from the organiser (e.g. another party in the group) and/or an external party, then the OTP key, $K_{OTP}$, may be included by each party in the group key calculation $K_G$ for $0 \leq p < N-1$ based on the following:

Party 102a of Party 0 calculates:

$$K_G = X_0 \text{XOR} K_0 \text{XOR} K_{OPT} = K_0 \text{XOR} K_1 \\ \text{XOR} K_2 \text{XOR} K_{OPT}$$

Party 102b of Party 1 calculates:

$$K_G = X_1 \text{XOR} K_1 \text{XOR} K_{OTP} = K_0 \text{XOR} K_1 \\ \text{XOR} K_2 \text{XOR} K_{OTP}$$

Party 102c of Party 2 calculates:

$$K_G = X_2 \text{XOR} K_2 \text{XOR} K_{OTP} = K_0 \text{XOR} K_1 \\ \text{XOR} K_2 \text{XOR} K_{OTP}$$

Party 102c of Party 2 sends $X_2$ to Party 3 and Party 102d of Party 3 calculates:

$$K_G = X_2 \text{XOR} K_2 \text{XOR} K_{OTP} = K_0 \text{XOR} K_1 \\ \text{XOR} K_2 \text{XOR} K_{OTP}$$

Thus, all parties 102a-102d in ring 308 now have the same group key which is the XOR of all 3 precursor keys of the "reduced" ring 308 and the OTP key. This forms a secured group key, $K_G$, that is same for all parties 102a-102d and may then be used as the group key by each party of the group of parties 102a-102d as the application demands.

Figure 4:
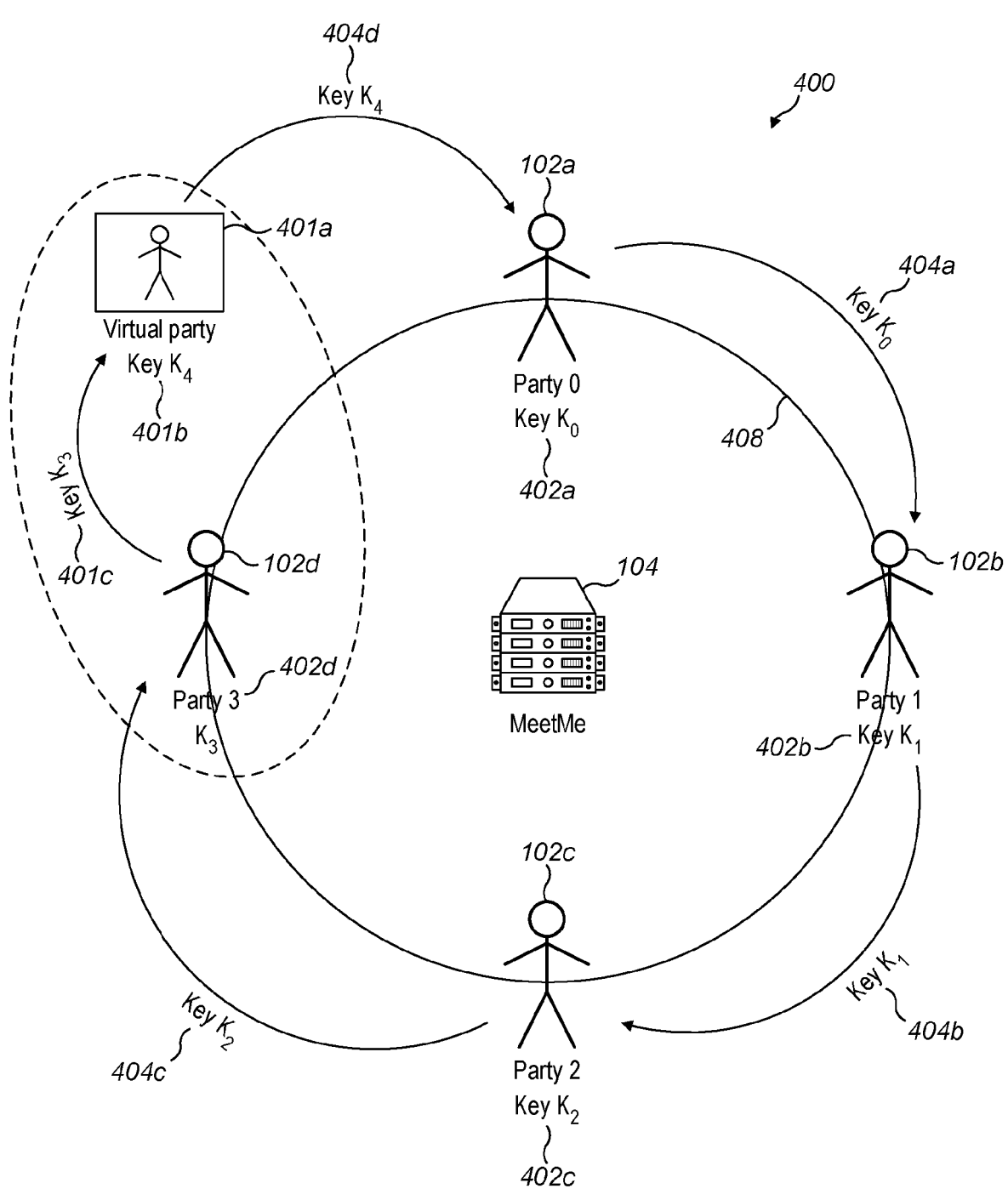
FIG. 4 a schematic diagram illustrating another example group key creation/formation system for even N and a virtual party according to some embodiments of the invention.

FIG. 4 is a schematic diagram illustrating an example group key creation/formation meeting and communication system 400 for an even number N of parties 102a-102d in communication with intermediary 104 (e.g. a Meet Me server or WhatsApp® server, MS Teams® server) that are configured for creating a group key as described with reference to FIGS. 1a to 1d and arranging a group meeting with the parties 102a-102d. FIG. 4 is an illustration of an example Case B group formation/creation process in which the ring 408 that is formed for all the parties 102a-102d is extended to include a "virtual party" or "virtual party" 401a that is hosted, without limitation, for example by the (N−1)-th party 102d of party (N−1) (e.g. Party 3). In this example, the number of parties is, without limitation, for example N=4 parties 102a-102d (e.g. Party 0, Party 1, Party 2, Party 3) that have been arranged to attend the group meeting or a group communication session and the like. In order to secure the group meeting between the N parties $102a$-$102d$, each of the parties $102a$-$102c$ are configured to be involved in performing the group key formation/negotiation to create a group key that is unknown to the intermediary 104, where party $102d$ is further configured to host a "virtual party" or "virtual party" $401a$ that increases the number of parties into the ring 408 to N+1, which is an odd number of parties. The intermediary 104 may be configured to arrange and notify each of the parties $102a$-$102d$ over secure communication channels (not shown) of the reference/address of one or more of the other parties $102a$-$102d$ for use in communicating with the respective or corresponding other parties $102a$-$102d$ for assisting the parties $102a$-$102d$ in each negotiating and creating the group key. It is assumed that, when required to do so, each of the parties $102a$-$102d$ may be configured to communicate with another of the parties $102a$-$102d$ directly over one of the secure channels $404a$-$404d$ (e.g. similar to channels $107a$-$107e$) and/or through intermediate device 104 via corresponding secure channels and the like.

In this example, the formation of the group and hence the ring 408 may be performed on request by a Party of the N parties $102a$-$102d$, by an external actor, which notifies the intermediary 104 (e.g. Meet Me) that a group key for the group communication session/meeting is required. This request may include, without limitation, for example, the set of external references/contact details, {R} of the Parties $102a$-$102d$ that are to be included in the group. The intermediary and/or other party may arrange or organise the parties $102a$-$102d$ of the Parties into a ring 408 as illustrated in FIG. 4a, where the parties $102a$-$102d$ are arranged into a sequence of {Party 0, Party 1, Party 2, Party 3}. For example, this may be achieved by the intermediary 104 internally assigning sequential zero-based index, p, to each Party and mapping the external reference of each party of a Party to its zero-based reference, p. The intermediary 104 notifies each of the Parties via the parties $102a$-$102d$ of the external reference of the next Party in the ring 408. In this example, Party 0 of party $102a$ receives the external reference of Party 1 of party $102b$, Party 1 of party $102b$ receives the external reference of Party 2 of party $102c$, Party 2 of party $102c$ receives the external reference of Party 3 of party $102d$, and Party 3 of party $102d$ receives the external reference of Party 4 of party $102e$. Therefore each of a party, p, for $0<=p<N$ (e.g. N=4 in this example) now has the external reference to the next adjacent party in the ring 408.

However, for the Case B group formation/creation process of system 400, the ring 408 is virtually increased by adding a "virtual party or device" $401a$ that is hosted by the last party $102d$, i.e. Party 3, and including the virtual party or device $401a$ in the precursor formation, meeting notification and party notification steps of the group formation/creation process. Thus, with the "virtual party or device" $401a$ added, the ring 408 is effectively increased to the following circular sequence {Party 0, Party 1, Party 2, Party 3, Virtual Party} for performing the precursor formation, meeting notification and party notification steps of the group formation/creation process. The last party $102d$ (e.g. Party 3) hosts the virtual party $401a$ as described below.

Thus, all of the parties $102a$-$102d$ have the necessary details to begin the precursor key sharing/negotiation stage of the group formation/creation process for creating or forming a group key. In this example, the precursor key sharing, proceeds based on the following: Each of a party, p, of the ring 408 creates/retrieves a precursor key, $K_P$, $402a$-

$402d$. In addition, Party $P_{N-1}$ which, in this example, is party $102d$, creates the "virtual Party/party", $P_N$, $401a$, and thus creates a second precursor key, $K_N$, $401b$, which it will share with the first party $102a$ in the ring 408 instead of the precursor key, $K_{N-1}$, $402d$.

Once created/retrieved, each of a party P, for $0<=p<N-1$, of the ring 408 (e.g. parties $102a$-$102c$) shares over a secure communication channel $404a$-$404c$ its precursor key, $K_P$, with the next party in the ring 408. In addition, for p=N-1, the last party p (i.e. p=N-1), or the N-1-th party $102d$, shares the second precursor key, $K_N$, with the first Party 0 or first party $102a$ over channel $404d$. For example, each of a party shares its precursor key with the party of the next Party in the ring 408, except for the last party $102d$, which instead shares the second precursor key $401b$ of the virtual device/party $401a$ that it is hosting with the first party (e.g. party $102a$) in the ring 408. Therefore, for $0<p<=N-1$ each of a party, p, (or p-th party) now has its precursor key, $K_P$, and the precursor key $K_{(P-1+N)mod\ N}$ from the previous Party in the ring 408, except for the first Party in the ring 308 which has its precursor key $K_0$ and the second precursor key, $K_N$, $401b$ of the "virtual Party" $401a$ shared with it by the last party $102d$ (or last (N-1)-th party/party).

Thus, the parties $102a$-$102d$ may now create a meeting notification (e.g. Meet Me Notification), in which, for $0<=p<=N-1$, each party of Party, p, calculates the XOR of its precursor key, $K_P$, and the previous Party's precursor key, $K_{(P+N)mod(N+1)}$, to create a meeting key, $M_P=K_P$ XOR $K_{(P+N)mod(N+1)}$, of the p-th party, where the last party $102d$ of Party P=N-1 (which is hosting the "virtual party" $401a$ also calculates $M_P=K_P$ XOR $K_{(P+N)mod(N+1)}$ for P=N, i.e. $M_N$, which is the meeting key for the "virtual party" $401a$.

Each party of Party, p, for $0<=p<N-1$, sends a meeting notification including data representative of $M_P$ to the intermediary 104 (e.g. Meet Me) along with its external reference, R, which allows the intermediary 104 to map the p-th meeting key to the p-th device/party in the ring 408 that it formed. However, the last party $102a$ of party N-1 sends both $M_{N-1}$ and $M_N$ in a meeting notification including data representative of $M_{N-1}$ and $M_N$ to the intermediary 104 (e.g. Meet Me) along with its external reference, R, which allows the intermediary 104 to map the N-1-th meeting key(s) to the N-1-th device/party in the ring 408 that it formed. For example, the intermediary stores a mapping of $M_P$ vs P.

Now, the intermediary 104 calculates the intermediate keys, $X_P$, for each of the $0<=p<=N$ parties $102a$-$102d$ including virtual party $401a$, which are each sent in a party notification to the corresponding party. For example, for each Party, p, $0<=p<N-1$, the intermediary 104 calculates an intermediary key, $X_P$, based on: for party $102a$ with Party P=0, the intermediary calculates the intermediate key as $X_0=XOR\{r=2$ to N-2 step 2}M; and for the remaining parties $102b$-$102d$ (and the "virtual party" N $401a$) in the ring 408 with Party $0<P<=N$, the intermediary 104 calculates $X_P=X_{P-1}$ XOR $M_P$, where for p=N, the intermediary 104 uses the meeting key $M_N$ received from (N-1)-th party $102d$. Once calculated, the intermediary 104 (e.g. Meet Me) notifies or sends data representative of the intermediate key, $X_P$, to p-th party of Party P for $0<=p<N-1$. For (N-1) $<=p<=N$, as the (N-1)-th party $102d$ is hosting the N-th "virtual party/party" $401a$, the intermediate device 104 sends both intermediate keys $X_{N-1}$ and $X_N$ to the (N-1)-th party $102d$. In this example, N=4, but it applicable for any even N.

Once each party of the parties $102a$-$102d$ receives its intermediate key(s), that party may calculate the group key, $K_G$, using its precursor key, $K_P$ and the received intermediate key, $X_P$. For example, each party of Party, P, (or the p-th party) establishes its own group key by XORing the received $X_P$ that it received from the intermediary 104 with its own precursor key, $K_P$. Thus, the group key, which is the same for each of the N parties 102a-102d, is calculated independently at each p-th party based on $K_G = X_P$ XOR $K_P$, for $0<=p<N$.

Referring to any of the group key formation/creation systems/process(es) 100, 110, 120, 140 and step 147, and 400 when N is even as described with reference to FIGS. 1a to 4 combinations thereof, modifications thereto and the like, the following is a worked example of creating a group key for a group of N parties when N is an even number greater than 2 for the case (e.g. Case B) in which the ring 408 is temporarily increased by virtue of a virtual party from N parties to N+1 parties (e.g. the last party 102d hosts a virtual party 401a that is included into the ring 408 during precursor sharing/negotiation, and group key creation/formation). Each of the group key formation/creation process(es) 110, 120, 140 and step 145, 400 as described with reference to FIGS. 1a to 4 may be further modified and/or adapted based on the concepts and/or steps of the following worked example, combinations thereof, modifications thereto and/or as herein described. For simplicity, reference numerals of FIGS. 1a to 4 may be reused for similar or the same features, components, steps and/or process(es) and the like. In the following worked example, the number of parties in the group (not including the virtual party) is N=4, and the 4 parties arranged as Party 0 to Party 3 of corresponding parties 102a-102d in ring 408 as described with reference to FIG. 4. Referring to FIG. 1a or 4, after the ring 408 has been formed for N=4, each party 102a-102d knows (or has been notified by the intermediary 104) of the sequence number or location, p, (e.g. $0<=p<=3$) they are positioned within the ordered ring 408 accordingly and also the reference/contact details of one or more other parties such as at least the next adjacent party in the ring 408 and/or the previous adjacent party in the ring, the group key formation process when N is even for Case B includes the following main steps of: A) Precursor key sharing/negotiating (e.g. described in steps 147 of process 140 of FIG. 1d); B) Meeting notification (e.g. described in steps 147 of process 140 of FIG. 1d); C) Party Notification (e.g. (e.g. described in steps 147 of process 140 of FIG. 1d)); and D) Group key calculation (e.g. described in steps 148 of process 140 of FIG. 1d).

In step A), the precursor sharing/negotiating step of the group key formation/creation process, each of the parties 102a-102d performs a precursor key sharing/negotiation step with the next adjacent device in the ring 408 which may involve sharing a key from one party to the next party in the ring 408, or negotiation of a key between one party and the next in the ring 408.

For example, with precursor sharing step each of the parties 102a-102d is configured to create/retrieve their corresponding precursor key/cryptographic key, $K_P$, for $0<=p<=3$ based on the following:

Party 102a of Party 0 creates/retrieves precursor key, $K_0$, 402a;

Party 102b of Party 1 creates/retrieves precursor key, $K_1$, 402b;

Party 102c of Party 2 creates/retrieves precursor key, $K_2$, 402c;

Party 102d of Party 3 creates/retrieves precursor key, $K_3$, 402d; and

Party 102d of Party 3 also creates/hosts a virtual party 401a and creates/retrieves precursor key, $K_4$, 401b, thus the ring 408 is increased to include the virtual party 401a, which is now the previous adjacent party to Party 102a of Party 0.

Thereafter, each of the parties 102a-102d for $0<=p<=3$ and virtual party 401a shares their corresponding precursor key, $K_P$, over a secure communications channel 404a-404c, 401c, and 404d with the next adjacent party in the increased ring 408 based on the following:

Party 102a of Party 0 shares $K_0$ with party 102b of Party 1 over channel 404a;

Party 102b of Party 1 shares $K_1$ with party 102c of Party 2 over channel 404b;

Party 102c of Party 2 shares $K_2$ with party 102d of Party 3 over channel 404c;

Party 102d of Party 3 "shares" $K_3$ with virtual party 401a over "virtual channel" 401c;

Party 102d of Party 3 shares $K_4$ via virtual party 401a with Party 0 over channel 404d.

For example, with precursor negotiating step each of the parties 102a-102d is configured to negotiate (i.e. perform a cryptographic key exchange) with the previous or the next adjacent party in the ring, where the precursor key/cryptographic key, $K_P$, for $0<=p<=3$ is negotiated based on the following:

Party 102a of Party 0 negotiates (e.g. performs a key exchange) a precursor key, $K_0$, 302a with Party 102b of Party 1;

Party 102b of Party 1 negotiates (e.g. performs a key exchange) a precursor key, $K_1$, 302b with Party 102c of Party 2;

Party 102c of Party 2 negotiates (e.g. performs a key exchange) a precursor key, $K_2$, 302c with Party 102d of Party 3; and Party 102d of Party 3 creates/hosts a virtual party 401a and then "negotiates/creates" a precursor key, $K_3$, 402d with virtual party 401a hosted by Party 3; and Party 102d of Party 3 also, via a virtual party 401a, "negotiates/creates" a precursor key, $K_4$, 401b with Party 102a of Party 0.

Thereafter, each of the parties 102a-102d and the virtual party has a first and second precursor key stored thereon after the negotiations based on the following:

Party 102a of Party 0 has $K_4$ and $K_0$;

Party 102b of Party 1 has $K_0$ and $K_1$;

Party 102c of Party 2 has $K_1$ and $K_2$;

Party 102d of Party 3 has $K_2$ and $K_3$; and

Virtual party 401a hosted by Party 3 has $K_3$ and $K_4$.

In step B), the meeting notification step of the group key formation/creation process, each of the parties 102a-102d for $0<=p<=3$ calculates their respective meeting keys, $M_P$, based on their precursor key, $K_P$, and the shared/negotiated precursor key $K_{(P-1+N)mod\ N}$ for $0<=p<=N-1$ from the previous adjacent party and sends/shares their meeting key, $M_P$, with the intermediary 104 or the Meeting Aggregation Node, where the (N−1)-th party 102d (e.g. Party 3) generates two meeting keys, one for itself the other for the virtual party 401a. The meeting keys are created and notified/shared based on the following:

Party 102a of Party 0 creates and shares $M_0 = (K_0$ XOR $K_4)$ with intermediary 104 or Meeting Aggregation Node;

Party 102b of Party 1 creates and shares $M_1 = (K_1$ XOR $K_0)$ with intermediary 104 or Meeting Aggregation Node;

Party 102c of Party 2 creates and shares $M_2 = (K_2$ XOR $K_1)$ with intermediary 104 or Meeting Aggregation Node;

Party 102*d* of Party 3 creates and shares $M_3=(K_3 \text{ XOR } K_2)$ with intermediary 104 or Meeting Aggregation Node; and Party 102*d* of Party 3 via the hosted virtual party 401*a* creates and shares $M_4=(K_4 \text{ XOR } K_3)$ with intermediary 104.

In step C), the intermediary 104 calculates the corresponding intermediate keys, $X_p$, for each of the parties 102*a*-102*d*, for 0<=p<=N−1 and also an intermediate key $X_N$ for the virtual party 401*a* hosted by the last party 102*d* based on a judicious combination of two or more meeting keys of the parties 102*a*-102*d* and 401*a* in the increased ring 408 such that when each $X_p$ of the p-th party is XOR'ed with the corresponding precursor key $K_p$ of the p-th party, the same group key, $K_G$, is formed for each of the parties, for 0<=p<=3. For example, a judicious combination of meeting keys may be based on: For party P=0 (e.g. party 102*a*) $X_0$=XOR{r=2 to N step 2}$M_r$; and for parties 0<P<=N (e.g. parties 102*b*-102*d* and 401*a*), $X_P=X_{P-1} \text{ XOR } M_P$. In the following, strikethrough is used to indicate terms which cancel out due to the commutative and associate nature of the XOR operation. Thus, the intermediary 104 or the Meeting Aggregation Node calculates the corresponding intermediate keys, $X_p$, for each of the parties 102*a*-102*d* and intermediate key $X_N$ for the virtual party based on the following:

Intermediate key for party 102*a* of Party 0 is calculated as:

$$X_0=M_2\text{XOR}M_4=(K_2\text{XOR}K_1)\text{XOR}(K_4\text{XOR}K_3)= K_1\text{XOR}K_2\text{XOR}K_3\text{XOR}K_4$$

Intermediate key for party 102*b* of Party 1 is calculated as:

$$X_1=X_0\text{XOR}M_1=(K_4\text{XOR}K_2\text{XOR}K_3\text{XOR}K_4)\text{XOR} (K_4\text{XOR}K_0)=K_2\text{XOR}K_3\text{XOR}K_4\text{XOR}K_0$$

Intermediate key for party 102*c* of Party 2 is calculated as:

$$X_2=X_1\text{XOR}M_2=(K_2\text{XOR}K_3\text{XOR}K_4\text{XOR}K_0)\text{XOR} (K_2\text{XOR}K_1)=K_3\text{XOR}K_4\text{XOR}K_0\text{XOR}K_1$$

Intermediate key for party 102*d* of Party 3 is calculated as:

$$X_3=X_2\text{XOR}M_3=(K_3\text{XOR}K_4\text{XOR}K_0\text{XOR}K_1)\text{XOR} (K_3\text{XOR}K_2)=K_4\text{XOR}K_0\text{XOR}K_1\text{XOR}K_2$$

Intermediate key for virtual party 401*a* hosted by Party 3 is calculated as:

$$X_4=X_3\text{XOR}M_4=(K_4\text{XOR}K_0\text{XOR}K_1\text{XOR}K_2)\text{XOR} (K_4\text{XOR}K_3)=K_0\text{XOR}K_1\text{XOR}K_2\text{XOR}K_3$$

Thereafter, the intermediary 104 or Meeting Aggregation Node sends over a secure communications channel to each of the parties 102*a*-102*d* the corresponding calculated intermediate keys based on the following:

intermediary 104 or Meeting Aggregation Node sends $X_0$ to party 102*a* of Party 0;

intermediary 104 or Meeting Aggregation Node $X_1$ to party 102*b* of Party 1;

intermediary 104 or Meeting Aggregation Node $X_2$ to party 102*c* of Party 2;

intermediary 104 or Meeting Aggregation Node $X_3$ to party 102*d* of Party 3; and intermediary 104 or Meeting Aggregation Node $X_4$ to virtual party 401*a* hosted by party 102*d* of Party 3.

In step D), Group key calculation, each of the parties 102*a*-102*c* calculates the same group key, $K_G$, by XORing their received intermediate key, $X_p$, with their precursor key, $K_p$, for 0<=p<=N−1 based on the following:

Party 102*a* of Party 0 calculates:

$$K_G=X_0\text{XOR}K_0=K_0\text{XOR}K_1\text{XOR}K_2\text{XOR}K_3\text{XOR}K_4$$

Party 102*b* of Party 1 calculates:

$$K_G=X_1\text{XOR}K_1=K_0\text{XOR}K_1\text{XOR}K_2\text{XOR}K_3\text{XOR}K_4$$

Party 102*c* of Party 2 calculates:

$$K_G=X_2\text{XOR}K_2=K_0\text{XOR}K_1\text{XOR}K_2\text{XOR}K_3\text{XOR}K_4$$

Party 102*d* of Party 3 calculates:

$$K_G=X_3\text{XOR}K_3=K_0\text{XOR}K_1\text{XOR}K_2\text{XOR}K_3\text{XOR}K_4$$

Thus, all real parties 102*a*-102*d* in ring 408 now have the same group key which is the XOR of all 5 precursor keys of the "increased" ring 408 or the ring 408 including the virtual party 401*a*.

Furthermore, as an option and to improve security of the group key and reduce the risk that unknown Parties may be added to the ring 408 without the organiser of the group knowing, prior to the corresponding group key calculation step D) performed by each of the parties 102*a*-102*d*, the group key creation/formation meeting and/or communication system 400 may be further modified and configured to include an organising Party 102*a* of the group of parties or an external actor (e.g. a third party that is different to the intermediary 104) creating and/or sending a one time pad (OTP) key, $K_{OTP}$, to all other parties 102*b*-102*d* in the ring 408 except the intermediary 104 (e.g. when the organising party is Party 102*a*) or all parties 102*a*-102*d* in the ring 408 except the intermediary 104 (when it is an external party different to the group of parties and the intermediary 104). The OTP Key, $K_{OTP}$, may be further used to secure the group key, $K_G$ generated by each party. Thus, when each of the parties 102*a*-102*d* in the group receive the OTP key, $K_{OTP}$, from the organiser (e.g. another party in the group) and/or an external party, then the OTP key, $K_{OTP}$, may be included by each party in the group key calculation $K_G$ for 0<=p<=N−1 based on the following:

Party 102*a* of Party 0 calculates:

$$K_G=X_0\text{XOR}K_0\text{XOR}K_{OTP}=K_0\text{XOR}K_1\text{XOR}K_2 \text{XOR}K_3\text{XOR}K_4\text{XOR}K_{OTP}$$

Party 102*b* of Party 1 calculates:

$$K_G=X_1\text{XOR}K_1\text{XOR}K_{OTP}=K_0\text{XOR}K_1\text{XOR}K_2 \text{XOR}K_3\text{XOR}K_4\text{XOR}K_{OTP}$$

Party 102*c* of Party 2 calculates:

$$K_G=X_2\text{XOR}K_2\text{XOR}K_{OTP}=K_0\text{XOR}K_1\text{XOR}K_2 \text{XOR}K_3\text{XOR}K_4\text{XOR}K_{OTP}$$

Party 102*d* of Party 3 calculates:

$$K_G=X_3\text{XOR}K_3\text{XOR}K_{OTP}=K_0\text{XOR}K_1\text{XOR}K_2 \text{XOR}K_3\text{XOR}K_4\text{XOR}K_{OTP}$$

Thus, all real parties 102*a*-102*d* in ring 408 now have the same group key which is the XOR of all 5 precursor keys of the "increased" ring 408 or the ring 408 including the virtual party 401*a* and the OTP key. This forms a secured group key, $K_G$, that is same for all parties 102*a*-102*d* and may then be used as the group key by each party of the group of parties 102*a*-102*d* as the application demands.

As described above with reference to FIGS. 1*a* to 4 and/or as described herein, the sharing and/or negotiation of the cryptographic or precursor keys between each of the parties in the group of parties in the ring may use any suitable type of sharing, key exchange, and/or negotiation type protocol or receiver. As described above, each party may share, establish or negotiate a precursor cryptographic key with an adjacent party in the ring. Thus, each party has a first precursor cryptographic key, i.e. a cryptographic key shared/ negotiated or exchanged by the previous adjacent party in the ordered ring to said each party, and a second precursor cryptographic key, i.e. a cryptographic key shared/negotiated or exchanged by the next adjacent party in the ordered ring to said each party. Any suitable or secure key sharing, establishment or negotiation protocol or procedure may be implemented to ensure two adjacent parties share or establish/negotiate the same cryptographic key. The key sharing, establishment or negotiation protocol may be the same for all parties in the ring to ensure the precursor cryptographic keys that are shared/established or negotiated are in the same form, similar format and/or type such that they may be mathematically compatible to be combined with the meeting keys to form the group key. The key sharing, establishment or negotiation protocol that is used may be based on, without limitation, for example the BB84 protocol; any suitable classical key exchange/sharing/negotiating protocol such as, without limitation, for example Transport Layer Security (TLS)/Diffie-Hellman (DH) protocol and the like to negotiate a shared key; or have a secured channel is established between the two parties in which they pass a one time pad (OTP) or random key from one to the other; any other quantum key exchange protocol used to establish and/or exchange a shared key between two parties; negotiating or establishing a shared key via a third party or the intermediary or cloud service and the like; wherein the shared key may be based on quantum key distributed keys and may be a quantum-safe or quantum secure key due to the key establishment protocol being a quantum-secure key establishment protocol that uses quantum distributed keys to establish the shared key between the parties; combinations thereto, modifications thereto and the like. It is assumed herein that each party in the ring has securely shared, negotiated or exchanged and established a first shared precursor key with the previous adjacent party in the ring to said each party and has shared, negotiated or exchanged and established a second shared precursor key with the next adjacent party in the ring to said each party.

For example, the BB84 QKD protocol is a well-known QKD protocol using photon polarisation bases to transmit the information that may be used to exchange a shared key between a first and second party. This may be applied to each party in the group of parties in which, for example, said each party and the next adjacent party negotiate a key or exchange a shared key based on using the BB84 protocol. The BB84 QKD protocol uses a set of bases including least two pairs of conjugate photon polarisation bases (e.g. a set of bases including, without limitation, for example a rectilinear photon basis (e.g. vertical (0°) and horizontal (90°) polarisations) and diagonal photon basis (e.g. 450 and 1350 polarisations) or the circular basis of left- and right-handedness etc.) In the BB84 protocol, QKD is performed between a sender device (or third party/intermediary) (e.g. often referred to as Alice) and a first party (e.g. often referred to as Bob) and a second party (e.g. often referred to as Carol). The BB84 protocol is a key exchange protocol using quantum communication channel between the first party and the sender device, and the second party and the sender device in which the first party and second party exchange and share the same cryptographic key. The sender device and first party are connected by a quantum communication channel which allows quantum information (e.g. quantum states) to be transmitted. As well, the sender device and second party are connected by another quantum communication channel which allows quantum information (e.g. quantum states) to be transmitted. Each quantum channel may be, without limitation, for example, an optical fibre or optical free space. Furthermore, the sender device and first party (and sender device and second party) also communicate over a non-quantum channel or public classical channel, without limitation, for example a fibre optic channel, telecommunications channel, radio channel, broadcast radio or the internet and/or any other wireless or wired communications channel and the like. As well, when negotiating the key the first and second parties may communicate over a non-quantum channel or classical channel for exchanging the final shared cryptographic key between the first and second parties. Sheng-Kai Liao, et. al. "*Satellite-to-ground quantum key distribution*", *Nature* volume 549, pages 43-47, 7 Sep. 2017, describes satellite-based QKD system using the BB84 protocol for distributing keys, where a satellite free-space optical quantum channel is produced using a 300-mm aperture Cassegrain telescope, which sends a light beam from a Micius satellite (e.g. Alice) to a optical ground receiving station (OGR) (e.g. Bob or Carol), which uses a Ritchey Chretien telescope for receiving the QKD photons over the satellite free-space optical quantum channel. The BB84 protocol requires that the third party or intermediary that is used to perform the key exchange/establishment between the first and second parties is trusted.

In another example, a modified version of BB84 protocol as described in GB Patent Application No. 1916311.2 entitled "Quantum Key Distribution Protocol" filed on 8 Nov. 2019 and incorporated herein by reference, and/or any type of QKD protocol may be used to exchange and/or transmit the quantum encoded keys and share a quantum-secure cryptography key between a pair of parties. The modified version of the BB84 protocol may be configured or implemented such that the sender device (e.g. third party device/intermediary) and the like does not have knowledge of the final agreed quantum-secure key between the first and second parties. This means that the level of trust required by the sender device may be reduced or untrusted but where the shared key between first and second parties is only known to the first and second parties. In the modified version of the BB84 protocol, the sender device (e.g. a satellite or terrestrial fibre optic device) may transmit a first QKD key to a first party over a first quantum channel (e.g. optical channel) together with the transmitted basis sent to the first party (e.g. an OGR or endpoint device) over a first classical channel, where the first party does not reveal the received basis used by the first party to receive the QKD key over the first quantum channel. This means the sender device only knows approximately 50% of the received bits of the first QKD key. The process is repeated with the second party and sender device for a second QKD key. That is, the sender device may transmit the second QKD key to the second party over a second quantum channel (e.g. optical channel) together with the transmitted basis sent to the second party over a second classical channel, where the second party does not reveal the received basis used by the second party to receive the second QKD key over the second quantum channel. This means the sender device only knows approximately 50% of the received bits of the second QKD key too. The sender device then XORs the first and second QKD keys together and sends these to the second party or even to both parties. The first and second parties communicate to discover the correctly-measured bases, generating a new raw key of about 25% of the original bits transmitted, where they then perform error correction and the like to generate a final shared key, which becomes a precursor key negotiated between the first and second parties.

Alternatively or additionally, each of the first and second party devices then sends only an indication of what they consider to be the correctly received symbols of the QKD keys. The sender device then sends the actual basis used for transmitting these correctly received symbols to each corresponding first and second party. The sender device then XORs the two QKD keys and sends the correctly received symbols of the XOR'd QKD keys to the second party. The first and second parties communicate to discover the correctly-measured bases, generating a new raw key of about 25% of the original bits transmitted, where they then perform error correction and the like to generate a final shared key, which becomes a precursor key negotiated between the first and second parties.

As another example, the above example QKD protocol that modifies the BB84 protocol may be for when each symbol represents $2^n$ binary bits, for $n>=1$. When each symbol represents a binary bit for $n=1$, the steps of this QKD protocol may be based on the following: the sender device is configured to transmit a first secret bit string (e.g. QKD key) over a first quantum channel to the first party, each bit of the first secret bit string modulated by a basis state randomly selected from a set of base; the sender device also transmits a first basis set over a first classical communication channel to the first party, the first basis set comprising data representative of the randomly selected bases used to modulate each bit of the first secret bit string; the sender device may also transmit a second secret bit string (e.g. second QKD key) over a second quantum channel to the second party, each bit of the second secret bit string modulated by a basis state randomly selected from the set of bases; the sender device also transmits a second basis set over a second classical communication channel to the second party, the second basis set comprising data representative of the randomly selected bases used to modulate each bit of the second secret bit string. The sender device then generates a third bit string based on combining the first and second secret bit strings, and transmits the third bit string to the second device via the second communication channel.

The first party and second party perform a quantum key exchange to establish a shared key based on: the first party using the received first basis set to determine a first received set of secret bits comprising bits of the first secret bit string transmitted over the first quantum channel that were successfully received by the first party; the second party uses the received second basis set to determine a second received set of secret bits comprising bits of the second secret bit string transmitted over the second quantum channel that were successfully received by the second party; the second party generates a fourth set of bits based combining the second received set of secret bits with the received third bit string, wherein one or more bits of the fourth set of bits correspond to one or more bits of the first bit string; the first party and second party perform bit sifting operations and the like over a third classical communication channel therebetween based on the first received set of secret bits at the first party and the fourth set of bits at the second party for generating a common set of sifted bits for forming a shared cryptographic key at the first and second parties.

This QKD protocol minimises interactions between the sender device and the first and second parties, which means the sender device receives nearly no information associated with what secret symbols the first and second parties validly received, which means this may result in a higher level of security than those QKD protocols such as BB84 that share information with the sender device. However, this tradeoff is typically at the expense of reliability and/or a reduction in the number of viable symbols that may be used for generating the common set of sifted symbols and subsequent formation of the cryptographic key using the common set of sifted symbols. The reliability and/or viable symbols successfully and validly received of the QKD protocol may be further improved whilst being provably secure and not impacting the security of the QKD protocol by having the first and second parties share a "small amount" of information associated with the successfully received symbols at the first and second parties (e.g. successfully received symbol positions) with the sender device.

In another example secure key sharing, establishment or negotiation protocol or procedure, each party may share, establish or negotiate a precursor cryptographic key with an adjacent party in the ring using a secure cloud platform/service. The example secure key sharing, establishment or negotiation protocol or procedure may be implemented to ensure two adjacent parties, or a pair of parties, share or establish/negotiate the same cryptographic key. The secure key sharing, establishment or negotiation protocol is used to establish the same cryptographic key or a key between a first party and a second party, each party in communication with one or more key-serving nodes (KNodes) within a communication network. The key that is established between the first and second parties or that results from the key establishment protocol is referred to herein interchangeably as a precursor key, which is derived by the first and second parties at the end of the example secure key establishment protocol. Each of the first and second parties are in communication with a corresponding first and second key-serving node, where each key serving node has access to the same set of distributed keys (also referred to as a set of keys), which are inaccessible to the first and second parties. Each set of keys having been established or distributed to each key serving node of the first and second parties in a secure manner. For example, each set of keys may be distributed and/or formed based on, without limitation, for example using a classical key distribution protocol to form the set of keys; using quantum key distribution protocol to form a set of keys that comprise quantum distributed keys; and/or any other type of key distribution protocol that is suitable for providing a set of keys to the KNodes for use with the secure key establishment protocol for establishing a key (e.g. established key or final key) between the first and second party in a trustless manner.

As an example, the communication network may be based on, without limitation, for example a classical communication network (e.g. a cloud network/infrastructure and the like) in which communication channels within the network are secured using classical encryption/cryptography or non-quantum encryption/cryptography to form a classical secured communication network or classical-secure network (also referred to as a secure network). For example, the one or more key-serving nodes (KNodes) are part of the classical-secure network and communicate with each other over classical-secure communication channels. The set of keys used in the secure key establishment protocol may be distributed to the classical-secure network (e.g. stored in one or more HSMs or secure servers and the like) using one or more of the various key distribution protocols to form a set of keys. The KNodes may thus have secure access to the set of keys over secure channels in the secure network. Each classical-secure communication channel between KNodes and/or other computing devices, nodes and/or components of the secure network may be based on a communication channel encrypted with, without limitation, for example a key from the set of keys, a key derived from the set of keys, or even a distributed key derived from a manual keyfill process and the like. Each of the first and second parties may have a classical-secure communication channel set up with each respective KNode during the secure key establishment protocol, where these classical-secure communication channels may comprise or represent a communication channel encrypted by, without limitation, for example a key from the set of keys; a key derived from the set of keys, even a distributed key derived from a manual keyfill process; a key exchanged between the respective KNode and party; and/or any other manner of securing a communication channel between the KNode and the party; the like and/or as the application demands.

The set of distributed keys (or set of keys) may be stored within two or more servers within the classical-secure network (e.g. HSMs, secure servers, and the like), each server having a distinct or different geographic location to the other servers, where a secure key establishment protocol generates and securely distributes a set of distributed keys to each server. The secure key establishment protocol may be used between a first party and a second party such they receive the same key from different geographical locations (e.g. different servers/KNodes), but rooted in a distributed key that was delivered to the geographical locations (e.g. servers/KNodes) in a secure manner.

Alternatively or additionally, the communication network may be based on, without limitation, for example a quantum-secure network (e.g. Quantum Cloud) and/or a classical communication network. For example, if the one or more key-serving nodes (KNodes) are within the quantum-secure network, they may communicate with each other over respective quantum-secure communication channels. The set of keys may be distributed to the quantum-secure network using quantum key distribution protocols and so forms a set of quantum distributed keys. The KNodes may thus have quantum-secure access to the set of keys, which are a set of quantum distributed keys. Each quantum-secure communication channel between KNodes and/or parties may comprise or represent a communication channel encrypted with a quantum distributed key or even a distributed key derived from a manual keyfill process and the like.

However, to ensure quantum security, the quantum distributed key may be from the set of quantum distributed keys or a key securely derived from one or more quantum distributed keys of the set of quantum distributed keys; and/or derived in any quantum secure manner using one or more quantum distributed keys and the like or a quantum secure keyfill process. The set of quantum distributed keys may be stored within two or more quantum servers within the quantum-secure network (e.g. OGRs/terrestrial transceivers and the like), each quantum server having a distinct or different geographic location to the other quantum servers, where a quantum key distribution system generates and distributes a set of quantum distributed keys to each quantum server. The secure key establishment protocol may be used between an first party and a second party such they receive the same key from different geographical locations (e.g. different quantum servers/KNodes), but rooted in a quantum distributed key that was delivered to the geographical locations (e.g. quantum servers/KNodes) in a quantum safe manner (e.g. photonically).

For example, a quantum distributed key may be delivered to quantum servers in different geographical locations using a quantum key distribution system/protocol based on, without limitation, for example a satellite quantum key distribution system with photonic/satellite links between a satellite and two or more optical ground receivers in different geographical locations; or a terrestrial quantum key distribution system with photonic fibre channels between at least two different geographically located terrestrial transceivers;

combinations thereof; modifications thereto; as herein described; and the like and/or as the application demands.

Nevertheless, regardless of the communication network or set of distributed keys (set of keys) that are used by each of the first and second key nodes, the secure key establishment process/protocol is based on the following procedure in which the first party requests for the second party to provide: a) the identity (ID) of the second party (e.g. ID_R); the ID of the KNode that the second party wishes to negotiate with (e.g. KID_R); and a first nonce generated by the second party (e.g. N_R). The second party responds with data representative of: a) the generated first nonce (e.g. N_R); b) the ID of the second party (e.g. ID_R); c) and the ID of its KNode (e.g. KID_R). The first party then generates a second nonce (e.g. N_I) and requests an Intermediate Bilocation Key (e.g. Int_Bilocation_Key) from a different KNode than that of the Knode used by the second party, in which the request includes data representative or passes data representative of: a) the ID of the second party (e.g. ID_R); b) the ID of second party's KNode (e.g. KID_R); and c) a third nonce which is derived from the first and second nonces. The third nonce may be based on a combination or function based on the first nonce and the second nonce (e.g. an XOR-type operation using the first and second nonces; i.e. N_IR=N_R XOR N_I, when binary symbols are used).

The KNode used by the first party (or first key node) calculates an Intermediate Bilocation Key based on the request for the Intermediate Bilocation Key. In this example, the first key node includes a set of distributed keys (or set of keys) and are the same as the set of distributed keys of the KNode used by the second party (e.g. second key node). For example, when the secure network is a quantum network, the set of distributed keys is a set of quantum distributed keys. Thus, the first key node receives from the first party the request to generate an Intermediate Bilocation Key, in which the request includes data representative of: a) the ID of the second party (ID_R); b) the ID of second key node or KNode used by the second party (KID_R); and c) a third nonce (e.g. N_IR) which is derived from a first random nonce (e.g. N_R) generated by the second party and a second random nonce (e.g. N_I) generated by the first party. The third nonce may be based on a combination or function based on the first nonce and the second nonce (e.g. an XOR-type operation using the first and second nonces; i.e. N_IR=N_R XOR N_I, when binary symbols are used). On receipt of the Intermediate Bilocation Key request, the first key node selects a key from the set of distributed keys (or set of keys) using a key selection algorithm/function based at least on the ID_R, KID_R, the ID of the first party (ID_I), the ID of the first key node (KID_I) or KNODE used by the first party, and the third nonce. The ID_I of the first party may be received or derived during authentication of the first party with the first key node. The key selection algorithm/function may be based on a hash function. For example, when the secure network is a quantum-secure network, the selected key is selected from the set of quantum distributed keys and so is a quantum distributed key. After selecting the selected key from the set of keys, the first key node generates a first random anti-replay nonce for use in deriving/generating the Int_Bilocation_Key. The first key node then generates the Int_Bilocation_Key based on the selected key, the first anti-replay nonce, and at least on ID_R, KID_R, ID_I, KID_I, and the received third nonce (e.g. N_IR). For example, the Int_Bilocation_Key may be based on a hash of at least the selected key, the first anti-replay nonce, and at least on ID_R, KID_R, ID_I, KID_I, and the received third nonce. The first key node then sends the Int_Bilocation_Key and the first anti-replay nonce (e.g. fourth nonce in step 236 of process 230) to the first party for use by the first party and second party in establishing/negotiating the precursor key therebetween.

In response to the Intermediate Bilocation Key request, the first party is returned or receives from the KNode used by the first party (or first key node) the following: an Intermediate Bilocation Key (e.g. Int_Bilocation_Key) and a fourth nonce (e.g. a first anti-replay nonce) used in its creation from the KNode or first key node. The first party sends or passes data representative of: a) the second and fourth nonces (e.g. N_I and first anti-replay nonce); b) the ID of the first party (ID_I); and c) the ID of the KNode used by the first party (e.g. KID_I); to the second party. The second party generates the third nonce (e.g. N_IR) from the received second nonce and its generated first nonce (e.g. N_IR=N_I XOR N_R).

The second party requests a Bilocational Key from its KNode and sends/passes data representative of: a) the third and fourth nonces; b) ID_I; and c) KID_I; to the KNode used by the second party, which is configured to generate the Bilocational Key.

The KNode used by the second party, or second key node, calculates the Bilocation Key on receiving from the second party the request to generate the Bilocation Key, in which the request includes data representative of: a) the ID of the first party (ID_I); b) the ID of KNode used by the first party i.e. the first key node (KID_I); c) a third nonce (e.g. N_IR) which is derived from a first random nonce (e.g. N_R) generated by the second party and a second random nonce (e.g. N_I) generated by the first party. The third nonce may be based on a combination or function based on the first nonce and the second nonce (e.g. an XOR-type operation using the first and second nonces; i.e. N_IR=N_R XOR N_I, when binary symbols are used); and an first anti-replay nonce received by the first party from the first key node.

The second key node, or KNode used by the second party, then selects a key from the set of distributed keys using a key selection algorithm/function based at least on the ID_I, KID_I, the ID of the second party (ID_R), the ID of the second key node (KID_R) or KNode used by the second party, and the third nonce (e.g. N_IR). It is noted that the ID_R of the second party may be received or derived previously by the second key node during authentication of the second party with the second key node. The key selection algorithm/function used by the second key node is the same as the key selection algorithm/function used by the first key node. The key selection algorithm/function may be based on a hash function. This means, that given the first and second key nodes have the same set of distributed keys, and given that the second key node is passed a set of inputs that enables it to provide the key selection algorithm/function with the same inputs, then the key selected by the second key node is the same as the key selected by the first key node.

The second key node generates a random receiver anti-replay nonce for use in deriving/generating the Bilocation Key. The second key node calculates the Bilocation Key by first generating the Int_Bilocation_Key based on the selected key and at least on the ID_I, KID_I, the ID of the second party (ID_R), the ID of the second key node (KID_R), the third nonce (e.g. N_IR), and the received first anti-replay nonce. For example, the Int_Bilocation_Key may be based on a hash of at least the selected key, the first anti-replay nonce, and at least on ID_R, KID_R, ID_I, KID_I, and the received third nonce. The second key node then generates the Bilocation Key based on combining the Int_Bilocation_Keywith the second anti-replay nonce. For example, this may be based on a hash of the Int_Bilocation_Key and the second anti-replay nonce. The second key node sends the Bilocation Key and the second anti-replay nonce or fifth nonce to the second party for use by the second party and first party in negotiating/establishing the precursor cryptographic key.

The second party is sent/passed a Bilocational Key and a fifth nonce (e.g. second anti-replay nonce) used in its creation from the KNode used by the second party. The second party sends/passes the fifth nonce (e.g. second anti-replay nonce) back to the first party. The first party combines the fifth nonce (e.g. second anti-replay nonce) and the Intermediate Bilocation Key to form the shared Bilocation Key. The Bilocation Key received by the second party from the KNode used by the second party is the same as the Bilocation Key calculated at the first party using the Intermediate Bilocation Key received from the KNode used by the second party, so has been shared therebetween. Thus the Bilocation Key at each of the first and second parties is a shared Bilocation Key.

Finally, the first party and second party may form or generate the precursor key based on agreeing to either: a) combine the Bilocation Key with an agreed nonce (e.g. the third nonce, which is a combination of the first and second nonces) to form the precursor key; or b) use a challenge-response protocol to form the precursor cryptographic key. Thus, this example secure key may be used to enable each party in the group of parties to share or negotiate/establish a precursor key with the previous adjacent party in the ring and the next adjacent party in the ring.

Figure 5A:
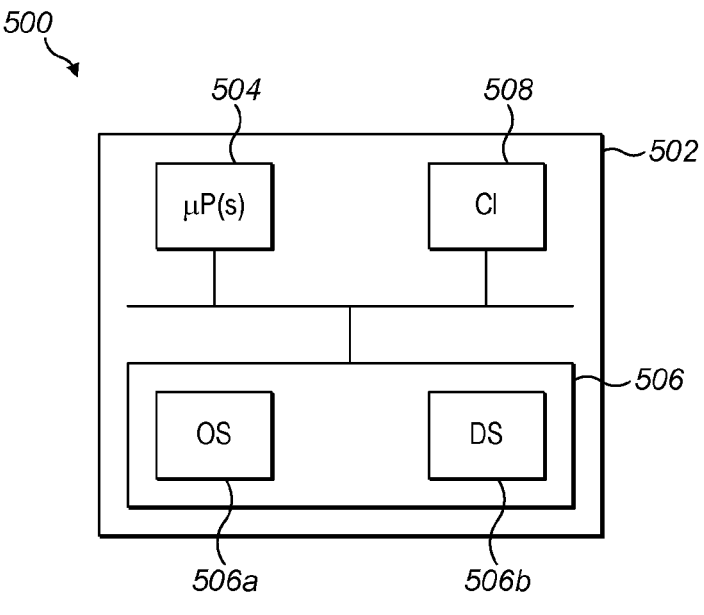
FIG. 5a is a schematic diagram illustrating an example computing system, device or apparatus for use in implementing one or more portions of an example group key creation/formation protocol/process according to some embodiments of the invention.

FIG. 5a is a schematic diagram of an example computing system 500 for use in implementing and/or performing a group key formation/creation process according to aspects of the invention. Computing system 500 may be used to implement one or more aspects of the systems, apparatus, parties, intermediary methods, group key formation/creation process(es), party group key formation/creation process(es), intermediary group key formation/creation process(es), and/or use cases as described with reference to FIGS. 1a to 4, combinations thereof, modifications thereto, as herein describe and/or as the application demands. Computing system 500 includes a computing device or apparatus 502 (e.g. QS server, first or second key node, first and/or second device(s)). The computing device or apparatus 502 includes one or more processor unit(s) 504, memory unit 506 and a communication interface 508 in which the one or more processor unit(s) 504 are connected to the memory unit 506, the communication interface 508. The communications interface 508 may connect the computing device or apparatus 502 with one or more other computing devices and/or apparatus (e.g. parties, intermediary and the like (not shown) to establish a group key between the parties via the intermediary based on the group key formation/creation system(s), apparatus, process(es) as described with reference to FIGS. 1a to 4 according to the invention as described herein, combinations thereof, modifications thereto as the application demands. The memory unit 506 may store one or more program instructions, code or components such as, by way of example only but not limited to, an operating system 506a for operating computing device 502, and a data store 506b for storing computer program instructions, executable code, code and/or components associated with implementing the functionality and/or one or more function(s) or functionality associated with one or more portions of the group key formation/creation process(es), one or more parties, one or more intermediary(ies), one or more method(s) and/or process(es) of performing a group key formation/ creation process or protocol for creating a group key that is the same for all parties in the group according to the invention, system(s)/platforms, combinations thereof, modifications there to, and/or as described herein with reference to at least any one of FIGS. 1a to 4.

Figure 5B:
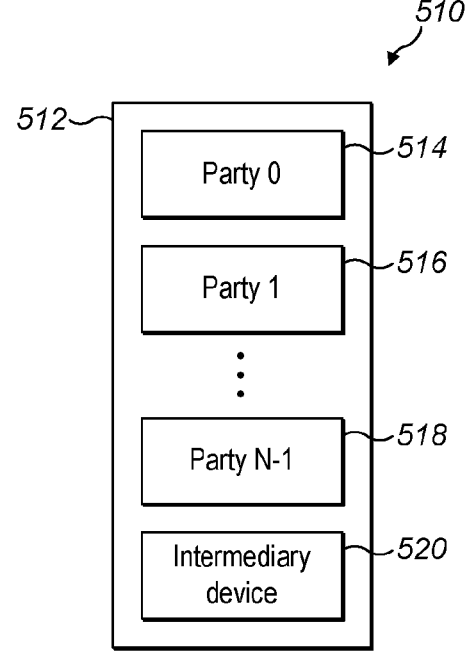
FIG. 5b is a schematic diagram illustrating an example system for use in implementing an example group key creation/formation protocol/process according to some embodiments of the invention Common reference numerals are used throughout the figures to indicate similar features.

FIG. 5b is a schematic diagram of another example group key formation/creation system 520 for facilitating and/or implementing a group key formation/creation protocol and/or process(es) 512 for use by a group of N parties 514-518, where the N parties 514-518 are configured to perform corresponding party group key formation process(es), and the intermediary 520 is configured to perform the reciprocal/corresponding intermediary group key formation process for creating/forming a group key that is the same for all N parties 514-518. The intermediary 520 is unable to derive or calculate the group key from the information exchanged between the parties 512-518 and the intermediary 520, which only calculates intermediate keys for each party 512-518. Each party 512-518 calculates the same group key based on XORing their corresponding intermediate value with their own precursor key. The group key formation/creation system 520 may include a plurality of computing devices or apparatus 502 that includes at least N parties 512-518 and an intermediary 520 that may be configured to operate and/or implement/perform the corresponding steps and/or functions of the group key formation/creation process(es) according to the invention for creating a group key that is the same for all N parties 514-518 in the group as described with reference to said one or more systems 100, 200, 300, and/or 400 of FIGS. 1a, 2, 3, 4, one or more group key formation/creation process(es)/method(s), party group key formation/creation process(es)/method(s) and/or intermediary group key formation/creation process(es)/method(s) 110, 120, 140 of FIGS. 1a to 4, combinations thereof, modifications thereto and/or as herein described with reference to any one of FIGS. 1a to 4 and/or as the application demands.

In the embodiment described above the server may comprise a single server or network of servers. In some examples the functionality of the server may be provided by a network of servers distributed across a geographical area, such as a worldwide distributed network of servers, and a user may be connected to an appropriate one of the network of servers based upon a user location.

The above description discusses embodiments of the invention with reference to a single user for clarity. It will be understood that in practice the system may be shared by a plurality of users, and possibly by a very large number of users simultaneously.

The embodiments described above are fully automatic. In some examples a user or operator of the system may manually instruct some steps of the method to be carried out.

In the described embodiments of the invention the system may be implemented as any form of a computing and/or electronic device. Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Various functions described herein can be implemented in hardware, software, or any combination thereof. If implemented in software, the functions can be stored on or transmitted over as one or more instructions or code on a computer-readable medium. Computer-readable media may include, for example, computer-readable storage media. Computer-readable storage media may include volatile or non-volatile, removable or non-removable media implemented in any method or technology for storage of information such as computer readable instructions, data structures, program modules or other data. A computer-readable storage media can be any available storage media that may be accessed by a computer. By way of example, and not limitation, such computer-readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer. Disc and disk, as used herein, include compact disc (CD), laser disc, optical disc, digital versatile disc (DVD), floppy disk, and blu-ray disc (BD). Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionality described herein can be performed, at least in part, by one or more hardware logic components. For example, and without limitation, hardware logic components that can be used may include Field-programmable Gate Arrays (FPGAs), Application-Program-specific Integrated Circuits (ASICs), Application-Program-specific Standard Products (ASSPs), System-on-a-chip systems (SOCs), Complex Programmable Logic Devices (CPLDs), etc.

Although illustrated as a single system, it is to be understood that the computing device may be a distributed system. Thus, for instance, several devices may be in communication byway of a network connection and may collectively perform tasks described as being performed by the computing device.

Although illustrated as a local device it will be appreciated that the computing device may be located remotely and accessed via a network or other communication link (for example using a communication interface).

The term 'computer' is used herein to refer to any device with processing capability such that it can execute instructions. Those skilled in the art will realise that such processing capabilities are incorporated into many different devices and therefore the term 'computer' includes PCs, servers, mobile telephones, personal digital assistants and many other devices.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

It will be understood that the benefits and advantages described above may relate to one embodiment or may relate to several embodiments. The embodiments are not limited to those that solve any or all of the stated problems or those that have any or all of the stated benefits and advantages. Variants should be considered to be included into the scope of the invention.

Any reference to 'an' item refers to one or more of those items. The term 'comprising' is used herein to mean including the method steps or elements identified, but that such steps or elements do not comprise an exclusive list and a method or apparatus may contain additional steps or elements.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something".

Further, to the extent that the term "includes" is used in either the detailed description or the claims, such term is intended to be inclusive in a manner similar to the term "comprising" as "comprising" is interpreted when employed as a transitional word in a claim.

The figures illustrate exemplary methods. While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

Moreover, the acts described herein may comprise computer-executable instructions that can be implemented by one or more processors and/or stored on a computer-readable medium or media. The computer-executable instructions can include routines, sub-routines, programs, threads of execution, and/or the like. Still further, results of acts of the methods can be stored in a computer-readable medium, displayed on a display device, and/or the like.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

The invention claimed is:

1. A computer-implemented method of creating a group key for a group of N parties in an ordered ring using an intermediary, the method comprising:

a first party of the group of N parties performing steps comprising:

sharing or negotiating a cryptographic key of the first party with a next adjacent party in the ordered ring, such that each party has another cryptographic key of a previous adjacent party;

generating a meeting key for the first party based on combining the cryptographic key of the first party with a shared cryptographic key from the previous adjacent party; and sending the meeting key to the intermediary;

receiving an intermediate key from the intermediary, wherein the intermediary computes the intermediate key based on combining two or more meeting keys of corresponding parties;

creating the group key based on combining the cryptographic key of the first party with the received intermediate key, wherein the created group key comprises a combination of at least N−1 of the cryptographic keys of the parties; and using the group key in communications or other purposes with one or more other parties of the group; and each of the parties of the group of N parties different from the first party performing steps comprising:

sharing a cryptographic key of the party with a next adjacent party in the ring, such that each party in the ring has another cryptographic key of a previous adjacent party;

generating a meeting key for the party based on combining the cryptographic key of the party with a shared cryptographic key from the previous adjacent party; and sending the meeting key to the intermediary;

receiving an intermediate key from the intermediary, wherein the intermediary computes the intermediate key based on combining the meeting key with at least one intermediate key of a party other than a p-th party, such that the intermediate key exhibits the property of a group key being formed when any intermediate key of a party is combined with the cryptographic key of the corresponding party in the ordered ring;

creating the group key based on combining the cryptographic key of the party with the received intermediate key, wherein the group key comprises a combination of at least N−1 of the cryptographic keys of said at least N−1 parties; and using the group key in communications or other purposes with one or more other parties of the group.

2. The computer-implemented method as claimed in claim 1, the method, performed by a party, further comprising:

when the party is in the ordered ring:

sharing or negotiating a cryptographic key of the party with a next adjacent party in the ring, such that each party in the ring has another cryptographic key of a previous adjacent party;

generating a meeting key for the party based on combining the cryptographic key of the party with a shared cryptographic key from the previous adjacent party; and sending the meeting key to the intermediary;

receiving an intermediate key from the intermediary, wherein the intermediary computes the intermediate key based on combining two or more meeting keys of corresponding parties in the ring;

creating the group key based on combining the cryptographic key of the party with the received intermediate key; and when the party is not in the ring:

sharing or negotiating a cryptographic key of an adjacent party in the ring with the party; and receiving the intermediate key of the adjacent party in the ring from the intermediary;

creating the group key based on combining the shared cryptographic key of the adjacent party with the received intermediate key; and using the group key in communications with one or more other parties of the group.

3. The computer-implemented method as claimed in claim 1, wherein:

for the first party in the ordered ring, the intermediary computes an intermediate key based on combining meeting keys of at least two non-adjacent parties in the ring excluding the meeting key of the first party; and for other parties in the ordered ring, the intermediary computes the intermediate key for each party based on combining the meeting key of said each party with the intermediate key computed for the preceding adjacent party in the ordered ring.

4. The computer-implemented method as claimed in claim 1, wherein combining of a key with another key further comprises performing an exclusive OR, XOR, operation on said key with said another key.

5. The computer-implemented method as claimed in claim 1, wherein the intermediary computes the intermediate key based on combining the meeting key with at least one intermediate key of another party such that the intermediate key exhibits the property that each i-th group key value comprising the i-th party cryptographic key combined with the i-th intermediate key is the same for each i-th party i in the ordered ring.

6. The computer-implemented method as claimed in claim 1, wherein for an odd number, N, of parties in the group, where N>2 and all of the N parties are arranged in the ordered ring, the method, performed by each party in the ring, further comprising receiving an intermediate key from the intermediary, wherein the intermediary computes the intermediate key based on the meeting key and a previous intermediate key of a previous adjacent party.

7. The computer-implemented method as claimed in claim 1, wherein for an odd number, N, of parties in the group, where N>2, all of the N parties are arranged in an ordered ring, the method, performed by each p-th party for $0 \leq p \leq N-1$, comprising:

when p=0, performing the steps of:

sharing or negotiating a p-th cryptographic key KP with the next adjacent (p+1)-th party in the ring; and generating a p-th meeting key MP for the p-th party based on combining the p-th cryptographic key KP with a previously shared or negotiated (N−1)-th cryptographic key KN−1 from the (N−1)-th party;

sending the meeting key MP to the intermediary, wherein the intermediary computes the p-th intermediate key, XP, based on combining meeting keys of two non-adjacent parties in the ring excluding the meeting key of the p-th party;

when 0<p<N, performing the steps of:

when p<N−1, sharing or negotiating a p-th cryptographic key KP with the next adjacent (p+1)-th party in the ring;

when p=N−1, sharing or negotiating a p-th cryptographic key KP with the 0-th party in the ring;

generating a p-th meeting key MP for the p-th party based on combining the p-th cryptographic key KP with a previously shared or negotiated (p−1)-th cryptographic key KP−1 from the (p−1)-th party;

sending the meeting key MP to the intermediary, wherein the intermediary computes the p-th intermediate key, XP, based on combining the p-th meeting key MP with at least one intermediate key of another party;

receiving the p-th intermediate key, XP, from the intermediary;

creating the group key, KG, based on combining the p-th cryptographic key KP with the p-th intermediate key, XP; and using the group key, KG, in communications or other purpose with one or more other parties of the group.

8. The computer-implemented method as claimed in claim 7, wherein each p-th cryptographic key, KP, is a precursor key generated by the p-th party prior to sharing.

9. The computer-implemented method as claimed in claim 8, wherein sharing further comprises sharing the p-th cryptographic key, KP, of the p-th party with an adjacent ((P−1+N) mod N)-th party, wherein after all parties in the ring have shared, the p-th party has the ((P−1+N) mod N)-th cryptographic key, K (P−1+N) mod N, of the ((P−1+N) mod N)-th party in the ring.

10. The computer-implemented method as claimed in claim 7, wherein each p-th cryptographic key, KP, is a precursor key negotiated by the p-th party with the (p+1)-th party, wherein when p=N−1, (N−1)-th cryptographic key, KN−1, is a precursor key negotiated by the (N−1)-th party with the 0-th party.

11. The computer-implemented method as claimed in claim 7, wherein negotiating each p-th cryptographic key, KP, further comprises performing a key exchange or negotiation procedure to negotiate the p-th cryptographic key, KP, of the p-th party with an adjacent ((P−1+N) mod N)-th party, wherein after all parties in the ring have been negotiated, the p-th party and the adjacent ((P−1+N) mod N)-th party share the same ((P−1+N) mod N)-th cryptographic key, K (P−1+N) mod N.

12. The computer-implemented method as claimed in claim 7, wherein generating the p-th meeting key, MP, further comprises generating the p-th meeting key, MP based on MP=KP XOR K (P−1+N) mod N for all p.

13. The computer-implemented method as claimed in claim 7, wherein the intermediary computes the p-th intermediate key, XP, for the p-th party based on:

for p=0, X0=XOR {r=2 to N−1 step 2} Mr; and for 0<p<N, XP=XP−1 XOR MP.

14. The computer-implemented method as claimed in claim 7, wherein creating the group key, KG, for the p-th party further comprising creating the group key, KG, based on KG=XP XOR KP, wherein the group key, KG, is the same for all parties.

15. The computer-implemented method as claimed in claim 1, wherein for an even number, N, of parties in the group, where N>2 and only N−1 parties of the N parties are arranged in an ordered ring, the method further comprising:

when a party is in the ring, performing the steps of:

sharing or negotiating the cryptographic key of the party with a next adjacent party in the ring, such that each party in the ring has another cryptographic key of a previous adjacent party;

generating a meeting key for the party based on combining the cryptographic key of the party with a shared cryptographic key of the previous adjacent party; and sending the meeting key to the intermediary;

receiving an intermediate key from the intermediary, wherein the intermediary computes the intermediate key based on combining at least two or more meeting keys of the parties in the ring;

creating the group key based on combining the cryptographic key of the party with the received intermediate key; and when a party is not in the ring, performing the steps of:

sharing or negotiating a cryptographic key of an adjacent party in the ring with the party; and receiving the intermediate key of the adjacent party in the ring from the intermediary;

creating the group key based on combining the shared cryptographic key of the adjacent party with the received intermediate key; and using the group key in communications with one or more other parties of the group.

16. A computer-implemented method of creating a group key for a group of N parties in an ordered ring using an intermediary, the method, performed by the intermediary, comprising:

receiving a meeting key from each of the parties at the intermediary, wherein the meeting key for each party is based on combining the cryptographic key of the party with a shared or negotiated cryptographic key from previous adjacent party;

computing an intermediate key for each party, wherein, for a first party of the group of N parties, the intermediate key for each party is computed based on combining two or more meeting keys of corresponding parties and, for a p-th party of the group of N parties different from the first party, the intermediate key is computed based on combining the meeting key with at least one intermediate key of a party other than the p-th party, such that the intermediate key exhibits the property of a group key being formed when any intermediate key of a party is combined with the cryptographic key of the corresponding party in the ordered ring;

transmitting the intermediate key for each party to each party, wherein the intermediate key for said each party is used to create the group key based on combining the cryptographic key of said each party with the received intermediate key of said each party, wherein the created group key comprises a combination of at least N−1 of the cryptographic keys of the parties.

17. The implemented method of claim 16, further comprising:

a first party of the group of N parties performing steps comprising:

sharing or negotiating a cryptographic key of the first party with a next adjacent party in an ordered ring, such that each party has another cryptographic key of a previous adjacent party;

generating a meeting key for the first party based on combining the cryptographic key of the first party with a shared cryptographic key from the previous adjacent party; and sending the meeting key to the intermediary;

receiving an intermediate key from the intermediary, wherein the intermediary computes the intermediate key based on combining two or more meeting keys of corresponding parties;

creating the group key based on combining the cryptographic key of the first party with the received intermediate key, wherein the created group key comprises a combination of at least N−1 of the cryptographic keys of the parties; and using the group key in communications or other purposes with one or more other parties of the group, each of the parties of the group of N parties different from the first party performing steps comprising:

sharing a cryptographic key of the party with a next adjacent party in the ring, such that each party in the ring has another cryptographic key of a previous adjacent party;

generating a meeting key for the party based on combining the cryptographic key of the party with a shared cryptographic key from the previous adjacent party; and sending the meeting key to the intermediary;

receiving an intermediate key from the intermediary, wherein the intermediary computes the intermediate key based on combining the meeting key with at least one intermediate key of a party other than the p-th party, such that the intermediate key exhibits the property of a group key being formed when any intermediate key of a party is combined with the cryptographic key of the corresponding party in the ordered ring;

creating the group key based on combining the cryptographic key of the party with the received intermediate key, wherein the group key comprises a combination of at least N−1 of the cryptographic keys of said at least N−1 parties; and using the group key in communications or other purposes with one or more other parties of the group.

18. An apparatus comprising a processor unit, a memory unit, and a communication interface, the processor unit connected to the memory unit and the communication interface, wherein the processor unit, memory unit and communication interface are adapted to implement a party of a group of N parties in an ordered ring, wherein the party is configured to perform a computer-implemented method comprising:

sharing or negotiating a cryptographic key of the party with a next adjacent party in an ordered ring, such that each party has another cryptographic key of a previous adjacent party;

generating a meeting key for the party based on combining the cryptographic key of the party with a shared cryptographic key from the previous adjacent party; and sending the meeting key to an intermediary;

receiving an intermediate key from the intermediary, wherein, for a first party of the group of N parties, the intermediary computes the intermediate key based on combining two or more meeting keys of corresponding parties and, for a p-th party of the group of N parties different from the first party, the intermediary computes an intermediate key based on combining the meeting key with at least one intermediate key of a party other than the p-th party, such that the intermediate key exhibits the property of a group key being formed when any intermediate key of a party is combined with the cryptographic key of the corresponding party in the ordered ring;

creating the group key based on combining the cryptographic key of the party with the received intermediate key, wherein the created group key comprises a combination of at least N−1 of the cryptographic keys of the parties; and using the group key in communications or other purposes with one or more other parties of the group.

\* \* \* \* \*